United States Patent
Hoek et al.

(10) Patent No.: US 8,029,857 B2
(45) Date of Patent: Oct. 4, 2011

(54) MICRO- AND NANOCOMPOSITE SUPPORT STRUCTURES FOR REVERSE OSMOSIS THIN FILM MEMBRANES

(75) Inventors: Eric M. V. Hoek, Los Angeles, CA (US);
Asim K. Ghosh, Los Angeles, CA (US);
Jodie M. Nygaard, Anaheim, CA (US)

(73) Assignee: The Regents of the University of California, Oakland, CA (US)

( * ) Notice: Subject to any disclaimer, the term of this patent is extended or adjusted under 35 U.S.C. 154(b) by 416 days.

(21) Appl. No.: 11/927,521

(22) Filed: Oct. 29, 2007

(65) Prior Publication Data
US 2008/0237126 A1    Oct. 2, 2008

Related U.S. Application Data

(60) Provisional application No. 60/863,156, filed on Oct. 27, 2006.

(51) Int. Cl.
*B05D 5/00* (2006.01)
*B01D 39/00* (2006.01)
*B01D 39/14* (2006.01)

(52) U.S. Cl. .................. 427/245; 210/500.38; 210/490; 210/502.1; 210/500.25

(58) Field of Classification Search ............... 210/502.1, 210/490, 500.38, 500.37, 652, 500.23, 500.41, 210/500.25, 500.26; 427/245; 428/246; 95/45, 51
See application file for complete search history.

(56) References Cited

U.S. PATENT DOCUMENTS

| | | | |
|---|---|---|---|
| 3,133,132 A | 5/1964 | Loeb et al. | 264/49 |
| 3,133,137 A | 5/1964 | Loeb et al. | 264/49 |
| 3,791,526 A | 2/1974 | Stana et al. | 210/321 |
| 4,060,488 A * | 11/1977 | Hoover et al. | 210/321.82 |
| 4,188,418 A | 2/1980 | Livingston | 427/245 |
| 4,244,824 A | 1/1981 | Lange et al. | 210/500.2 |
| 4,277,344 A | 7/1981 | Cadotte | 210/654 |
| 4,740,219 A * | 4/1988 | Kulprathipanja et al. | 95/51 |

(Continued)

FOREIGN PATENT DOCUMENTS

AU    200157746 A1 *    2/2003

(Continued)

OTHER PUBLICATIONS

Alexandre, et al., "Polymer-layered silicate nanocomposites: preparation, properties and uses of a new class of materials,"*Materials Science and Engineering*, 28:1-63 (2000).

(Continued)

*Primary Examiner* — Ana M Fortuna

(74) *Attorney, Agent, or Firm* — Ballard Spahr LLP

(57) ABSTRACT

Disclosed are compaction resistant thin film composite membranes having a porous polymeric support; a semi-permeable polymer film polymerized on the porous polymeric support; and particles, of a size in the range of microparticles and nanoparticles, dispersed in the porous polymeric support. Also disclosed are methods of making compaction resistant membranes by polymerizing a polymer film on a porous polymeric support with particles of a size in the range of microparticles and nanoparticles dispersed therein, the particles having been selected to improve flux flow characteristics over time of the semi-permeable membrane. Also disclosed are methods of purifying water using the disclosed membranes. This abstract is intended as a scanning tool for purposes of searching in the particular art and is not intended to be limiting of the present invention.

6 Claims, 17 Drawing Sheets

TFC w/ nSupport

13

U.S. PATENT DOCUMENTS

| Patent No. | | Date | Inventor | Class |
|---|---|---|---|---|
| 4,762,619 | A | 8/1988 | Gaddis et al. | 210/639 |
| 4,765,897 | A | 8/1988 | Cadotte et al. | 210/500.23 |
| 4,765,915 | A | 8/1988 | Diehl | |
| 4,769,148 | A | 9/1988 | Fibiger et al. | 210/500.38 |
| 4,859,384 | A | 8/1989 | Fibiger et al. | 264/45.1 |
| 4,872,984 | A | 10/1989 | Tomaschke | 210/500.38 |
| 4,911,844 | A | 3/1990 | Linder et al. | 210/638 |
| 4,948,506 | A * | 8/1990 | Lonsdale et al. | 210/490 |
| 4,971,697 | A | 11/1990 | Douden et al. | 210/502.1 |
| 5,002,590 | A | 3/1991 | Friesen et al. | |
| 5,019,261 | A | 5/1991 | Stengaard | 210/490 |
| 5,024,594 | A * | 6/1991 | Athayde et al. | 442/67 |
| 5,028,337 | A | 7/1991 | Linder et al. | 210/642 |
| 5,091,086 | A | 2/1992 | Stengaard | 210/490 |
| 5,104,632 | A | 4/1992 | Douden et al. | 423/335 |
| 5,108,607 | A | 4/1992 | Kraus et al. | 210/500.39 |
| 5,130,025 | A | 7/1992 | Lefebvre et al. | 210/638 |
| 5,160,617 | A | 11/1992 | Huis In't Veld et al. | 210/490 |
| 5,173,189 | A | 12/1992 | Hoshi et al. | |
| 5,190,654 | A | 3/1993 | Bauer | 210/490 |
| 5,262,054 | A | 11/1993 | Wheeler | 210/639 |
| 5,269,926 | A | 12/1993 | Webster et al. | 210/500.25 |
| 5,342,431 | A | 8/1994 | Anderson et al. | 95/45 |
| 5,376,442 | A | 12/1994 | Davidson et al. | 428/307 |
| 5,543,046 | A | 8/1996 | Van Rijn | 210/490 |
| 5,576,057 | A | 11/1996 | Hirose et al. | 427/245 |
| 5,614,099 | A | 3/1997 | Hirose et al. | 210/653 |
| 5,650,479 | A | 7/1997 | Glugla et al. | |
| 5,733,602 | A | 3/1998 | Hirose et al. | 427/245 |
| 5,755,964 | A | 5/1998 | Mickols | 210/500.37 |
| 5,756,207 | A * | 5/1998 | Clough et al. | 428/375 |
| 5,800,706 | A | 9/1998 | Fischer | 210/198.2 |
| 5,843,351 | A | 12/1998 | Hirose et al. | 264/45.1 |
| 5,876,602 | A | 3/1999 | Jons et al. | 210/500.38 |
| 5,914,039 | A * | 6/1999 | Mahendran et al. | 210/500.25 |
| 5,938,934 | A | 8/1999 | Balogh et al. | 210/688 |
| 5,989,426 | A | 11/1999 | Hirose et al. | 210/500.38 |
| 6,015,495 | A | 1/2000 | Koo et al. | |
| 6,024,872 | A * | 2/2000 | Mahendran et al. | 210/500.25 |
| 6,024,873 | A | 2/2000 | Hirose et al. | 210/500.38 |
| 6,117,341 | A | 9/2000 | Bray et al. | 210/791 |
| 6,187,192 | B1 | 2/2001 | Johnston et al. | 210/502.1 |
| 6,241,893 | B1 | 6/2001 | Levy | 210/660 |
| 6,284,137 | B1 | 9/2001 | Hajikano et al. | 210/500.41 |
| 6,309,546 | B1 | 10/2001 | Herrmann et al. | 210/500.25 |
| 6,413,425 | B1 * | 7/2002 | Hachisuka et al. | 210/500.38 |
| 6,425,936 | B1 | 7/2002 | Sammons et al. | 95/45 |
| 6,551,536 | B1 * | 4/2003 | Kwak et al. | 264/45.1 |
| 6,562,266 | B2 * | 5/2003 | Mickols | 264/41 |
| 6,582,495 | B2 * | 6/2003 | Chau et al. | 95/45 |
| 6,585,802 | B2 | 7/2003 | Koros et al. | 95/51 |
| 6,605,140 | B2 | 8/2003 | Guiver et al. | 96/4 |
| 6,626,980 | B2 | 9/2003 | Hasse et al. | |
| 6,753,396 | B2 | 6/2004 | Ulbricht et al. | 526/517.1 |
| 6,755,900 | B2 * | 6/2004 | Koros et al. | 96/10 |
| 6,824,689 | B2 | 11/2004 | Wang et al. | |
| 6,841,075 | B2 | 1/2005 | Penth et al. | 210/650 |
| 6,869,532 | B2 * | 3/2005 | Arnold et al. | 210/500.25 |
| 6,890,436 | B2 | 5/2005 | Komatsu et al. | 210/500.41 |
| 7,018,538 | B2 | 3/2006 | Leiser et al. | 210/635 |
| 7,138,006 | B2 * | 11/2006 | Miller et al. | 95/45 |
| 7,166,146 | B2 * | 1/2007 | Miller et al. | 95/45 |
| 7,264,650 | B2 * | 9/2007 | Lou et al. | 95/54 |
| 7,329,311 | B2 * | 2/2008 | Zeller et al. | 95/273 |
| 7,485,233 | B2 * | 2/2009 | Vane et al. | 210/660 |
| 7,534,287 | B2 * | 5/2009 | Zeller et al. | 95/273 |
| 7,604,746 | B2 * | 10/2009 | Childs et al. | 210/640 |
| 7,718,112 | B2 * | 5/2010 | Drew et al. | 264/465 |
| 7,749,414 | B2 * | 7/2010 | Bitterlich et al. | 264/45.1 |
| 7,866,487 | B2 * | 1/2011 | Sueoka et al. | 210/500.38 |
| 2002/0074282 | A1 | 6/2002 | Herrmann et al. | 210/490 |
| 2003/0116503 | A1 | 6/2003 | Wang et al. | 210/660 |
| 2003/0121844 | A1 | 7/2003 | Koo et al. | 210/490 |
| 2003/0132174 | A1 | 7/2003 | Isomura et al. | 210/767 |
| 2004/0178135 | A1 | 9/2004 | Beplate | 210/321.6 |
| 2005/0077243 | A1 | 4/2005 | Pinnau et al. | 210/652 |
| 2005/0139066 | A1 | 6/2005 | Miller et al. | 95/45 |
| 2005/0173341 | A1 | 8/2005 | Salinaro | 210/636 |
| 2005/0230305 | A1 * | 10/2005 | Kulkarni et al. | 210/500.23 |
| 2006/0063911 | A1 | 3/2006 | Cayton et al. | 528/425 |
| 2006/0175256 | A1 | 8/2006 | Masten et al. | 210/638 |
| 2006/0201884 | A1 | 9/2006 | Kulprathipanja et al. | |
| 2008/0237126 | A1 * | 10/2008 | Hoek et al. | 210/637 |
| 2009/0272692 | A1 * | 11/2009 | Kurth et al. | 210/652 |
| 2010/0025330 | A1 * | 2/2010 | Ratto et al. | 210/651 |

FOREIGN PATENT DOCUMENTS

| | | |
|---|---|---|
| EP | 348041 | 5/1989 |
| JP | 05 245349 | 9/1993 |
| KR | 10-2005-0077141 | 8/2005 |
| WO | WO 03/097218 | 11/2003 |
| WO | WO 2005/014266 | 2/2005 |
| WO | WO 2006/098872 | 9/2006 |
| WO | WO 2007/001405 | 1/2007 |

OTHER PUBLICATIONS

Al-Zubari, "Towards the establishment of a total water cycle management and re-use program in the GCC countries," *Desalination*, 120:3-14 (1998).

Asano, et al., "Wastewater Reclamation, Recycling, and Reuse: Past, Present, and Future," *Water Science Technology*, 33(10-11):1-14 (1996).

Baayens, et al., "Hydrodynamic resistance and flux decline in asymmetric cellulose acetate reverse osmosis membranes," *Journal of Applied Polymer Science*, 16:663-670 (1972).

Bae, et al., "Activated Carbon Membrane With Carbon Whisker," *Adsorption Science and Technology*, Water Research, 121-125 (2003).

Bae, et al., "Effect of $TiO_2$ Nanoparticles on Fouling Mitigation of Ultrafiltration Membranes for Activated Sludge Filtration," Journal of Membrane Science, 249:1-8 (2005).

Bae, et al., "Preparation of $TiO_2$ Self-Assembled Polymeric Nanocomposite Membranes and Examination of Their Fouling Mitigation Effects in a Membrane Bioreactor System," Journal of Membrane Science, 266:1-5 (2005).

Baker, "Membrane Technology and Applications," Second ed., Wet Sussex: John Wiley & Sons Ltd. 139-149 (2004).

Bakir, "Sustainable wastewater management for small communities in the Middle East and North Africa," *Journal of Environmental Management*, 61:319-328 (2001).

Barth, et al., "Asymmetric polysulfone and polyethersulfone membranes: effects of thermodynamic conditions during formation on their performance," *Journal of Membrane Science*, 169:287-299 (2000).

Belfer, et al., Effect of Surface Modification in Preventing Fouling of Commercial SWRO Membranes at the Eilat Seawater Desalination Pilot Plant, Desalination, 139:169 (2001).

Belfer, et al., "Surface Modification of Commercial Composite Polyamide Reverse Osmosis Membranes," Journal of Membrane Science, 139:175-181 (1998).

Belfer, et al., Surface Modification of Commercial Polyamide Reverse Osmosis Membranes by Radical Grafting, Acta Polymerica, 49:574-582 (1988).

Boom, et al., "Microstructures in phase inversion membranes. Part 2. The role of a polymeric additive," *Journal of Membrane Science*, 73:277-292 (1992).

Bosc, et al., Mesoporous Anatase Coatings for Coupling Membrane Separation and Photocatalyzed Reactions, 265:13-19 (2005).

Boussu, et al., "Characterization of polymeric nanofiltration membranes far systematic analysis of membrane performance," *Journal of Membrane Science*, 278:418-427 (2006).

Brant, et al., Assessing Short-Range Membrane-Colloid Interactions Using Surface Energetics, Journal of Membrane Science, 203:257-273 (2002).

Cadotte, et al., "Nanofiltration Membranes Broaden the Use of Membrane Separation Technology," Desalination, 70:77-88 (1988).

Cadotte, et al., "New Thin-Film Composite Seawater Reverse-Osmosis Membrane," Desalination, 32:25-31 (1980).

Calvert, "Potential applications of nanotubes, in Carbon Nanotubes," CRC Press: Boca Raton. p. 277-292 (1997).

Chazeau, et al., "Viscoelastic properties of plasticized PVC reinforced with cellulose whiskers," *Journal of Applied Polymer Science*, 71:1797-1808 (1999).
Chiang, et al., "Separation of Liquid-Mixtures by Using Polymer Membranes," Journal of Applied Polymer Science, 43:2005-2012 (1991).
Comstock, D.L., "Desal-5 Membrane for Water Softening," 1989, Desalination, 76:61 (1989).
Ebert, et al., "Influence of inorganic fillers on the compaction behavior of porous polymer based membranes," *Journal of Membrane Science*, 233:71-78 (2004).
Elimelech, et al., "Membrane separations in aquatic systems," *Environmental Engineering Science*, 19(6):341 (2002).
Elimelech, et al., "Role of Membrane Surface Morphology in Colloidal Fouling of Cellulose Acetate and Composite Aromatic Polyamide Reverse Osmosis Membranes," Journal of Membrane Science, 27:101-109 (1997).
Favier, et al., "Mechanical percolation in cellulose whiskers nanocomposites," *Polymer Engineering Science*, 37:1732-1739 (1997).
Flemming, et al., "Biofouling—The Achilles Heel of Membrane Processes," Desalination, 113: 215-225 (1997).
Flemming, "Biofouling in water systems—cases, causes and countermeasures," *Applied Microbiology and Biotechnology*, 59(6):629-640 (2002).
Flemming, H.C., "Mechanistic Aspects of Reverse Osmosis Membrane Biofouling and Pevention," in: Z. Amjad (ed.): Membrane Technology. Van Nostrand Reinhold, New York; 163-209 (2003).
Freger, "Nanoscale heterogeneity of polyamide membranes formed by interfacial polymerization," *Langmuir*, 19(11):4791-4797 (2003).
Freger, et al., "TFC polyamide membranes modified by grafting of hydrophilic polymers: an FT-IR/AFM/TEM study," *Journal of Membrane Science*, 209(1):283-292 (2002).
Fried, "Polymer Science and Technology," 2nd ed., Upper Saddle River: Prentice Hall Professional Technical Reference, 315-317 (2003).
Ghosh, et al., "Nano-structured compaction resistant thin film composite membranes," (Abstract) 2006 AIChE Meeting.
Gilron, et al., "Effects of Surface Modification on Antifouling and Performance Properties of Reverse Osmosis Membranes," Desalination, 140:167-179 (2001).
Goosen, et al., "Fouling of Reverse Osmosis and Ultrafiltration Membranes: A Critical Review," *Separation Science and Technology*, 39(10):2261-2297 (2004).
MWH, "Water Treatment Principles and Design," Second ed. 2005, Hoboken: John Wiley & Sons. 1448.
Hammond, P.T., "Recent Explorations in Electrostatic Multilayer Thin Film Assembly," Current Opinion in Colloid & Interface Science, 4:430-442 (1999).
Hirose, et al., Effect of skin layer surface structures on the flux behaviour of RO membranes, *J. Membrane Sci*, 121(2):209-215 (1996).
Hoek, et al., "Cake-Enhanced Concentration Polarization: A New Mechanism of Fouling for Salt Rejecting Membranes," Environmental Science and Technology, 37(24):5581-5588 (2003).
Hoek, "Colloidal fouling mechanisms in reverse osmosis and nanofiltration," in: *Chem. Eng.*, Yale University: New Haven, CT. p. 207 (2002).
Hoek, et al., "Effect of Membrane Surface Roughness on Colloid-Membrane DLVO Interactions," *Langmuir*, 19:4836-4387 (2003).
Hoek, et al., "Influence of Crossflow Membrane Filter Geometry and Shear Rate on Colloidal Fouling in Reverse Osmosis and Nanofiltration Separations," Environmental Engineering Science, 19:357-373 (2002).
Hong, et al., "Chemical and Physical Aspects of Natural Organic Matter (nom) Fouling of Nanofiltration Membranes," Journal of Membrane Science, 132:159-181 (1997).
Jeong, et al., "Hydrophilic and Antibiotic RO Membranes for Wastewater Reclamation", American Water Works Association, Membrane Technology Conference, presented Mar. 9, 2005.
Jeong, et al., "Nanoparticles for hydrophilic and Antimicrobial surface coatings," (Abstract) 2006 AIChE Annual Meeting.
Jeong, et al., "Synthesis and characterization of TFC membranes for water reuse," (Abstract) Prepared for the 2006 AIChE Annual Meeting.
Jia, et al., "Moleculare sieving effect of the zeolite-filled silicone rubber membranes in gas permeation," *Journal of Membrane Science*, 57:289-296 (1991).
Jons, et al., "Porous Latex Composite Membranes: Fabrication and Properties," Journal of Membrane-Science, 155:79-99 (1999).
Jonsson, "The influence of pressure in the compaction of asymmetric cellulose acetate membranes, in Delyannis and Delyannis in 6th International Symposium in Fresh Water from Sea," Athens (1978).
Jonsson, "Methods for determining the selectivity of reverse osmosis membranes," Desalination, 24:19-37 (1978).
Kabsch-Korbutowicz, et al., "Analysis of membrane fouling in the treatment of water solutions containing humic acids and mineral salts," *Desalination*, 126:179-185 (1999).
Kang, et al., "Direct Observation of Biofouling in Cross-flow Microfiltration: Mechanisms of Deposition and Release," Journal of Membrane Science, 244:151-165 (2004).
Khedr, "Development of reverse osmosis desalination membranes composition and configuration: future prospects," Desalination, 153:295-304 (2002).
Kim, et al., "The changes of membrane performance with polyamide molecular structure in the reverse osmosis process," *Journal of Membrane Science*, 165(2):189-199 (2000).
Kim, et al., "Design of $TiO_2$ Nanoparticle Self-Assembled Aromatic Polyamide Thin-Film-Composite (TFC) membrane as an approach to solve Biofouling Problem," Journal of Membrane Science, 211:157-165 (2003).
Kim, et al., "Preparation of Fouling Resistant Nanofiltration and Reverse Osmosis Membranes and Their Use for Dyeing Wastewater Effluent," Journal of Industrial and Engineering Chemistry, 10:115-121 (2004).
Kim, et al., "Preparation of interfacially synthesized and silicone coated composite polyamide nanofiltration membranes with high performance," *Industrial & Engineering Chemistry Research*, 41(22):5523-5528 (2002).
Klepetsaniis, et al., "Precipitation of calcium sulfate dihydrate at constant calcium activity," *Journal of Crystal Growth*, 98:480-486 (1989).
Kurihara, et al., "Development of cross-linked fully aromatic polyamide ultra-thin composite membranes for seawater desalination," *Desalination*, 96(1-3):133-143 (1994).
Kwak, et al., "Details of surface features in aromatic polyamide reverse osmosis membranes characterized by scanning electron and atomic force microscopy," *Journal of Polymer Science Part B-Polymer Physics*, 37(13):1429-1440 (1999).
Kwak, et al, "Hybrid Organic/Inorganic Reverse Osmosis (RO) Membrane for Bactericidal Anti-Fouling/Preparation and Characterization of TiO2 Nanoparticle Self-Assembled Aromatic Polyamide Thin-Film-Composite (TFC) Membrane," Environmental Science and Technology, 35:2388-2394 (2001).
Kwak, et al., "Relationship of Relaxation Property to Reverse Osmosis Permeability in Aromatic Polyamide Thin-Film-Composite Membranes," Polymer, 40:6361-6368 (1999).
Kwak, et al., "Structure-motion-performance relationship of flux-enhanced reverse osmosis (RO) membranes composed of aromatic polyamide thin films," *Environmental Science & Technology*, 35(21): 4334-4340 (2001).
Kwak, et al., "Use of Atomic Force Microscopy and Solid-State NMR Spectroscopy to Characterize Structure-Property-Performance Correlation in High-Flux Reverse Osmosis (RO) Membranes," Journal of Membrane Science, 158:143-153 (1999).
Lang, et al., "Preparation and Testing of Polyvinyl-Alcohol Composite Membranes for Reverse-Osmosis," Canadian Journal of Chemical Engineering, 73:686-692 (1995).
Lang, et al., "Reverse-Osmosis Performance of Modified Polyvinyl-Alcohol Thin-Film Composite Membranes," Journal of Colloid and Interface Science, 166:239-244 (1994).
Lang, et al., "A Study on the Preparation of Polyvinyl Alcohol Thin-Film Composite Membranes and Reverse Osmosis Testing," Desalination, 104:185-196 (1996).

Lee, et al., "Effect of operating conditions on CaSO4 scale formation mechanism in nanofiltration for water softening," *Water Research*, 34(15):3854-3866 (2000).

Lemanski, et al., "Effect of shell-side flows on the performance of hollow-fiber gas separation modules," *Journal of Membrane Science*, 195:215 (2002).

Li, et al., "The Impact of Ultraviolet Light on Bacterial Adhesion to Glass and Metal Oxide-Coated Surface," Colloids and Surfaces B-biointerfaces, 41:153-161 (2005).

Li, et al., "Organic Fouling and Chemical Cleaning of Nanofiltration Membranes: Measurements and Mechanisms," Environmental Science & Technology, 38:4683 (2004).

Lobo, "Handbook of Zeolite Science and Technology," ed. P.K. Dutta, New York: Marcel Dekker, Inc. 65-66 (2003).

Lohokare, et al., "Effect of support material on ultrafiltration membrane performance," *Journal of Applied Polymer Science*, 99(6):3389-3395 (2006).

Ma, et al., "Membrane Fouling Reduction by Backpulsing and Surface Modification," Journal of Membrane Science, 173:191-200 (2000).

Ma, et al., "Membrane Surface Modification and Backpulsing for Wastewater Treatment," Separation Science and Technology, 36:1557-1573 (2001).

Mahendran, et al., "Preparation, characterization and effect of annealing on performance of cellulose acetate/sulfonated polysulfone and cellulose acetate/epoxy resin blend ultrafiltration membranes," *European Polymer Journal*, 40:623-633 (2004).

Malaisamy, et al., "Polyurethane and sulfonated polysulfone blend ultrafiltration membranes I. Preparation and characterization studies," *Journal of Colloid and Interface Science*, 254:129-140 (2002).

Marchin, et al., "Effect of Microgravity on *Escherichia coli* and MS-2 Bacteriophage Disinfection by Iodinated Resins," 40:65-68 (1997).

Mark, "Ceramic reinforced polymers and polymer-modified ceramics," *Polymer Engineering Science*, 36:2905-2920 (1996).

McDonnell, et al., "Hydrophilic and Antimicrobial Zeolite Coatings for Gravity-Independent Water Separation," *Advanced Functional Materials*, 15:336-340 (2005).

Mulder, M., "Basic Principles of Membrane Technology," Kluwer Academic Publishers, Second ed. (1996).

Nygaard, et al., "Mechanisms and control of irreversible fouling in commercial and nano-structured RO/NF membranes," (Abstract) 2006 AIChE Annual Meeting.

Ochoa, et al., "Effect of hydrophilicity on fouling of an emulsified oil wastewater with PVDF/PMMA membranes," *Journal of Membrane Science*, 226:203-211 (2003).

Okazaki, et al., Scale formation on reverse osmosis membranes. *Journal of Chemical Engineering of Japan*, 17(2):145-151 (1984).

Orelovitch, et al., "Preparation of porous polymer samples for SEM: combination of photo oxidation degradation with a freeze fracture technique," *Materials Chemistry and Physics*, 81:349-351 (2003).

Perepelkin, "Inverse evaluation of the integral ordering of the structure and defectiveness of fibres and yarns for technical applications based on normalized values of the mechanical properties," *Fibre Chemistry*, 28(5):326-335 (1996).

Persson, et al., "Study of membrane compaction and its influence on ultrafiltration water permeability," *Journal of Membrane Science*, 100:155-162 (1995).

Pervov, "Scale formation prognosis and cleaning procedure schedules in reverse osmosis systems operation," *Desalination*, 83:77-118 (1991).

Petersen, "Composite Reverse-Osmosis and Nanofiltration Membranes," *Journal of Membrane Science*, 83(1):81-150 (1993).

Prabhaker, et al., "Studies on the structural, kinetic and thermodynamic parameters of cellulose acetate membranes," *Journal of Membrane Science*, 29:143-153 (1986).

Rabiller-Baudry, et al., "Application of a Convection-Diffusion-Electrophoretic Migration Model to Ultrafiltration of Lywoyme at Different pH Values and Ionic Strengths", Journal of Membrane Science, 179:163-174 (2000).

Rao, et al., "Interfacially Synthesized Thin Film Composite RO membranes for Seawater Desalination", *Journal of Membrane Science*, 124(2):263-272 (1997).

Rao, et al., "Structure-performance correlation of polyamide thin film composite membranes: effect of coating conditions on film formation," *Journal of Membrane Science*, 211(1):13-24 (2003).

Reynaud, et al., "Nanophase in polymers," *Rev. Metall /Cah. Inf. Tech.*, 96:169-176 (1999).

Roh, et al., "Effects of the polyamide molecular structure on the performance of reverse osmosis membranes," *Journal of Polymer Science Part B-Polymer Physics*, 36(11):1821-1830 (1998).

Rong, et al., "Structure-property relationships of irradiation grafted nano-inorganic particle filled polypropylene composites," *Polymer*, 42:167-183 (2001).

Rowsell, et al. Metal-organic frameworks: A new class of porous materials, *Micro- and Mesoporous Mater.*, 73:3-14 (2004).

Sanden, et al., "Bactericidal activities of tri- and penta-iodinated resins against *Legionella pneumophila*," *Wat Res.*, 26:365-370 (1992).

Sawyer, et al., "Basic Concepts from Colloid Chemistry, in Chemistry for Environmental Engineering and Science," McGraw-Hill: New York City, p. 360-373 (2002).

Sedlak, et al., "Understanding Microcontaminants in Recycled Water", *Am Chem Soc*, 34:508A-515A (2000).

Sivakumar, et al., "Preparation and performance of cellulose acetate polyurethane blend membranes and their applications II," *Journal of Membrane Science*, 169:215-228 (2000).

Sivakumar, et al., "Studies on cellulose acetate-polysulfone ultrafiltration membranes II. Effect of additive concentration," *Journal of Membrane Science*, 268:208-219 (2005).

Sivakumar, et al., "Ultrafiltration application of cellulose acetate polyurethane blend membranes," *European Polymer Journal*, 35:1647-1651 (1999).

Stern, et al., "Helium Recovery by Permeation," *Ind. Eng. Chem.*, 57:49 (1965).

Suleiman, et al., "Analysis of an RO plant to remedy the water shortage in the rural area of Damascus," *Desalination*, 177:281-289 (2005).

Tansel, et al., "Characterization of fouling kinetics in ultrafiltration systems by resistances in series model," *Desalination*, 129:7-14 (2000).

Tamawski, et al., "Estimation of compaction and fouling effects during membrane processing of cottage cheese whey," *Journal of Food Engineering*, 5:75-90 (1986).

Tay, et al., "Nonlinear behavior of permeate flux in full-scale reverse osmosis processes," *Journal of Environmental Engineering*, 131(11):1481-1487 (2005).

Tian, L., et al., "A historical opportunity: economic competitiveness of seawater desalination project between nuclear and fossil fuel while the world oil price over $50 per boe-part A: MSF," *Desalination*, 183:317-325 (2005).

Troup, et al., "Scale nucleation on a heat transfer surface and its prevention," *Chemical Engineering Commun.*, 2:167-180 (1978).

Uragami, et al., "Studies on Syntheses and Permeabilities of Special Polymer Membranes. 28. Permeation Characteristics and Structure of Interpolymer Membranes from Poly(vinylidene fluoride) and Poly(styrene sulfonic acid)," *Desalination*, 34:311-323 (1980).

Van Gauwbergen, et al., "Modeling of scaleup of reverse osmosis separation," *Environmental Engineering Science*, 19:37-45 (2002).

Velikova, et al., "Comparative evaluation of industrial membranes: correlation between transport and operational parameters," Desalination, 94:1-10 (1993).

Von Werne, et al., "Preparation of structurally well defined polymer-nanoparticle hybrids with controlled/living radical polymerization," *Journal of American Chemical Society*, 121:7409-7410 (1999).

Vrijenhoek, et al., "Influence of Membrane Surface Properties on Initial Rate of Colloidal Fouling of Reverse Osmosis and Nanofiltration Membranes," Journal of Membrane Science, 188:115 (2001).

Walker, et al., "A novel asymmetric clamping cell for measuring streaming potential of flat surfaces," *Langmuir*,18(6):2193-2198 (2002).

Wang, et al., "Direct Observation of Microbial Adhesion to Membranes," Environmental Science & Technology, 39:6461-6469 (2005).

Wang, et al., "Homogeneous Polymer-Zeolite Nanocomposite Membranes by Incorporating Dispersible Template-Removed Zeolite Nanocrystals," Journal of Materials Chemistry, 12:3640-3643 (2002).

Wang, et al., "Nafion-bifunctional Silica Composite Proton Conductive Membranes", The Royal Society of Chemistry, 12:834-837 (2002).

Winters, "Control of Organic Fouling at Two Seawater Reverse Osmosis Plants," *Desalination*, 66:319-325 (1987).

Xing, et al., "Fouling and cleaning in an ultrafiltration membrane bioreactor for municipal wastewater treatment," *Separation Science and Technology*, 38:1773-1789 (2003).

Xu, et al., "Synthesis of Nanoscale Bimetallic Particles in Polyelectrolyte Membrane Matrix for Reductive Transformation of Halogenated Organic Compounds," Journal of Nanoparticle Research, 7:449-467 (2005).

Ye, et al., "Influences of porosity on Mechanical and wear performance of pseudoelastic TiNi-matrix composites," Journal of Materials Engineering and Performance, 10(2):178-185 (2001).

Zhang, et al., "Development and characterization of composite nanofiltration membranes and their application in concentration of antibiotics," *Separation and Purification Technology*, 30(1):27-35 (2003).

Zhu, et al., "Colloidal Fouling of Reverse Osmosis Membranes: Measurements and Fouling Mechanisms," Env Sci Tech, 31:3654-3662 (1997).

Non Final Office Action issued on Mar. 29, 2011 for U.S. Appl. No. 11/364,885 (Inventor-Hoek et al.).

* cited by examiner

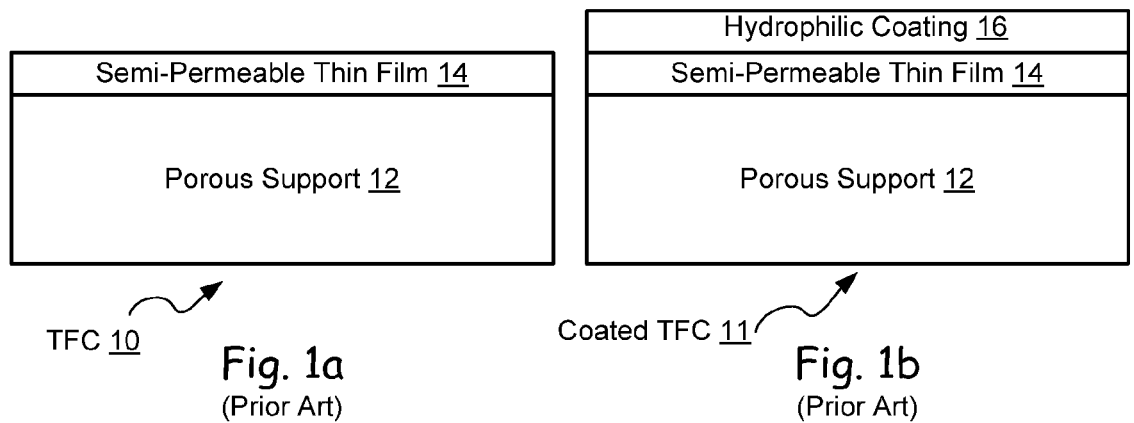
Fig. 1a (Prior Art)
Fig. 1b (Prior Art)
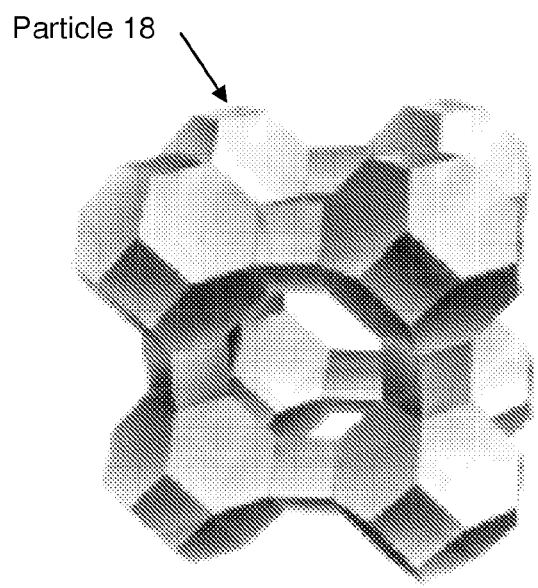
FIGURE 2A
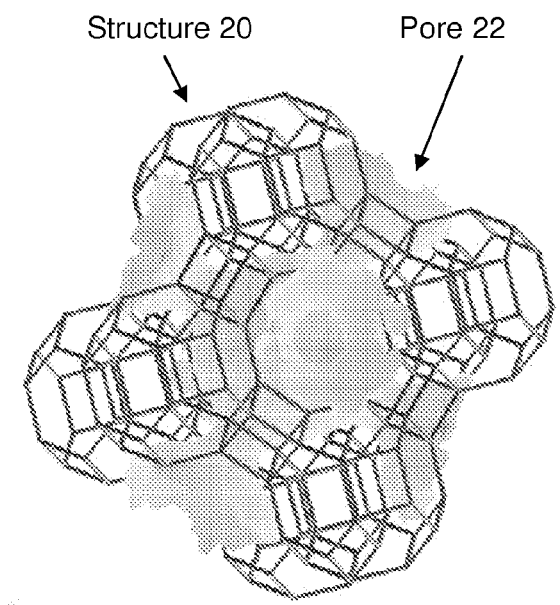
FIGURE 2B

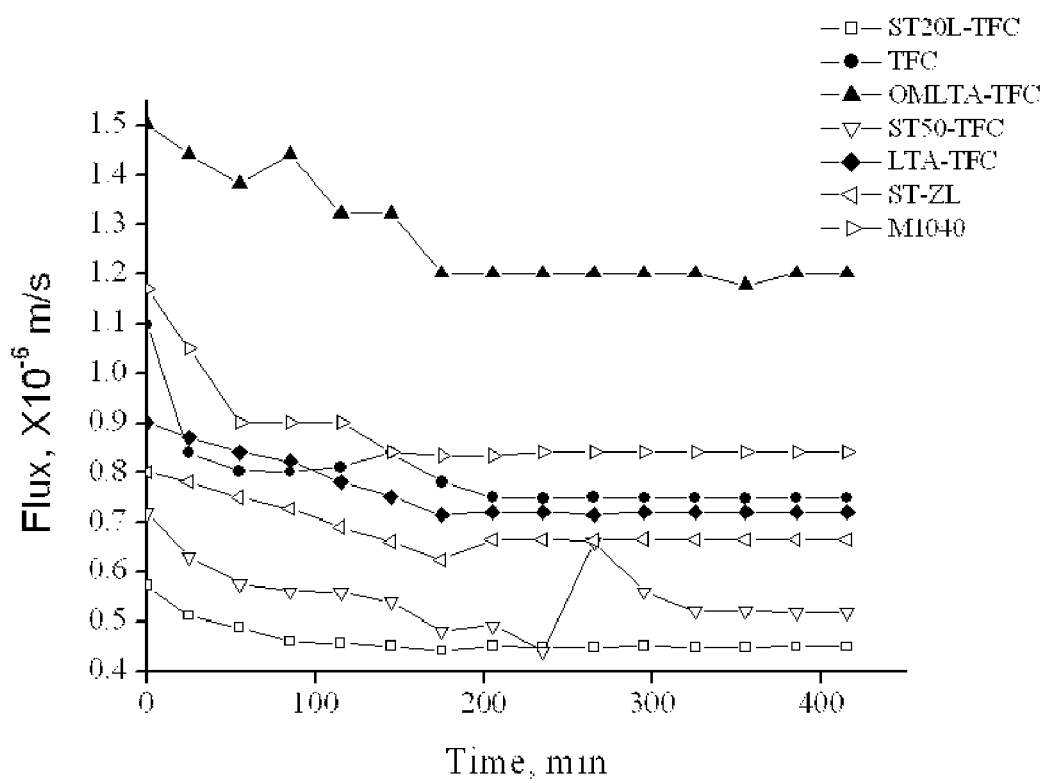
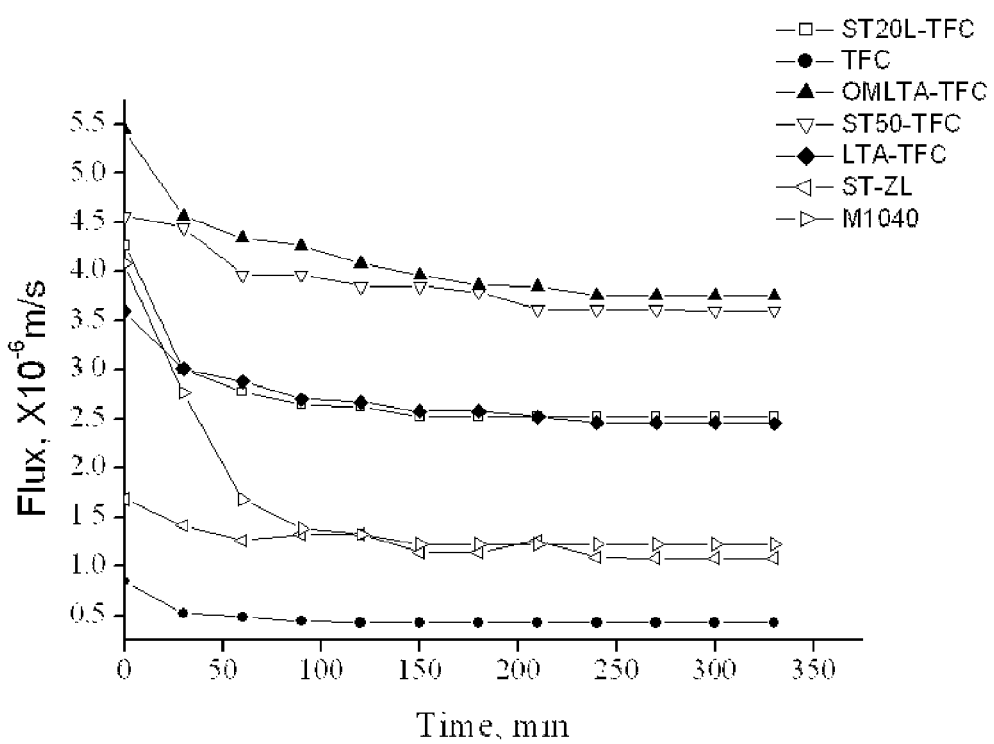
FIGURE 6A, B

Key:
H/C-recirculating heater/chiller
FT-feed tank
BPV-by-pass valve
BPR-back-pressure regulator
FM-digital flow meter (permeate flow rate)
RM-floating disk rotameter (cross flow rate)

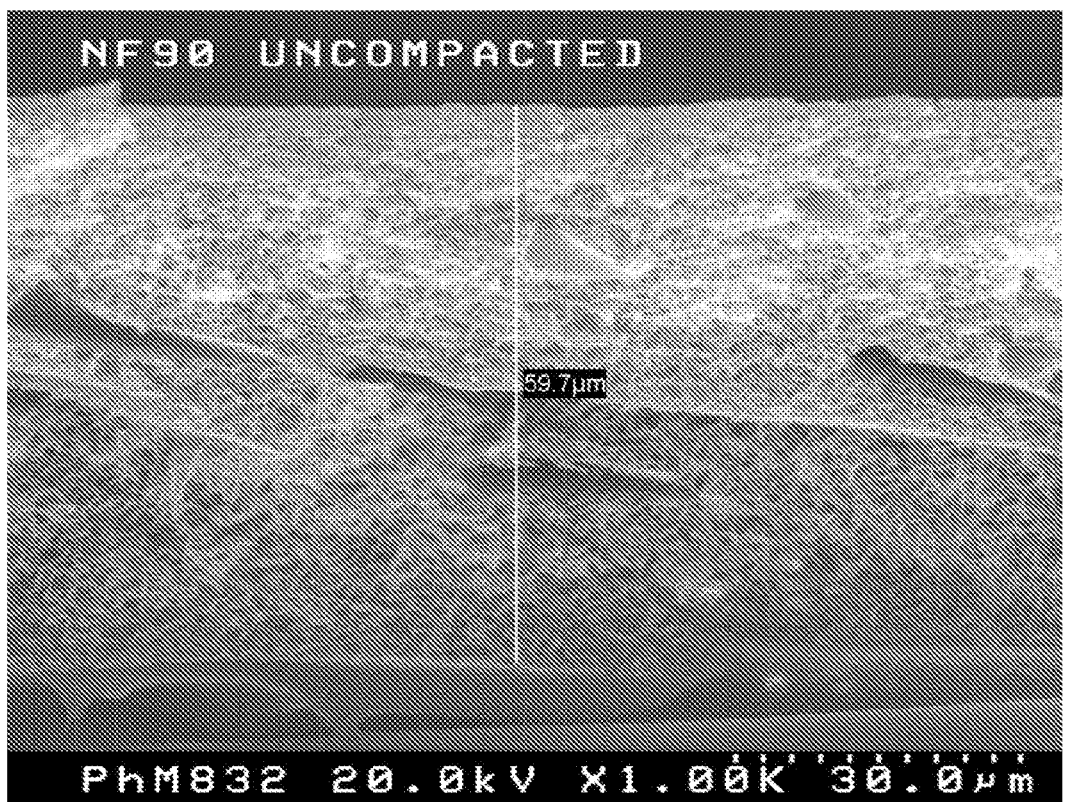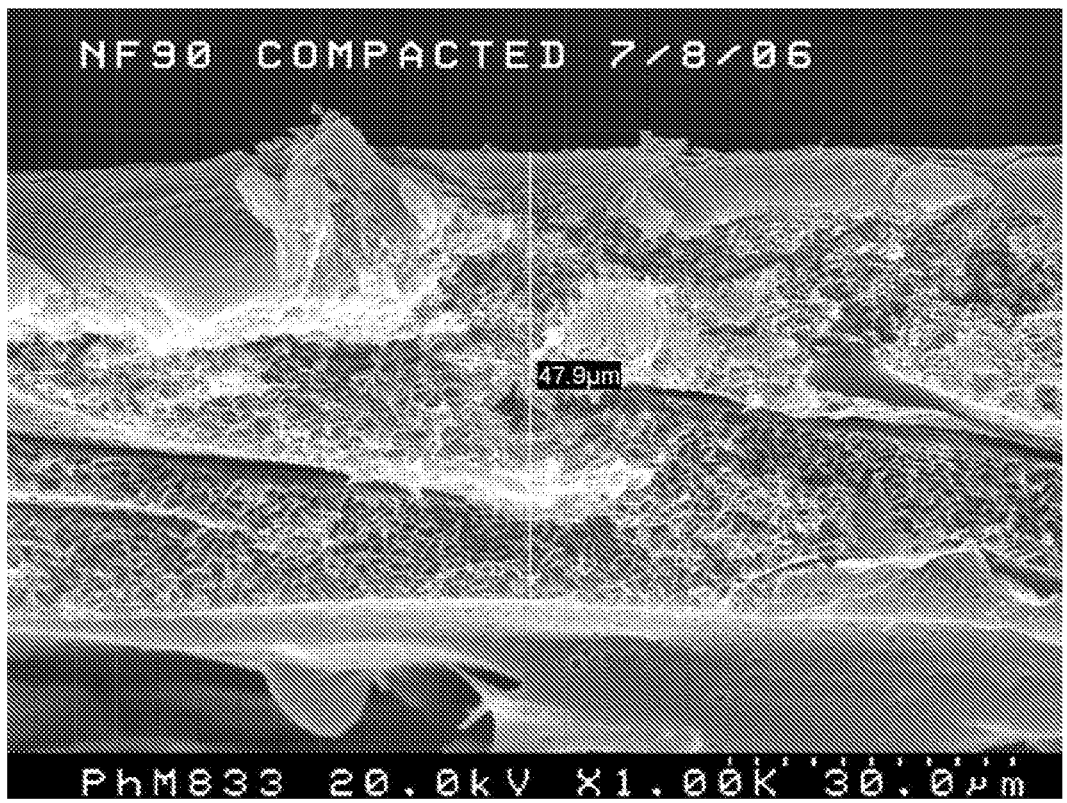
FIGURE 11A, B

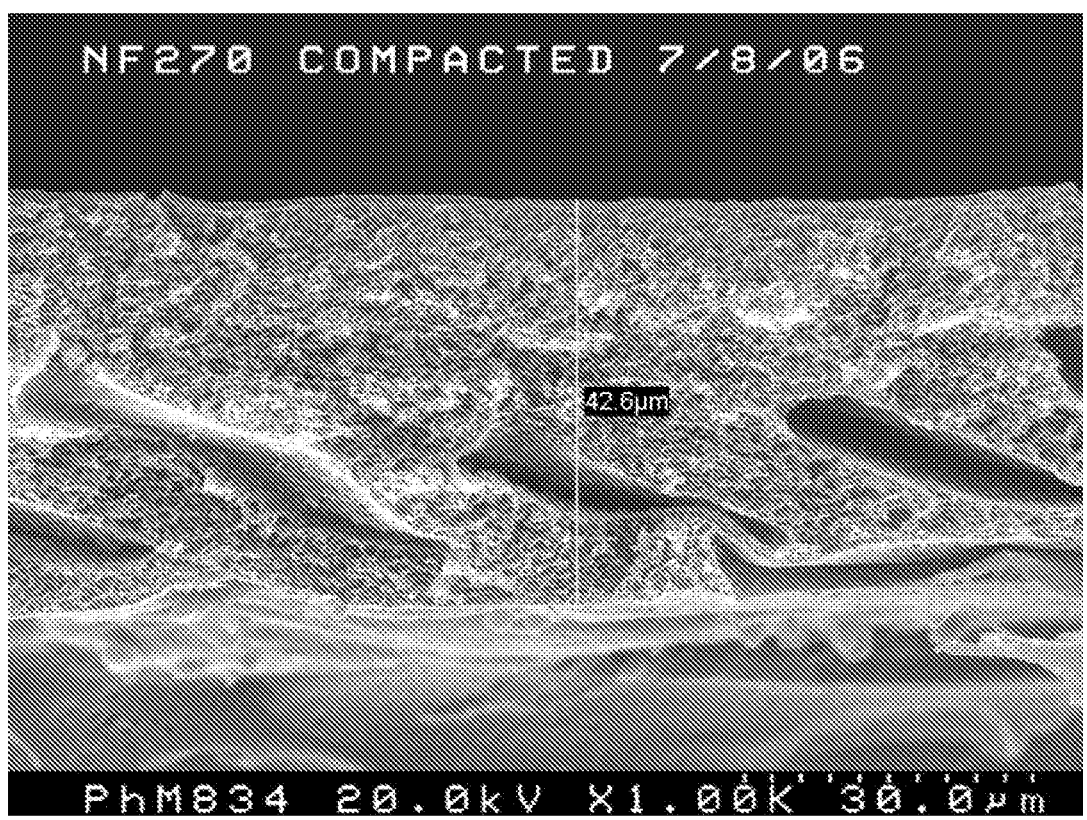
FIGURE 12A, B

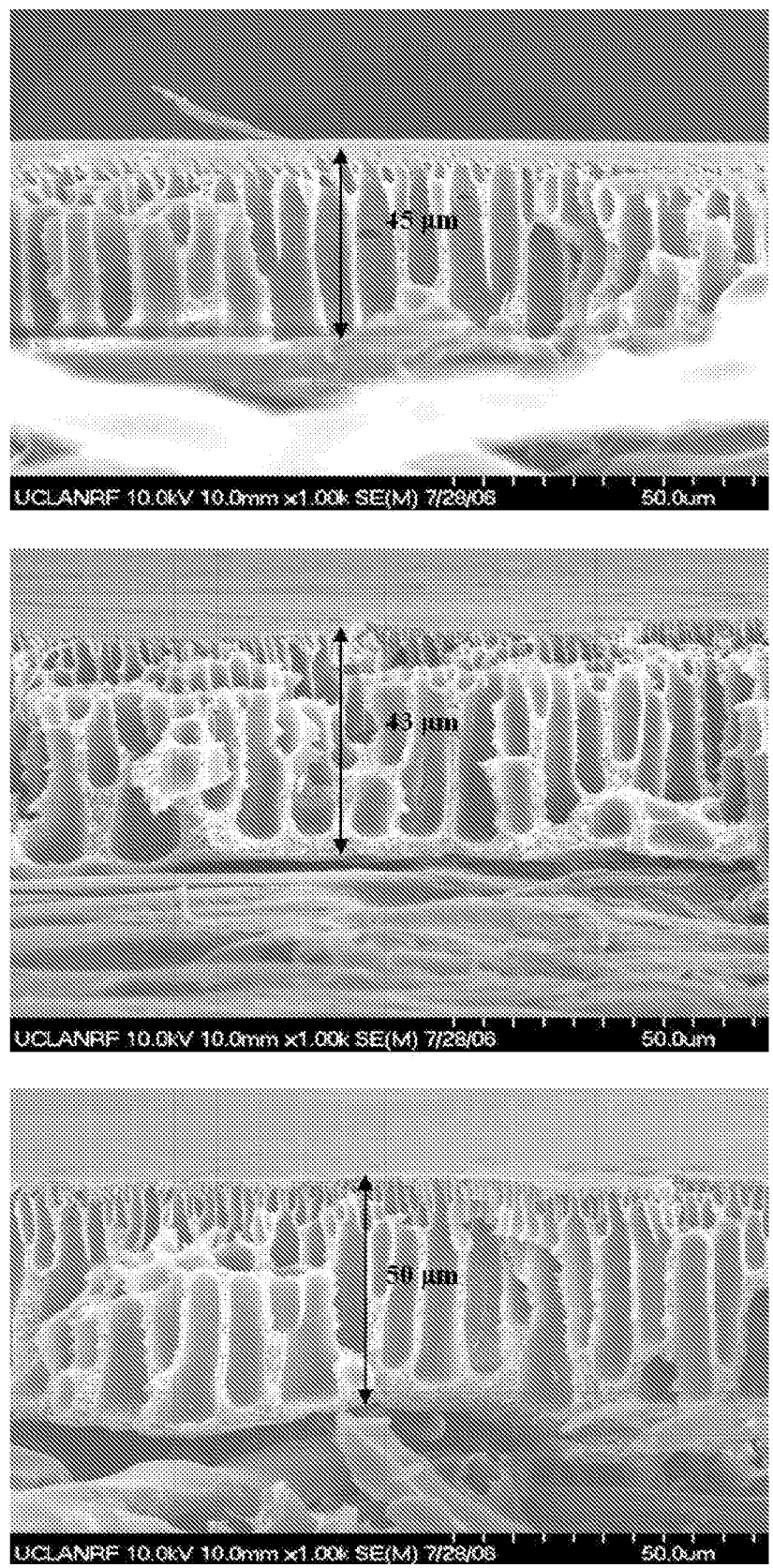
FIGURE 13A-C

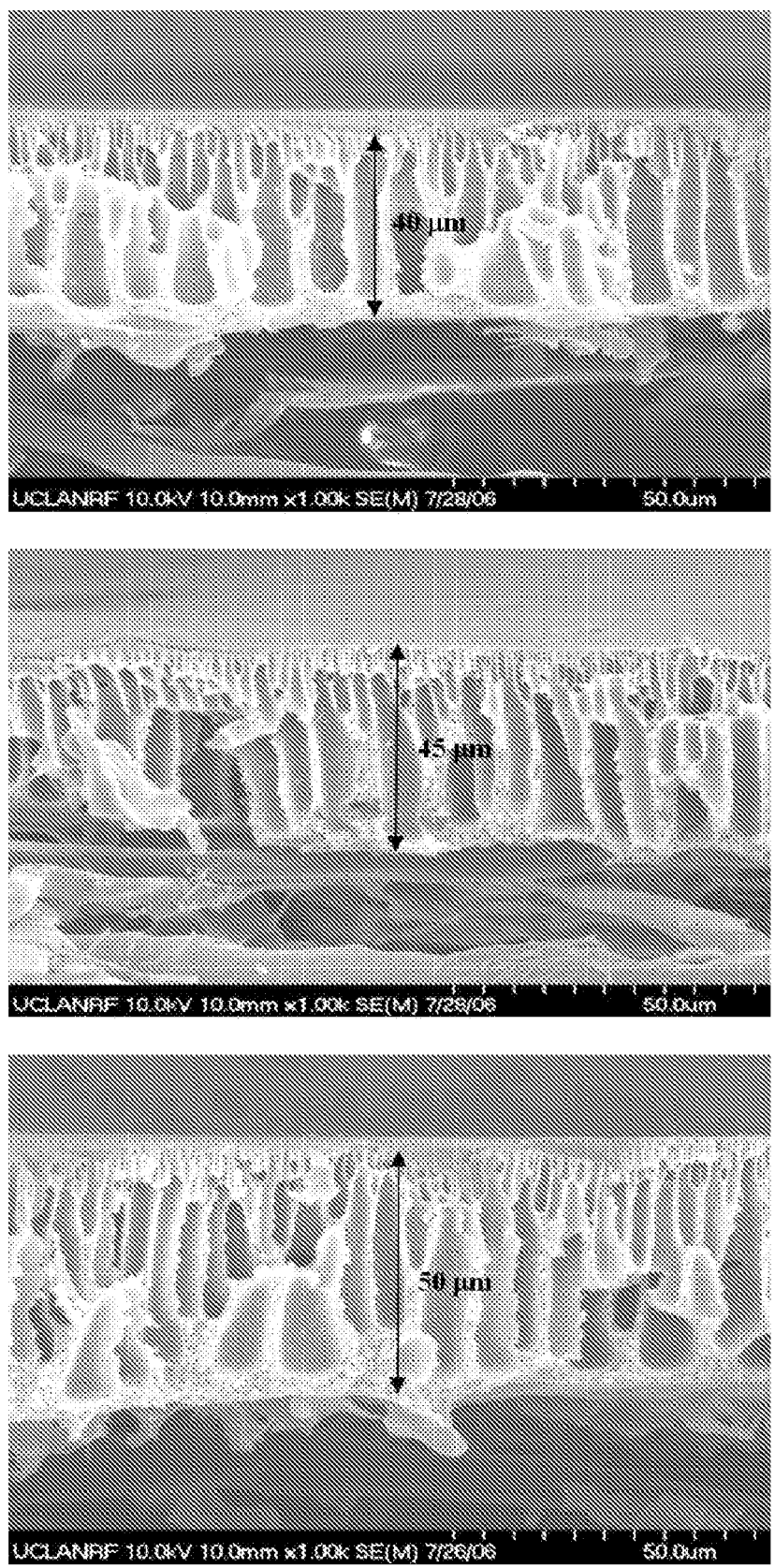
FIGURE 14A-C

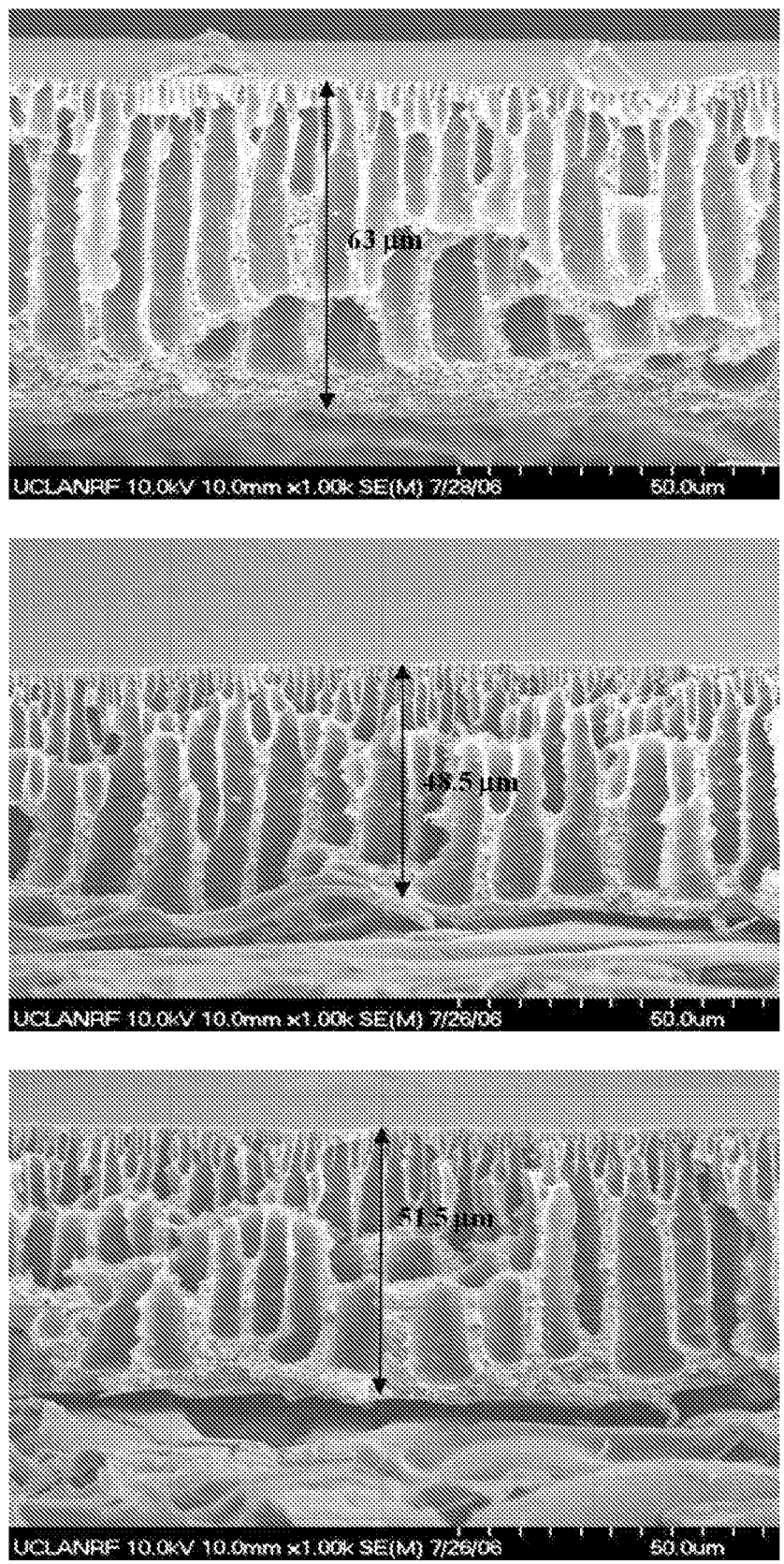
FIGURE 15A-C

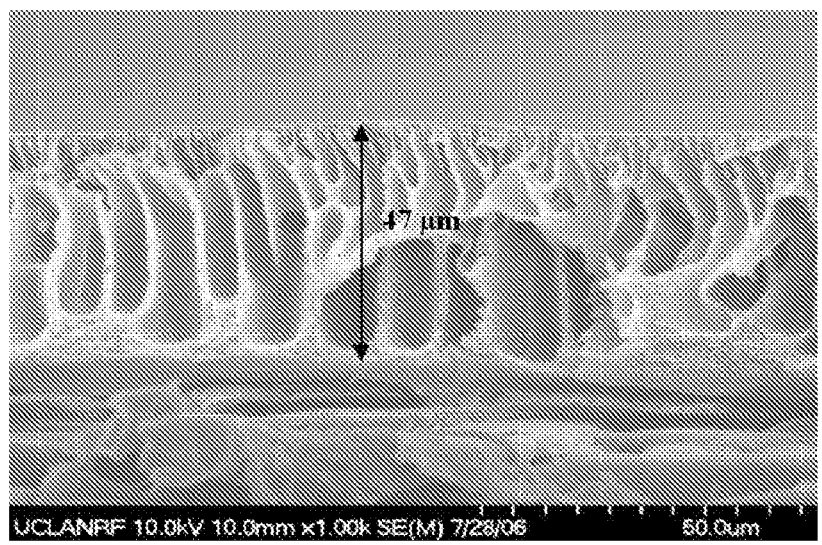
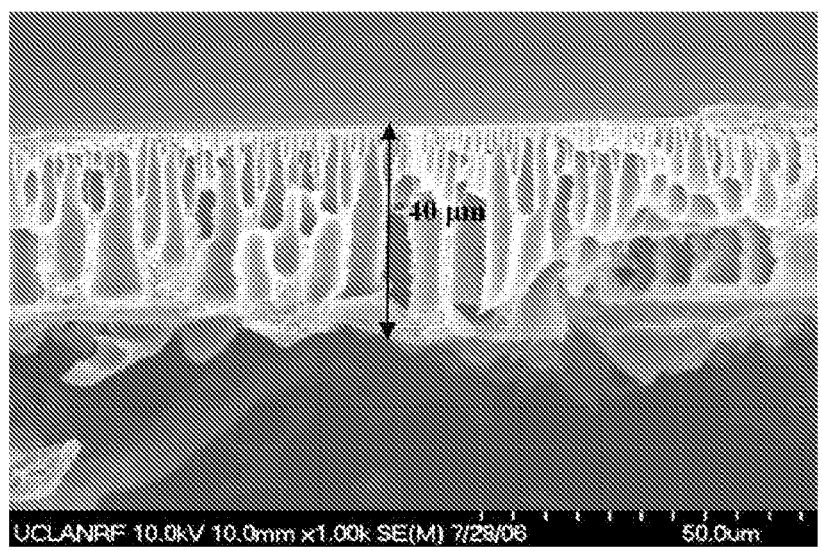
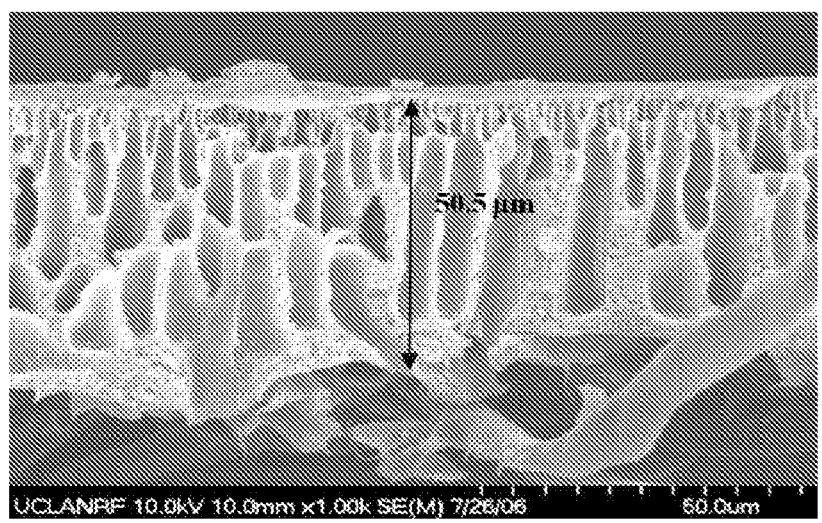
FIGURE 16A-C

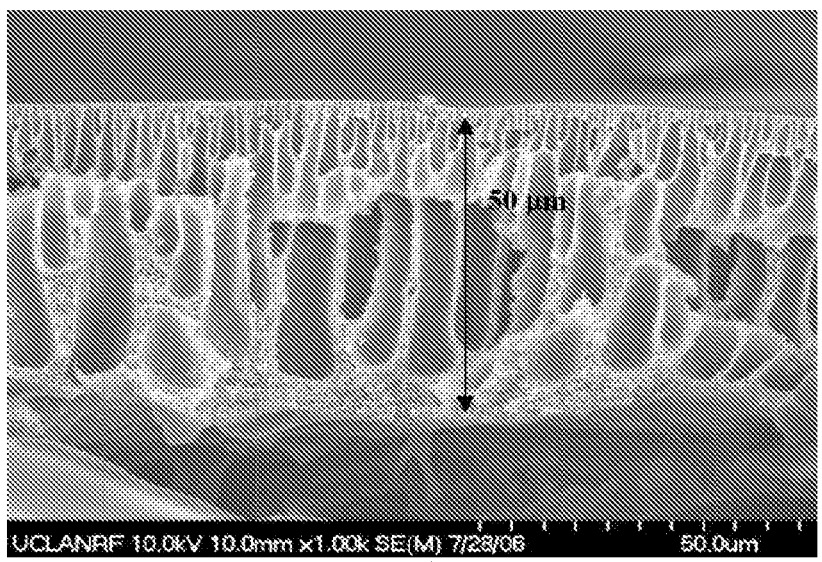
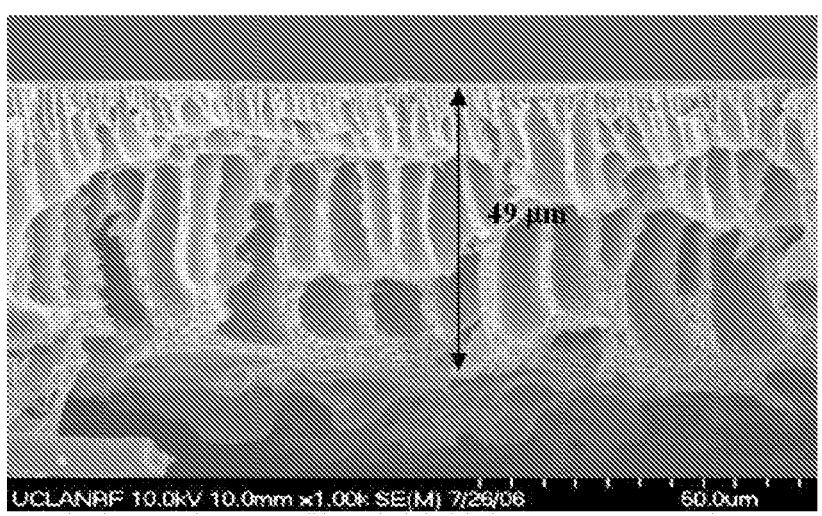
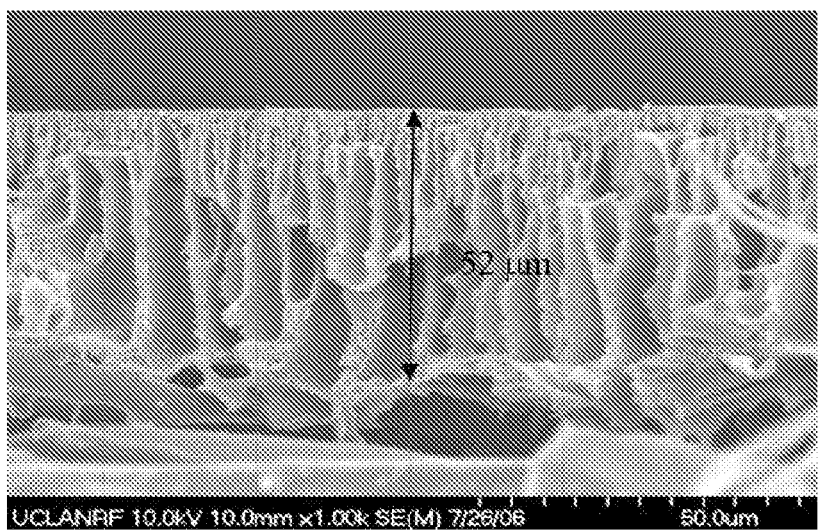
FIGURE 17A-C

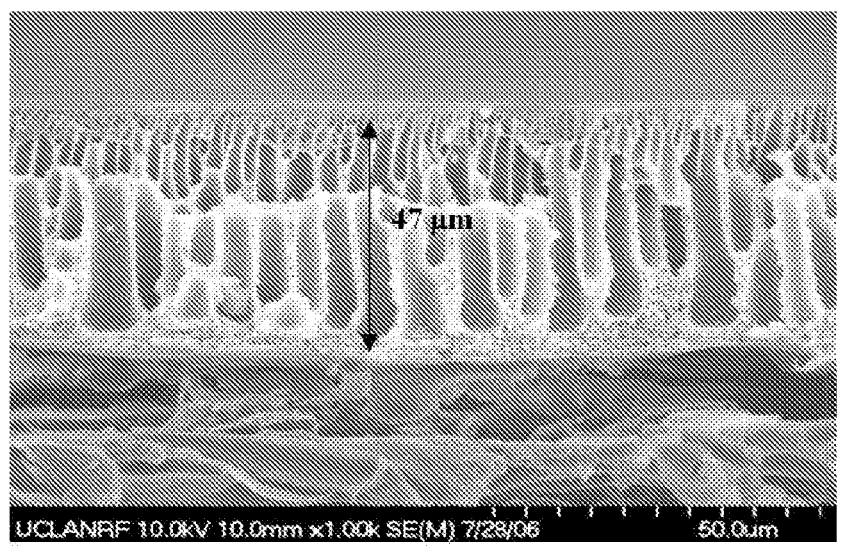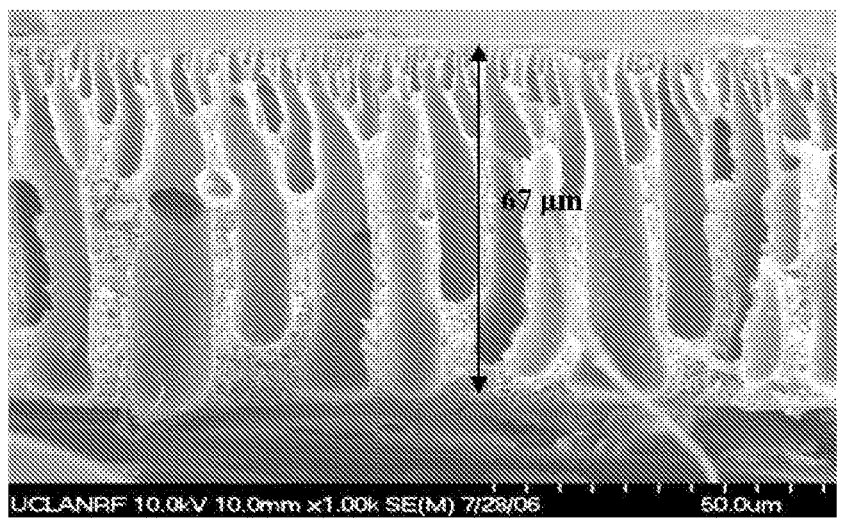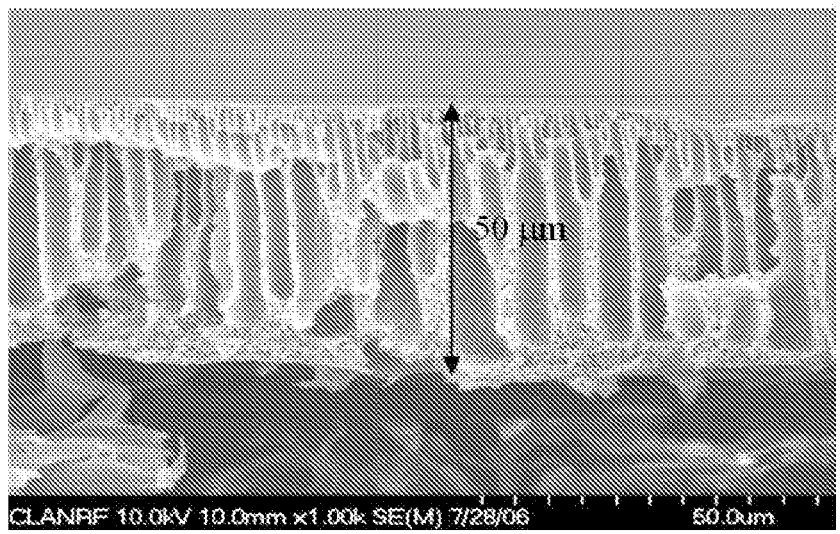
FIGURE 18A-C

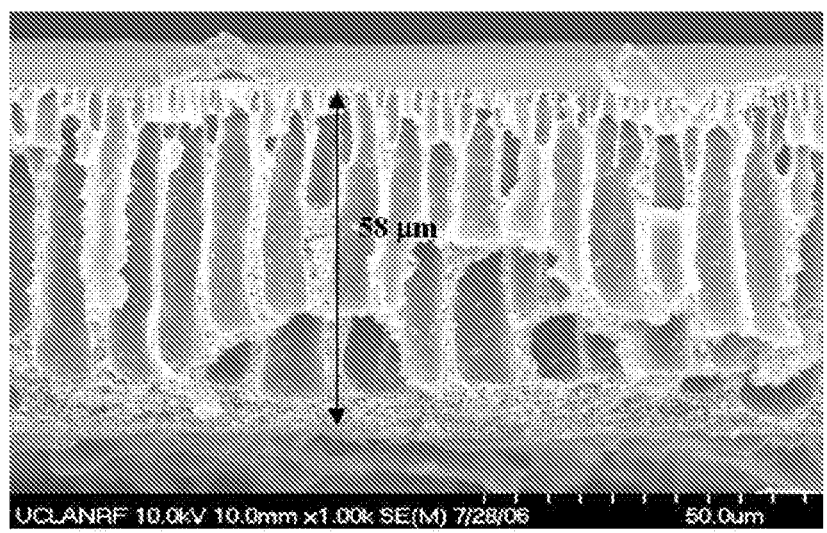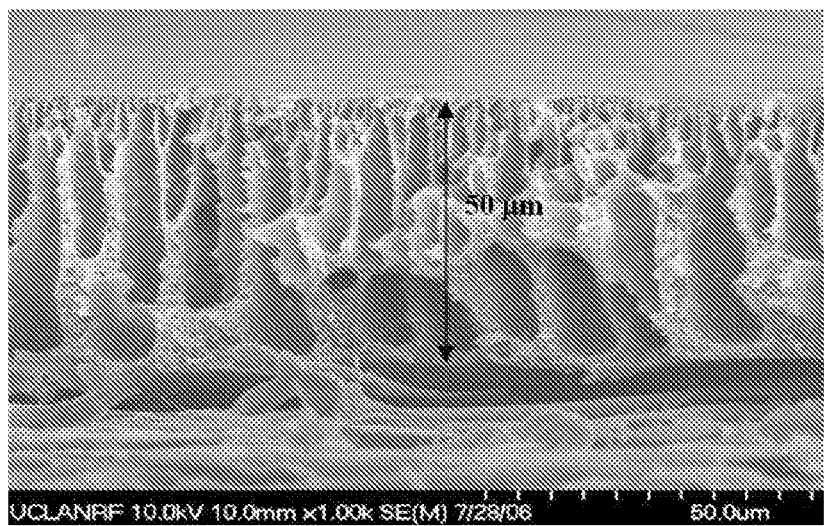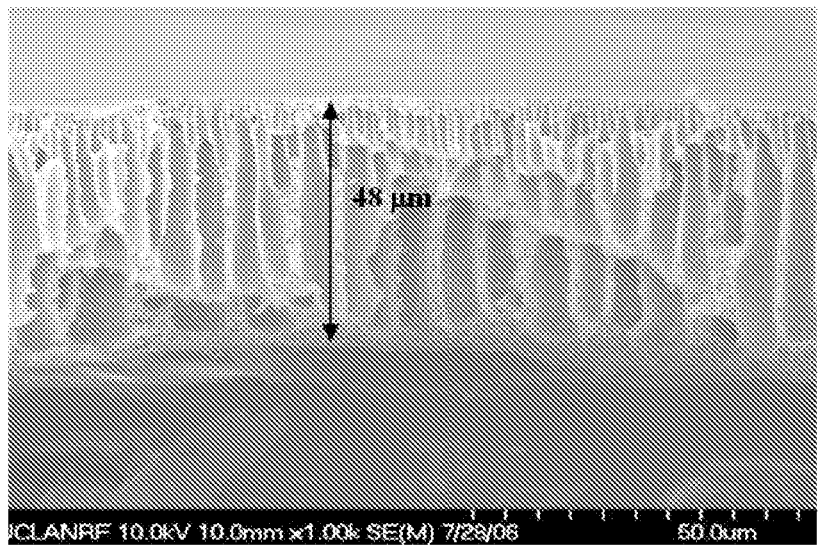
FIGURE 19A-C

MICRO-AND NANOCOMPOSITE SUPPORT STRUCTURES FOR REVERSE OSMOSIS THIN FILM MEMBRANES

CROSS-REFERENCE TO RELATED APPLICATIONS

This application claims the benefit of U.S. Application No. 60/863,156, filed Oct. 27, 2006, which is hereby incorporated herein by reference in its entirety.

BACKGROUND

At elevated feed water pressures, polymeric filtration membranes can be damaged internally by what can be referred to as "internal fouling." Elevated pressures can become necessary for reverse osmosis (RO) membrane processes to overcome the effects of internal fouling in order to maintain water flux flow rates. Further increases of applied pressure can be required with time due to fouling for example by contaminants which occur on the membrane surface and may be considered "external" or surface fouling. Surface fouling, and the resulting higher operating pressures required to maintain a desired flux may lead to additional internal fouling, of the membrane. Such increased internal fouling, in turn, can require even higher operating pressures to achieve a desired flux. Although surface deposits that lead to elevated operating pressure can be removed by physical and chemical cleaning methods, internal fouling due to high pressure physical compaction cannot be reversed. Such irreversible fouling of RO membranes can also lead to higher long-term operating cost and energy consumption.

For example, conventional RO membranes typically exhibit a first or initial permeate flow rate at a first applied pressure which decreases with time as internal fouling occurs, typically in a matter of days or hours, to a lower permeate flow rate at the same applied pressure until a generally steady state permeate flow is achieved. After the steady state permeate flow rate is achieved, the flux flow rate may further decline as a result of external fouling. Most or all of the reduced flux flow may be resulting from external fouling may be recovered by various cleaning processes which typically remove the surface contaminants. As a result, whether applied pressure is increased to maintain a desired permeate flow in light of internal and external fouling, or the applied pressure is maintained constant and the permeate flow rate allowed to decrease from an initial state to a steady state due to irreversible internal fouling and further due to reversible, or at least partially reversible external fouling, fouling is a major operating problem for conventional membranes such as RO membranes.

Therefore, there remains a need for methods and compositions that overcome these deficiencies and that effectively provide for membranes having improved membrane resistance to internal and/or external fouling and improved or reduced water flux decline over time from initial to steady state conditions, while maintaining satisfactory water permeability and solute rejection.

SUMMARY

As embodied and broadly described herein, in one aspect a thin film composite membrane can include a porous polymeric support, a semi-permeable polymer film polymerized on the porous polymeric support and particles, of a size in the range of microparticles and nanoparticles, dispersed in the porous polymeric support in an amount of at least about 1% by weight of the porous polymeric support.

The semi-permeable polymer film can be permeable to a liquid, the thin film composite membrane exhibiting an initial flux flow rate of the liquid which decreases over time to a reasonably steady state flux flow rate, the decrease between initial and steady state flux flow rates being in the range of from about 10% to about 50% less than a decrease between initial and steady state flux flow rates for the liquid through a comparable thin file composite membrane having an otherwise comparable porous polymeric support without the particles dispersed therein.

The semi-permeable polymer film can be an interfacially-polymerized, semi-permeable polyamide film matrix. The particles can be at least one of metal or metal oxide particles, amorphous or crystalline inorganic particles, particles of silica, alumina, clay or zeolites or carbon black particles and or Linde Type A (LTA) zeolite particles. A compaction resistant membrane can include a cast porous polymeric support, a semi-permeable polymer film polymerized on the cast porous polymeric support and particles, of a size in the range of microparticles and nanoparticles, dispersed in a polymer before casting to form the porous polymeric support, the dispersal of the particles in the polymer decreasing compaction of the resultant porous polymeric support during use over a comparable cast support without the particles.

The compaction resistant membrane can exhibit a reduction of thickness of less than about 20% between initial and steady state flux flow rates at about 500 psi. The membrane can include a semi-permeable polymer film comprising a semi-permeable, interfacially-polymerized polyamide matrix. The particles comprise at least one zeolite. The particles can be selected so that the membrane exhibits a tensile strength greater than that of a comparable membrane having an otherwise comparable porous polymeric support without the particles.

A membrane permeable to a liquid at a first pressure at an initial flow rate which decreases over time to a generally steady state condition at a lower, steady state flow rate of the liquid can include a polymeric support permeable to the liquid, a semi-permeable polymer film, permeable to the liquid, polymerized on the polymeric support and particles, of a size in the range of microparticles and nanoparticles, dispersed in the polymeric support, the decrease between the initial and steady flow rates of the membrane being less than a decrease between initial and steady state flow rates of a comparable membrane having a comparable polymeric support without the particles dispersed therein.

The semi-permeable polymer film can be an interfacially-polymerized polyamide matrix. The particles can be inorganic. The particles can be Linde Type A zeolite, commonly referred to as LTA. The particles can be selected so that the polymeric support exhibits a tensile strength greater than the comparable polymeric support without the particles.

A method of making a semi-permeable membrane can include polymerizing a polymer matrix film on a cast porous polymeric support with particles of a size in the range of microparticles and nanoparticles dispersed therein, the particles having been selected to improve flux flow characteristics over time of the semi-permeable membrane.

The membrane can exhibit a flux decline over time of from about 10% to about 50% less than a flux decline over the same time of a comparable membrane without the particles in the cast porous polymeric support. The particles can have a crystalline structure. The particles can include at least one zeolite. The cast porous polymeric support can include a polymer in the cast porous support. The cast porous support can exhibit one or more melting points. The one or more melting points can each being higher than the melting point of the polymer.

A method of purifying water can include providing a membrane having a semi-permeable polymer matrix film on a first side thereof and a porous polymeric support on the other side thereof with particles of a size in the range of microparticles and nanoparticles dispersed therein, the particles having been selected to alter compaction characteristics of the porous polymeric support in which they are dispersed in response over time to pressure applied to the membrane, applying pressure to a water solution, having at least one solute, on the first side of the membrane and collecting purified water on the second side of the membrane.

The membrane can exhibit a decline in water flux over time of from about 10% to about 50% less than a decline of water flux over the same time in a comparable membrane without the particles. The particles can be Linde Type A (LTA) zeolite. The porous polymeric support when melted can have a single melting peak, when measured using a differential scanning calorimeter, rather than separate melting peaks for a polymer in the porous polymeric support and for the particles.

Additional advantages are set forth in part in the description which follows, and in part understood from the description by a person having ordinary skill in this art, and/or can be learned by practice of the methods and apparatus disclosed herein. The advantages can also be realized and attained by means of the elements and combinations particularly pointed out in the appended claims. It is to be understood that both the foregoing general description and the following detailed description are exemplary and explanatory only and are not restrictive of the invention, the scope of which can be determined from the claims attached hereto.

BRIEF DESCRIPTION OF THE FIGURES

The accompanying figures are incorporated in and constitute a part of this specification.

FIG. 1a is a schematic illustration of a cross-sectional view of a conventional composite membrane, and FIG. 1b is a cross sectional view of a conventional composite membrane with a hydrophilic coating layer.

FIG. 2a shows a model of example Zeolite A (LTA). FIG. 2b illustrates the multi-dimensional interconnected open framework of certain zeolite crystalline structures with the inorganic framework shown in stick form while the interconnected pore structure is shown in solid gray.

FIGS. 6a and 6b are flux vs. time graphs at 250 psi and 500 psi, respectively, for various nanocomposite and pure polysulfone membranes disclosed herein.

FIGS. 11a and 11b are SEM images of uncompacted and compacted NF90 membranes respectively.

FIGS. 12a and 12b are SEM images of uncompacted and compacted NF270 membranes, respectively, at 250 psi compaction pressure.

FIGS. 13a, 13b, and 13c are SEM images of a thin film composite (TFC) membrane after compaction at 250 psi, 500 psi and uncompacted, respectively.

FIGS. 14a, 14b, and 14c are SEM images of ST201-TFC membrane after compaction at 250 psi, 500 psi and uncompacted, respectively.

FIGS. 15a, 15b, and 15c are SEM images of LTA-TFC membrane after compaction at 250 psi, 500 psi and uncompacted, respectively.

FIGS. 16a, 16b, and 16c are SEM images of an M1040 membrane after compaction at 250 psi, 500 psi and uncompacted, respectively.

FIGS. 17a, 17b, and 17c are SEM images of ST50-TFC membrane after compaction at 250 psi, 500 psi and uncompacted, respectively.

FIGS. 18a, 18b, and 18c are SEM images of ST-ZL-TFC membrane after compaction at 250 psi, 500 psi and uncompacted, respectively.

FIGS. 19a, 19b, and 19c are SEM images of OMLTA-TFC membrane after compaction at 250 psi, 500 psi and uncompacted, respectively.

DETAILED DESCRIPTION

Figure 3A:
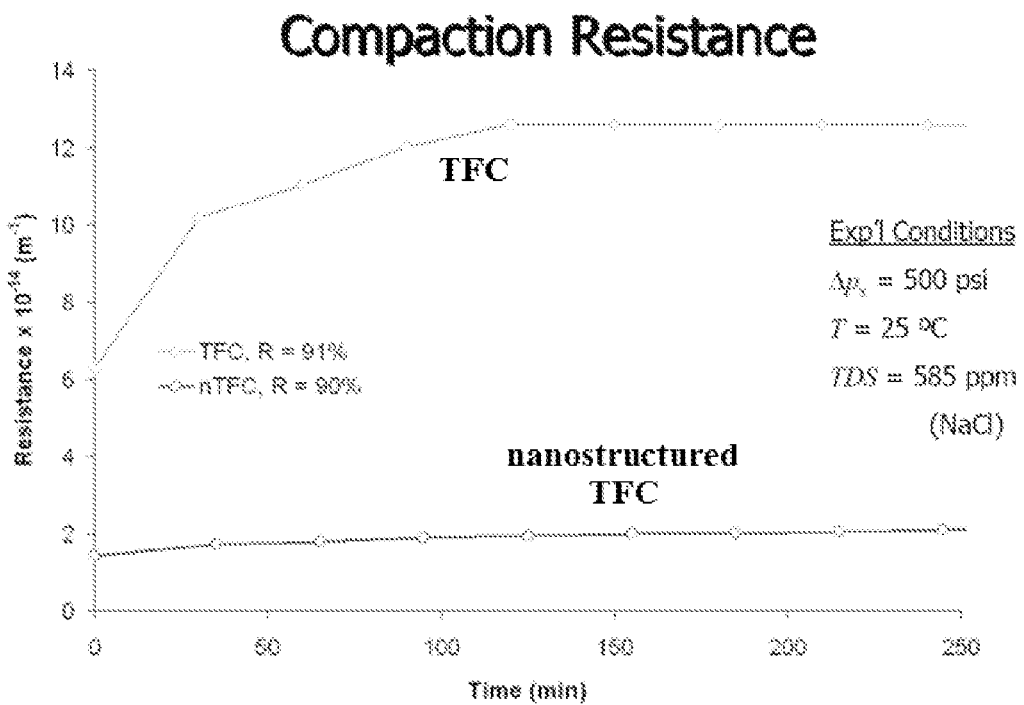
FIG. 3a shows intrinsic hydraulic resistances for TFC and nTFC membranes tested at 500 psi with a 585 ppm NaCl feed solution at unadjusted pH of ~5.8.

The present invention can be understood more readily by reference to the following detailed description of aspects of the invention and the Examples included therein and to the Figures and their previous and following description.

As used herein, TFC refers to thin film composite. PSf refers to polysulfone. PSf-TFC refers to a polysulfone-supported TFC membrane. PSf-LTA refers to a polysulfone-supported thin film composite (TFC) membrane with LTA nanoparticles dispersed therein. PSf-OMLTA refers to a polysulfone-supported thin film composite (TFC) membrane with organic-modified LTA nanoparticles dispersed therein.

A. Reverse Osmosis Membranes

Membranes useful for reverse osmosis (RO) applications include thin film composite (TFC) membranes. Among particularly useful membranes for RO applications are those in which the semi-permeable or discriminating layer is a polyamide. A thin film composite membrane typically comprises a porous polymeric support and a semi-permeable polymer film polymerized on the porous polymeric support.

Composite polyamide membranes are typically prepared by coating a porous polymeric (e.g., polysulfone) support structure with a polyfunctional amine monomer, most commonly coated from an aqueous solution. Although water is a preferred solvent, non-aqueous solvents can be utilized, such as acetonitrile and dimethylformamide (DMF). A polyfunctional acyl halide monomer (also referred to as acid halide) is subsequently coated on the support, typically from an organic solution. The amine solution is typically coated first on the porous support followed by the acyl halide solution. The monomers can react when in contact, thereby polymerizing to produce a polymer (e.g., polyamide) matrix film at the surface of the support structure. Although one or both of the polyfunctional amine and acyl halide can be applied to the porous support from a solution, they can alternatively be applied by other means such as by vapor deposition, or heat.

The resultant semi-permeable membrane can then be employed in a method of purifying or separating various liquids, such as water. Such a method typically comprises applying pressure to a water solution (e.g., salt water solution) on the polymer matrix film side of the membrane; and collecting purified water on the other side of the membrane.

B. Compaction and Flux Decline

Permeability for semi-permeable membranes permeable to water can be defined as water flux at a given applied pressure. Conventional reverse osmosis membranes are known to lose permeability when exposed to hydraulic pressures greater than 10 bars (approximately 145 psi). It has been observed that hydraulic pressure, over time, measurably reduces the support structure thickness and that the relative decrease in thickness and permeability loss are both correlated with the applied pressure. Thus, it is generally believed that high applied pressure leads to physical compaction of macro-voids and micro-voids throughout the skin layer of the support structure, thereby decreasing permeability of a composite membrane.

This irreversible, internal fouling of RO composite membranes by physical compaction is of major concern in membrane processes because of the sponge-like morphology of the porous supports on which they are cast. While not wishing to be bound by theory, it is believed that membrane compaction occurs when macrovoids collapse in the porous support layer due to excessive applied pressures; this pressure drop then causes a reduction in size of the support layer voids, thereby reducing the net permeability through the entire membrane cross-section.

C. Micro- and Nanocomposite RO Membranes

In contrast to TFC membranes, the disclosed membranes and methods relate to thin film composite membranes with particles dispersed therein. In one aspect, the thin film composite membranes have nanoparticles dispersed therein and can be also referred to as nanostructured thin film composite (nTFC) membranes. In a further aspect, thin film composite membranes have microparticles dispersed therein and can be also referred to as microstructured thin film composite membranes.

Referring now to FIGS. 1 and 1b, conventional composite membrane, such as TFC membrane 10, can include a porous support layer 12 and a thin film, semi-permeable polymer layer 14 as shown in FIG. 1a. FIG. 1b shows a conventional composite membrane, such as TFC membrane 11, including a porous support layer 12 and a thin film, semi-permeable polymer layer 14 and a hydrophilic coating layer 16. Such conventional membranes lack micro-particles and/or nano-particles as shown below for example with regard to FIGS. 4a, 4b and 4c. As disclosed and described below with reference for example to FIGS. 4a, 4b and 4c, membranes 13, 15 and 17 can be augmented by the selection and the addition of particles 18 of a size in the range of microparticles and nano-particles dispersed in the porous support layer 12 and or semi-permeable thin film layer 12, to achieve, for example, increased compaction resistance, reduced flux decline, and/or fouling resistance. Thus, in one aspect, the disclosed membranes 13, 15 and 25 can be considered to be a new class of filtration materials, for example, desalination membrane materials.

In contrast, the disclosed membranes are augmented by the selection and the addition of microparticles and/or nanoparticles to achieve, for example, increased compaction resistance, reduced flux decline, and/or fouling resistance. Thus, in one aspect, the disclosed membranes can be considered to be a new class of filtration materials, for example, desalination membrane materials.

1. Micro- and Nanocomposite Support Structure

In various aspects, the support structure 12 can be a porous polymeric support and can have particles 18, of a size in the range of microparticles and nanoparticles, dispersed in the polymer 19. In one aspect, the particles 18 can be present in the support in an amount of at least about 1% by weight of the porous polymeric support. In certain aspects, a semi-permeable polymer film 14 can be polymerized on the porous polymeric support 12.

a. Polymer

In a further aspect, the polymer 19 selected to prepare the porous polymeric support membrane 12 can be polysulfone, polyethersulfone, poly(ether sulfone ketone), poly(ether ethyl ketone), poly(phthalazinone ether sulfone ketone), polyacrylonitrile, polypropylene, cellulose acetate, cellulose diacetate, or cellulose triacetate.

b. Particles

The particles 18 used in connection with the membranes disclosed herein can be selected based upon a number of criteria, including one or more of:

(1) an average particle size in the nanoscale regime (e.g. having at least one dimension of a size of from about 1 nm to about 1,000 nm, for example, from about 1 nm to about 500 nm, from about 1 nm to about 250 nm, or from about 1 nm to about 100 nm);

(2) an average particle size in the microscale regime (e.g. having at least one dimension of a size of from about 1 µm to about 1,000 µm, for example, from about 1 µm to about 500 µm, from about 1 µm to about 250 µm, or from about 1 µm to about 100 µm);

(3) inorganic or inorganic-organic hybrid composition;

(4) high hardness (relative to the polymer);

(5) dispersibility in the polymer used to prepare the support; and/or (6) compatibility with the polymer used to prepare the support and/or the coating layer.

(1) Particle Composition

The selected particles can be a metallic species such as gold, silver, copper, zinc, titanium, iron, aluminum, zirconium, indium, tin, magnesium, or calcium or an alloy thereof or an oxide thereof or a mixture thereof. Alternately, the selected particles can be a nonmetallic species such as $Si_3N_4$, SiC, BN, $B_4C$, or TiC or an alloy thereof or a mixture thereof.

The selected particles can be a carbon-based species such as graphite, carbon glass, a carbon cluster of at least $C_2$, buckminsterfullerene, a higher fullerene, a carbon nanoparticle, or a mixture thereof. In one aspect, the particles comprise particles at least one of metal or metal oxide particles, amorphous or crystalline inorganic particles, particles of silica, alumina, clay or zeolites or carbon black particles. In a further aspect, the particles comprise at least one of metals and metal oxides, amorphous or crystalline inorganic particles, silica, alumina, clay, zeolites, carbon molecular sieve, or carbon black. Particles of carbon nanotubes, of a size in the range of nanoparticles and microparticles, can also be used.

The selected particles can also be a natural or synthetic zeolite and/or a "molecular sieve," that is, a material which selectively passes molecules at or below a particular size.

A zeolite structure can be referred to by a designation consisting of three capital letters used to describe and define the network of the corner sharing tetrahedrally coordinated framework atoms. Such designation follows the rules set up by an IUPAC Commission on Zeolite Nomenclature in 1978. The three letter codes are generally derived from the names of the type materials. Known synthetic zeolites that can be considered suitable porous nanoparticulate materials for passing or rejecting molecules of various sizes include: ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, CDO, CFI, CGF, CGS, CHA, —CHI, —CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, -LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, —PAR, PAU, PHI, PON, RHO, —RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WEI, —WEN, YUG, and ZON. An up-to-date list of known synthetic zeolites can currently be accessed at http://topaz.ethz.ch/IZA-SC/StdAtlas.htm.

In a further aspect, suitable zeolites have interconnected three-dimensional framework structures with effective pore diameters ranging from ~3.2 to about 4.1 Angstroms. In certain aspects, synthetic zeolites that can be considered suitably porous, crystalline particulate materials for use in connection with the disclosed membranes and methods include LTA, RHO, PAU, and KFI. In these aspects, each has a different Si/Al ratio, and hence, exhibits different characteristic charge and hydrophilicity.

In a further aspect, particles could comprise a class of metal-organic framework (MOF) structures, which in general have two main components: the organic linkers and the metal oxide units. The linkers act as "struts" that bridge the metal oxide units, which in turn act as "joints" in the resulting MOF architecture. This arrangement inevitability produces porous structures that have been extended to include metal-organic polyhedra (MOPs), zeolite imidazolate frameworks (ZIFs) and covalent organic frameworks (COFs) [Metal-Organic Frameworks: A New Class of Porous Materials, J. Rowsell, O. M. Yaghi, *Micro-and Mesoporous Mater.*, 2004, 73, 3].

Referring now to FIG. 2, a model of an example of Zeolite A (LTA) particle 18 illustrates the multi-dimensional interconnected open framework of certain zeolite crystalline structures. The inorganic framework 20 is shown in stick form; the interconnected pore structure 22 is shown in solid gray. The selected particles can have a porous structure. That is, the pores of the nanoparticles or microparticles can provide an open structure 22 in one or more dimensions or directions which can result in an interconnected porous material. That is, the pores of the nanoparticle or microparticles 18 can be "linked" to provide an open structure in more than one dimension or direction. An example of a porous material can be found in zeolitic materials. A specific example of an interconnected porous material can be found in Zeolite A. In such an aspect, the nanoparticles or microparticles can provide preferential flow paths for liquids permeating the membranes disclosed below.

Figures 4A, 4B:
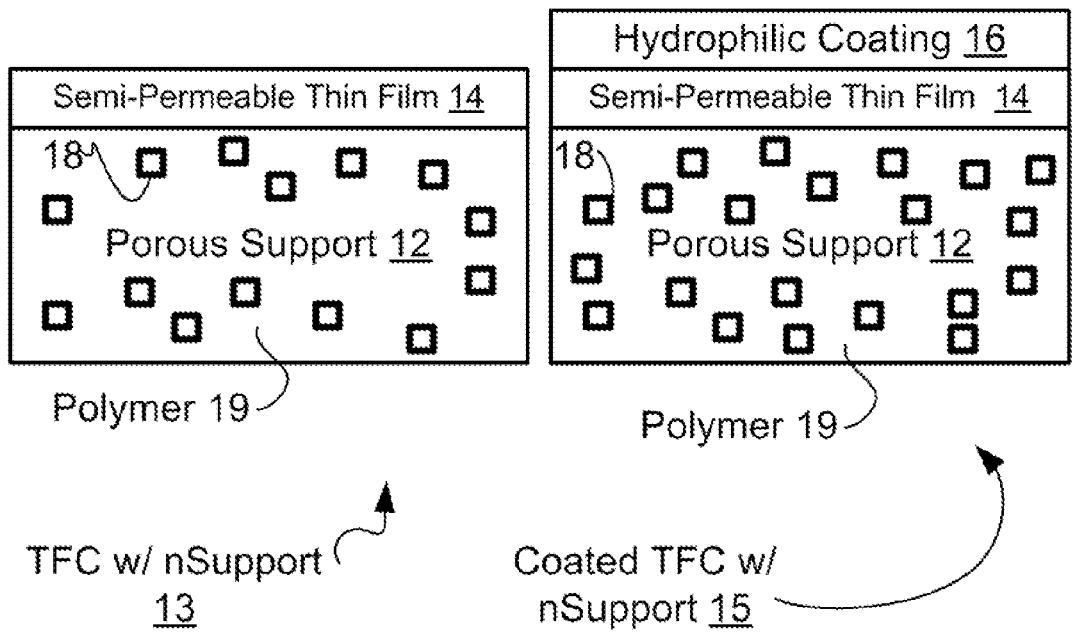
FIG. 4a is a schematic illustration of a cross-sectional view of a thin film composite membrane with nanoparticles dispersed in the porous support layer.
FIG. 4b is a schematic illustration of a cross-sectional view of a thin film composite membrane with nanoparticles dispersed in the porous support layer with a hydrophilic coating layer.

Referring now to FIGS. 4a, 14b and 14c, particles 18 can be dispersed within polymer 19 of support layer 12 on which semi-permeable thin film 14 is formed in membrane 13 in FIG. 14a. Membrane 15 can include hydrophilic coating layer 16 as shown in FIG. 4b. Membrane 25 can also include particles 18 dispersed in semi-permeable thin film layer 17 as shown in FIG. 5c. The size of the pores in the particles 18, also discussed above for example with regard to FIG. 2, can be described in terms of average pore diameter and can be expressed in angstroms (Å). In a further aspect, the particles can have a nanoscale porosity with characteristic pore dimensions of from about 3 Å to about 30 Å, for example, from about 3 Å to about 5 Å or 10 Å, from about 10 Å to about 20 Å, from about 20 Å to about 30 Å, from about 3 Å to about 20 Å, or from about 10 Å to about 30 Å. The particles can have an interconnected pore structure; that is, adjacent pores can be linked or coupled to produce a network of channels in multiple directions through the particle structure. The selected particles can be an about 1 Å to an about 50 Å porous material, an about 2 Å to an about 40 Å porous material, an about 3 Å to an about 12 Å porous material, an about 3 Å to an about 30 Å porous material, an about 1 Å to an about 20 Å porous material, an about 2 Å to an about 20 Å porous material, an about 2 Å to an about 40 Å porous material, an about 5 Å to an about 50 Å porous material, or an about 5 Å to an about 20 Å porous material.

Generally, zeolites—or other molecular sieves—are materials with selective sorption properties capable of separating components of a mixture on the basis of a difference in molecular size, charge, and shape. Zeolites can be crystalline aluminosilicates with fully cross-linked, open framework structures made up of corner-sharing $SiO_4$ and $AlO_4$ tetrahedra. A representative empirical formula of a zeolite is $M_{2/n}O \cdot Al_2O_3 \cdot xSiO_2 \cdot yH_2O$ where M represents the exchangeable cation of valence n. M is generally a Group I or II ion, although other metal, non-metal, and organic cations can also balance the negative charge created by the presence of Al in the structure. The framework can contain interconnected cages and channels of discrete size, which can be occupied by water. In addition to $Si^{4+}$ and $Al^{3+}$, other elements can also be present in the zeolitic framework. They need not be isoelectronic with $Si^{4+}$ or $Al^{3+}$, but are able to occupy framework sites. Aluminosilicate zeolites typically display a net negative framework charge, but other molecular sieve frameworks can be electrically neutral.

Zeolites can also include minerals that have similar cage-like framework structures or have similar properties and/or are associated with aluminosilicates. These include the phosphates: kehoeite, pahasapaite and tiptopite; and the silicates: hsianghualite, lovdarite, viseite, partheite, prehnite, roggianite, apophyllite, gyrolite, maricopaite, okenite, tacharanite and tobermorite. Thus, zeolites can also be molecular sieves based on $AlPO_4$. These aluminophosphates, silicoaluminophosphates, metalloaluminophosphates and metallosilicoaluminophosphates are denoted as $AlPO_{4-n}$, SAPO-n, MeAPO-n and MeAPSO-n, respectively, where n is an integer indicating the structure type. $AlPO_4$ molecular sieves can have the structure of known zeolites or other structures. When Si is incorporated in an $AlPO_{4-n}$ framework, the product can be known as SAPO. MeAPO or MeAPSO sieves are can be formed by the incorporation of a metal atom (Me) into an $AlPO_4$, or SAPO framework. These metal atoms include Li, Be, Mg, Co, Fe, Mn, Zn, B, Ga, Fe, Ge, Ti, and As. Most substituted $AlPO_{4-n}$'s have the same structure as $AlPO_{4-n}$, but several new structures are only found in SAPO, MeAPO and MeAPSO materials. Their frameworks typically carry an electric charge.

The framework of a molecular sieve, such as structure 20 of Zeolite particle 18, contains pore structure 20, typically contains cages and channels of discrete size and generally from about 3 to about 30 Å in diameter. In certain aspects, the primary building unit of a molecular sieve is the individual tetrahedral unit, with topology described in terms of a finite number of specific combinations of tetrahedra called "secondary building units" (SBU's).

In these aspects, description of the framework topology of a molecular sieve can also involve "tertiary" building units corresponding to different arrangements of the SBU's in space. The framework can be considered in terms of large polyhedral building blocks forming characteristic cages. For example, sodalite, Zeolite A, and Zeolite Y can all be generated by the truncated octahedron known as the -cage. An alternative method of describing extended structures uses the two-dimensional sheet building units. Various kinds of chains can also be used as the basis for constructing a molecular sieve framework.

For example, the zeolites can be from the Analcime Family: Analcime (Hydrated Sodium Aluminum Silicate), Pollucite (Hydrated Cesium Sodium Aluminum Silicate), and Wairakite (Hydrated Calcium Sodium Aluminum Silicate); Bellbergite (Hydrated Potassium Barium Strontium Sodium Aluminum Silicate); Bikitaite (Hydrated Lithium Aluminum Silicate); Boggsite (Hydrated calcium Sodium Aluminum Silicate); Brewsterite (Hydrated Strontium Barium Sodium Calcium Aluminum Silicate); the Chabazite Family: Chabazite (Hydrated Calcium Aluminum Silicate) and Willhendersonite (Hydrated Potassium Calcium Aluminum Silicate); Cowlesite (Hydrated Calcium Aluminum Silicate); Dachiardite (Hydrated calcium Sodium Potassium Aluminum Silicate); Edingtonite (Hydrated Barium Calcium Aluminum Silicate); Epistilbite (Hydrated Calcium Aluminum Silicate); Erionite (Hydrated Sodium Potassium Calcium Aluminum Silicate); Faujasite (Hydrated Sodium Calcium Magnesium Aluminum Silicate); Ferrierite (Hydrated Sodium Potassium Magnesium Calcium Aluminum Silicate); the Gismondine Family: Amicite (Hydrated Potassium Sodium Aluminum Silicate), Garronite (Hydrated Calcium Aluminum Silicate), Gismondine (Hydrated Barium Calcium Aluminum Silicate), and Gobbinsite (Hydrated Sodium Potassium Calcium Aluminum Silicate); Gmelinite (Hydrated Sodium Calcium Aluminum Silicate); Gonnardite (Hydrated Sodium Calcium Aluminum Silicate); Goosecreekite (Hydrated Calcium Aluminum Silicate); the Harmotome Family: Harmotome (Hydrated Barium Potassium Aluminum Silicate), Phillipsite (Hydrated Potassium Sodium Calcium Aluminum Silicate), Wellsite (Hydrated Barium Calcium Potassium Aluminum Silicate); The Heulandite Family: Clinoptilolite (Hydrated Sodium Potassium Calcium Aluminum Silicate) and Heulandite (Hydrated Sodium Calcium Aluminum Silicate); Laumontite (Hydrated Calcium Aluminum Silicate); Levyne (Hydrated Calcium Sodium Potassium Aluminum Silicate); Mazzite (Hydrated Potassium Sodium Magnesium Calcium Aluminum Silicate); Merlinoite (Hydrated Potassium Sodium Calcium Barium Aluminum Silicate); Montesommaite (Hydrated Potassium Sodium Aluminum Silicate); Mordenite (Hydrated Sodium Potassium Calcium Aluminum Silicate); the Natrolite Family: Mesolite (Hydrated Sodium Calcium Aluminum Silicate), Natrolite (Hydrated Sodium Aluminum Silicate), and Scolecite (Hydrated Calcium Aluminum Silicate); Offretite (Hydrated Calcium Potassium Magnesium Aluminum Silicate); Paranatrolite (Hydrated Sodium Aluminum Silicate); Paulingite (Hydrated Potassium Calcium Sodium Barium Aluminum Silicate); Perlialite (Hydrated Potassium Sodium Calcium Strontium Aluminum Silicate); the Stilbite Family: Barrerite (Hydrated Sodium Potassium Calcium Aluminum Silicate), Stilbite (Hydrated Sodium Calcium Aluminum Silicate), and Stellerite (Hydrated Calcium Aluminum Silicate); Thomsonite (Hydrated Sodium Calcium Aluminum Silicate); Tschernichite (Hydrated Calcium Aluminum Silicate); Yugawaralite (Hydrated Calcium Aluminum Silicate) or a mixture thereof.

In one aspect, the selected particles 18, including for use in desalination membranes can be Zeolite A (also referred to as Linde Type A or LTA), MFI, FAU, or CLO or a mixture thereof.

The zeolite can have a negatively charged functionality, for example it can have negatively charged species within the crystalline framework, while the framework maintains an overall net neutral charge. Alternately, the zeolite can have a net charge on the crystalline framework such as Zeolite A. The negatively charged functionality can bind cations, including for example silver ions. Thus, the zeolite nanoparticles can be subject to ion-exchange with silver ions. The nanocomposite membranes 13, 15 and 25 shown in FIGS. 4a, 4b and 4c respectively can thereby acquire antimicrobial properties.

(2) Particle Size

Particle size is often described in terms of average hydrodynamic diameter, assuming a substantially spherical shape of the particles. The selected particles can have an average hydrodynamic diameter of from about 1 nm to about 1000 nm, from about 10 nm to about 1000 nm, from about 20 nm to about 1000 nm, from about 50 nm to about 1000 nm, from about 1 nm to about 500 nm, from about 10 nm to about 500 nm, from about 50 nm to about 250 nm, from about 200 nm to about 300 nm, or from about 50 nm to about 500 nm.

The selected particles can have an average hydrodynamic diameter of from about 1 µm to about 1000 µm, from about 10 µm to about 1000 µm, from about 20 µm to about 1000 µm, from about 50 µm to about 1000 µm, from about 1 µm to about 500 µm, from about 10 µm to about 500 µm, from about 50 µm to about 250 µm, from about 200 µm to about 300 µm, or from about 50 µm to about 500 µm.

The selected particles can have an average hydrodynamic diameter of from about 1 nm to about 1000 µm, from about 10 nm to about 1000 µm, from about 20 nm to about 1000 µm, from about 50 nm to about 1000 µm, from about 1 nm to about 500 µm, from about 10 nm to about 500 µm, from about 50 nm to about 250 µm, from about 200 nm to about 300 µm, or from about 50 nm to about 500 µm.

It is also understood that a combination of nanoparticles an microparticles can be used in connection with the disclosed membranes and methods.

(3) Particle Hardness

The particles 18 selected for use in connection with the disclosed membranes have a hardness. One of skill in the art can readily measure the hardness of various particles and/or polymer/particle composites 21 by, for example, the techniques associated with one or more of Brinell hardness test (HB); Janka Wood Hardness Rating; Knoop hardness test (HK) or microhardness test; Meyer hardness test; Rockwell hardness test (HR); Shore durometer hardness; Vickers hardness test (HV), has one of the widest scales; and Barcol hardness test. For measuring hardness of nanograined materials, nanoindentation can be used. Indentation hardness can characterize a material's hardness (i.e., resistance to permanent, and in particular plastic, deformation). This can be measured by loading an indenter of specified geometry onto the material and measuring the dimensions of the resulting indentation.

One of skill in the art can readily appreciate the difference between a hard material and a soft material. In one aspect, the selected particles are harder than the polymer used to provide the polymeric support structure. In a further aspect, the particles are inorganic. In a further aspect, the particles have a crystalline structure. The appropriate level of hardness contributes to the compaction resistance of the membrane, such as support membrane 12, in which particles 18 are dispersed in polymer 19.

Typically, particle hardness increases with decreasing particle size, as described by the well-known Hall-Petch effect. Because this relationship has been well established experimentally for grain sizes in the millimeter through submicrometer regimes, conventional wisdom suggests that nanosized particles would produce materials of even greater hardness. Computer simulations, however, indicate that, in materials with particles of approximately 10-20 nm in size, material hardness and yield stress actually decrease. Thus, it is understood that, below a certain particle size, hardness can decrease with decreasing particle size. This certain particles size can vary depending upon the composition of the particle.

Therefore, in a further aspect, the particles 18 used in connection with the disclosed membranes 13, 15 and 25 can be selected to provide a particle of maximum hardness for a given selected particle size. That is, for a particle of a desired size, its composition (i.e., material makeup) can be selected to provide satisfactory hardness in view of the Hall-Petch effect and in view of the "certain particle size" hardness threshold.

In a further aspect, the particle size of the particles 18 used in connection with the disclosed membranes 13, 15 and 25 can be selected to provide a particle of maximum hardness for a given selected particle composition. That is, for a particle of a desired composition, its particle size can be selected to provide satisfactory hardness in view of the Hall-Petch effect and in view of the "certain particle size" hardness threshold.

c. Differential Scanning Calorimetry Analysis

In one aspect, the particles 18 can be selected on the basis of dispersibility of the particles in the polymer used to prepare the support structure 12 and/or on the basis of the compatibility of the particles 18 with the polymer used to prepare the support structure 12. That is, the particles 18 can be selected with reference to similarity of structure, solubility, or other physical characteristics in order to maximize or otherwise affect the physical and/or chemical compatibility between the particles and the polymer used to prepare the support structure. This compatibility can, for example, be evaluated by observing the differential scanning calorimetry (DSC) analysis of the particle/polymer composite 21.

Typically, DSC can be used to observe transitions between solid and liquid states or between crystalline and amorphous states of a material. In one aspect, the particles 18 selected for use in connection with the disclosed membranes 13, 15 and 25 have distinct transitions (e.g., melting point or glass transition temperature). In one aspect, the polymer 19 selected for use in connection with the support structure 12 of the disclosed membranes 13, and 25 have distinct transitions (e.g., melting point or glass transition temperature). In various aspects, the transition point(s) of the suitable particles 18 are different from the transition points(s) of the polymer 19. In a further aspect, the support 12 with suitable particles 18 dispersed in polymer 19 will exhibit a transition point (e.g., melting point) different from the melting points of the particles 18 and polymer 19 separately.

In a further aspect, the composite material including particles 18 dispersed with polymer 19 to form support layer 12 can exhibit one or more transition point(s) indicative of the composite material. For example, the composite material of support layer 12 can exhibit a single transition peak coalesced from the individual peaks of the particles 18 and polymer 19. This peak can be shifted (i.e., occur at a different temperature), compared to the individual particle 18 and polymer 19 transition peaks. As a further example, the polymer 19 having particles 18 and dispersed therein to produce support layer 12 can together produce a shifted melting peak when measured using a differential scanning calorimeter relative to the melting peak of a comparable support 12 without the particles 18. In a further aspect, the particles 18 and polymer 19 of support 12 together produce a combined melting peak when measured using a differential scanning calorimeter rather than separate melting peaks for the support polymer 19 and the particles 18. Such a coalesced and/or shifted peak can be indicative of a physical and/or chemical interaction or relationship between the particles 18 and polymer 19 used to prepare the support structure.

Such a physical and/or chemical interaction or relationship between the polymer 19 and particles 18 dispersed therein can be referred to as compatibility between the particles and polymer and can, in one aspect, facilitate improving the membrane thickness reduction over time, water flux decline over time, and/or compaction resistance of the particle/polymer composite 21 in the support structure 12 and resulting membranes 10.

d. Ultimate Strength

The maximum amount of tensile stress that a material can be subjected to before failure can be referred to as its ultimate strength (maximum stress a material can withstand). The ultimate strength of the woven or nonwoven fabric underlying a support structure 12 can be, for example, about 16 MPa. In certain aspects, a support layer 12 can have an ultimate strength of from about 25 MPa to about 50 MPa, for example, greater than about 30 MPa, greater than about 35 MPa, or greater than about 40 MPa.

In one aspect, the particles 18 can be selected on the basis of resulting ultimate strength of the polymer 19 with the particles 18 dispersed therein to form support layer 12, that is, particle/polymer composite 21. That is, the particles 18 can be selected with reference to the measured ultimate strength of the particle/polymer composite 21, thereby maximizing or otherwise affecting the physical and/or chemical compatibility or other relationship between the particles 18 and the polymer 19 used to prepare the support structure 12.

In one aspect, the support 12 with particles 18 dispersed therein together exhibit an ultimate strength greater than that of a comparable support 12 without the particles 19.

Such and increased ultimate strength of the particle/polymer composite 12, compared to the polymer 19 without particles 18 dispersed therein, can be indicative of a physical and/or chemical interaction or other relationship between the particles 18 and polymer 19 used to prepare the support structure 12. Again, a physical and/or chemical interaction or other relationship between the particles 18 and the polymer 19 can be referred to as compatibility between the particles 18 and polymer 19 and can, in one aspect, facilitate improving the membrane 10 thickness reduction over time, water flux decline over time, and/or compaction resistance of the particle/polymer composite 21 in the support structure 12 and resulting membranes 10.

2. Film

The thin film 14 can be a semi-permeable polymer matrix, e.g. with a three-dimensional polymer network, substantially permeable to water and substantially impermeable to solutes. For example, the polymer network can be a crosslinked polymer formed from reaction of at least one polyfunctional monomer with a difunctional or polyfunctional monomer.

a. Polymer Composition

The polymer matrix film 14 can be a three-dimensional polymer network such as an aliphatic or aromatic polyamide, aromatic polyhydrazide, poly-bensimidazolone, polyepiamine/amide, polyepiamine/urea, poly-ethyleneimine/urea, sulfonated polyfurane, polybenzimidazole, polypiperazine isophtalamide, a polyether, a polyether-urea, a polyester, or a polyimide or a copolymer thereof or a mixture thereof. Preferably, the polymer matrix film can be formed by an interfacial polymerization reaction or can be crosslinked subsequent to polymerization.

The polymer matrix film 14 can be an aromatic or non-aromatic polyamide such as residues of a phthaloyl (e.g., isophthaloyl or terephthaloyl) halide, a trimesyl halide, or a mixture thereof. In another example, the polyamide can be residues of diaminobenzene, triaminobenzene, polyetherimine, piperazine or poly-piperazine or residues of a trimesoyl halide and residues of a diaminobenzene. The film can also be residues of trimesoyl chloride and m-phenylenediamine. Further, the film can be the reaction product of trimesoyl chloride and m-phenylenediamine.

b. Film Thickness

The polymer matrix film 14 can have a thickness of from about 1 nm to about 1000 nm. For example, the film can have a thickness of from about 10 nm to about 1000 nm, from about 100 nm to about 1000 nm, from about 1 nm to about 500 nm, from about 10 nm to about 500 nm, from about 50 nm to about 500 nm, from about 50 nm to about 200 nm, from about 50 nm to about 250 nm, from about 50 nm to about 300 nm, or from about 200 nm to about 300 nm.

3. Hydrophilic Layer

The disclosed membranes can include a film, such as a polymer matrix 14, which can have a hydrophilic layer 16 proximate, adjacent or in contact to a face of the polymer matrix 14.

The hydrophilic layer 16 can be a water-soluble polymer such as polyvinyl alcohol, polyvinyl pyrrole, polyvinyl pyrrolidone, hydroxypropyl cellulose, polyethylene glycol, saponified polyethylene-vinyl acetate copolymer, triethylene glycol, or diethylene glycol or a mixture thereof. The hydrophilic layer can be a crosslinked hydrophilic polymeric material, such as a crosslinked polyvinyl alcohol.

4. Membrane Shape

A variety of membrane shapes are useful and can be provided using the disclosed methods and techniques. These include plate and frame, spiral wound, hollow fiber, tubular, or flat sheet type membranes.

5. Solutes

In one aspect, the disclosed membranes 13 and 15 are semi-permeable membranes. That is, the disclosed membranes can be prepared so as to be substantially permeable to a liquid (e.g., water) and substantially impermeable to solutes for example by properly preparing film 14. As used herein, "solutes" generally refers to materials dissolved, dispersed, or suspended in a liquid. The materials can be undesired; in such a case, the membranes 13 and 15 can be used to remove the undesired solutes from the liquid, thereby purifying the liquid, and the liquid can be subsequently collected. The materials can be desired; in such a case, the membranes 13 and 15 can be used to decrease the volume of the liquid, thereby concentrating the solutes, and the solutes can be subsequently collected.

D. Filtration Performance

The disclosed membranes 13 and 15, in contrast to conventional composite membranes, can reduce operating costs and environmental impact of membrane desalination processes through minimization of both reversible (surface) and irreversible (internal) fouling of RO membranes. This can be achieved by using particles 18 dispersed in a polymer 19 used to form particle/polymer composite 21 to create the support layer 12 to minimize the loss of intrinsic water permeability through a reverse osmosis (RO) membrane by minimizing physical compaction of the support membrane structure 12 by the high hydraulic pressures applied in desalination processes. An advantage of the disclosed membranes 13 and 15 is the ability to maintain high permeability (energy efficiency) at high-applied pressures, such as can be used in reverse osmosis membrane based seawater desalination processes.

Figure 3B:
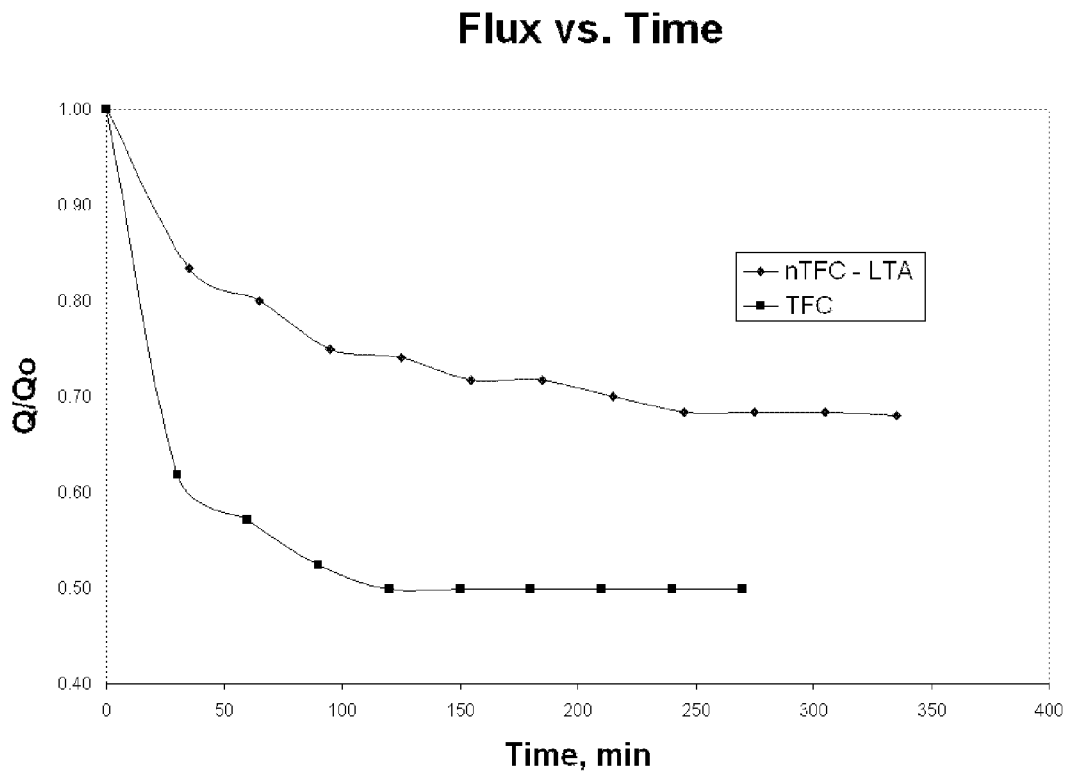
FIG. 3b shows flux vs. time (flux decline) for TFC and nTFC (LTA) membranes.

Referring now to FIG. 3, if a membrane material is compressible, that is if the semi-permeable film 14 or support layer 12, or both, are compressible, the flux can decline with time when filtering pure water or a simple salt solution. In experiments, the flux decline with time for a constant applied pressure was measured, but the data is presented in the form of increasing membrane resistance, assume no change in viscosity for membranes 13 and 15 without nano or microparticles 18 in polymer 19 of support layer 12. Both nanocomposite membranes have small intrinsic hydraulic resistance, that is, initial resistance to flux flow, at time zero. This is desirable, because lower initial resistance indicates less pressure to achieve a desired flux. The conventional membrane (pure polymer, no nanoparticles) resistance increases exponentially over a few hours, finally leveling off at a value that is double its initial resistance which can be considered the steady state hydraulic resistance. The membrane 10 without particles 18 is then half as permeable as it was at time zero; thus, the energy required to force water through the membrane is doubled.

The nanocomposite membranes 13 and 15 suffer very little increase in hydraulic resistance. Clearly, thin film composite membrane with particles dispersed therein (e.g., normal thin film coated over a nanocomposite support) suffer much less compaction than TFC membranes without particles 18, but there is a small amount of compaction (increase in resistance) still observed.

Still referring to FIG. 3, intrinsic hydraulic resistances for four different nanostructured TFC RO membranes 10 were tested at 500 psi with a 585 ppm NaCl feed solution at unadjusted pH of ~5.8. Observed rejections are all greater than 90 percent, which indicates they can function as RO membranes. The intrinsic hydraulic resistance is the inverse of a Darcy permeability coefficient, where Darcy's law is given as $$u = \frac{k}{\mu} \frac{dp}{dx} \quad \text{(Equation 1)}$$

where u is a velocity, k is the Darcy permeability, $\mu$ is the solution viscosity, dp is the differential hydraulic pressure, and dx is the distance of fluid transport (or the active membrane thickness). For a membrane, this Darcy's law relationship is typically written as $$J_v = \frac{\Delta p}{\mu R_m} \quad \text{(Equation 2)}$$

where $J_v$ is a volumetric flux ($m^3$-water/$m^2$-membrane/s, which is a velocity; $m^3/m^2 \cdot s = m/s$) and $R_m$ represents the combination of a Darcy permeability and membrane active layer thickness.

Referring now again to FIG. 4, flux loss due to "fouling" or "compaction" can be addressed by including particles 18 in the support layer 12. Thus, disclosed are composite membranes 13 and 15 having a polymer matrix film 14 polymerized on a porous support 12, wherein the support 12 has particles 18 dispersed within polymer 19 of support 12, and wherein the membranes 13 and 15 exhibit greater compaction resistance than a comparable composite membrane 10 lacking particles 18 in the porous support 12.

Figure 7A:
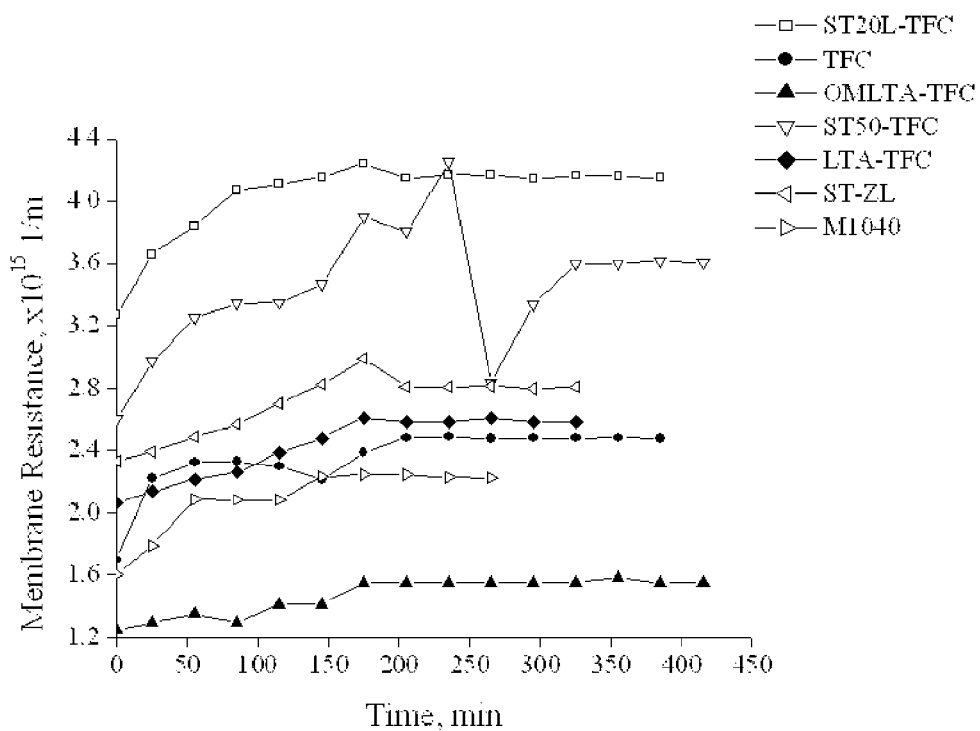
FIGS. 7a and 7b are graphs of membrane resistance to flow vs. time at 250 psi and 500 psi, respectively.
Figure 7B:
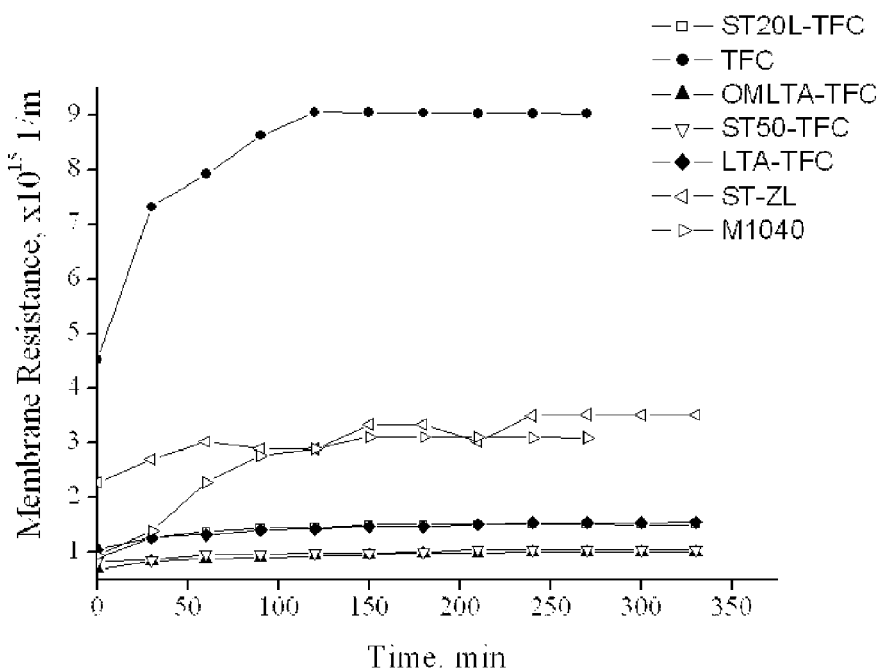

Referring now to FIGS. 6, 7a and 7b, these membranes 13 and 15 also more permeable, using either porous or nonporous nanoparticles 18. Without wishing to be bound by theory, it is believed that the compaction resistance due to the inclusion of nonporous nanoparticles is due to preventing "instantaneous compaction" occurring upon initial applied pressure.

The membranes 13 and 15 can have a pure water flux of at least 0.02 gallons per square foot of membrane per day per pound per square inch of applied pressure.

Typically, particles 18 selected for use in this aspect are hard and/or inorganic; inclusion of such particles can result in less reduced flux over time and/or less reduction in membrane thickness.

Referring now again to FIG. 4, particles 18 used in the membranes 13 and 15 can be selected from particles known by those of skill in the art and, in particular, can be selected from the particles disclosed herein. Suitable particles include metals and metal oxides, amorphous or crystalline inorganic particles, including silica, alumina, clay, and zeolites, and carbon black. Mixtures of particles can also be used, for example, where the particles 18 are selected independently for their individual ability to impart different performance enhancements or where the particles are selected collectively for synergistic performance improvements.

1. Decreased Change in Thickness

TFC membranes 10 can typically be compacted due to pressures associated with reverse osmosis techniques. That is, TFC membranes can exhibit a reduction of thickness after exposure to operating pressures. As the majority of the membrane thickness is typically due to the thickness of the polymeric support structure 12 (the polymer film 14 being a relatively smaller portion of the overall membrane 10 thickness), this reduction can be also be expressed as the reduction in thickness of the polymeric support structure 12 after exposure to operating pressures. This change can be measured as the difference between the initial membrane thickness and the membrane thickness after exposure to operating pressure for a period of time sufficient to reach a steady state thickness.

In one aspect, this reduction in thickness is related to the pressure exerted upon the membrane, and the reduction can be roughly proportional to the pressure exerted. Without wishing to be bound by theory, conventional wisdom contends that the reduction in thickness is correlated with internal fouling of the membrane.

For reference purposes, a reduction in membrane thickness can be expressed with respect to a particular operating pressure, for example 500 psi; however, it is understood that the decreased reduction in membrane thickness can be observed at different operating pressures, for example, at 300 psi, at 600 psi, at 800 psi, or at 1000 psi.

In contrast, the disclosed membranes can exhibit a decreased change in thickness, compared to conventional TFC membranes 10. This improvement can be expressed in a relative sense, for example as a difference between the reduction in membrane thickness of a conventional TFC membrane 10 at an operating pressure and the reduction in membrane thickness of disclosed membranes 13 and 15 at the operating pressure. The improvement can alternatively be expressed in an absolute sense, for example as the difference between the initial membrane thickness and the membrane thickness after exposure to operating pressure for a period of time sufficient to reach a steady state thickness.

2. Reduced Water Flux Decline

Correlated with, but not necessarily caused by, compaction due to pressures associated with reverse osmosis techniques, TFC membranes typically exhibit a an initial permeate flow rate of the liquid which decreases over time to a reasonably steady state permeate flow rate. That is, TFC membranes can exhibit a reduction in permeate flow rate after exposure to operating pressures. This change can be measured as the difference between the initial membrane permeate flow rate and the membrane permeate flow rate after exposure to operating pressure for a period of time sufficient to reach a steady state thickness.

In one aspect, this reduction in permeate flow rate is related to the pressure exerted upon the membrane, and the permeate flow rate can be roughly proportional to the pressure exerted.

For reference purposes, a reduction in permeate flow rate can be expressed with respect to a particular operating pressure, for example 500 psi; however, it is understood that the decreased reduction in permeate flow rate can be observed at different operating pressures, for example, at 300 psi, at 600 psi, at 800 psi, or at 1000 psi.

In contrast, the disclosed membranes 13 and 15 can exhibit a decreased change in permeate flow rate, compared to conventional TFC membranes 10. This improvement can be expressed in a relative sense, for example as a difference between the reduction in permeate flow rate of a conventional TFC membrane at an operating pressure and the reduction in permeate flow rate of a nanostructured membrane at the operating pressure. The improvement can alternatively be expressed in an absolute sense, for example as the difference between the initial permeate flow rate and the permeate flow rate after exposure to operating pressure for a period of time sufficient to reach a steady state permeate flow rate.

Thus, in one aspect, a the semi-permeable polymer film is permeable to a liquid, the thin film composite membrane exhibiting an initial permeate flow rate of the liquid which decreases over time to a reasonably steady state permeate flow rate, the decrease between initial and steady state permeate flow rates being in the range of from about 10% to about 50% less than a decrease between initial and steady state permeate flow rates for the liquid through a comparable thin file composite membrane having an otherwise comparable porous polymeric support without the particles dispersed therein.

In a further aspect, the decrease between initial and steady state permeate flow rates can be at least about 10% less than a decrease between initial and steady state permeate flow rates for the liquid through a comparable thin file composite membrane having an otherwise comparable porous polymeric support without the particles dispersed therein. In further aspects, the decrease between initial and steady state permeate flow rates can be at least about 20% less, at least about 30% less, at least about 40% less, or at least about 50% less.

3. Increased Compaction Resistance

The observations of improved reduction of thickness between initial membrane thickness and steady state membrane thickness and of improved decrease between initial permeate flow rate and steady state permeate flow rate give rise to the concepts of compaction resistance reduced permeate flow decline. In one aspect, the disclosed nanostructured membranes exhibit improved compaction resistance, compared to conventional TFC membranes without nanoparticles or microparticles dispersed in the support layer 12.

Figure 5:
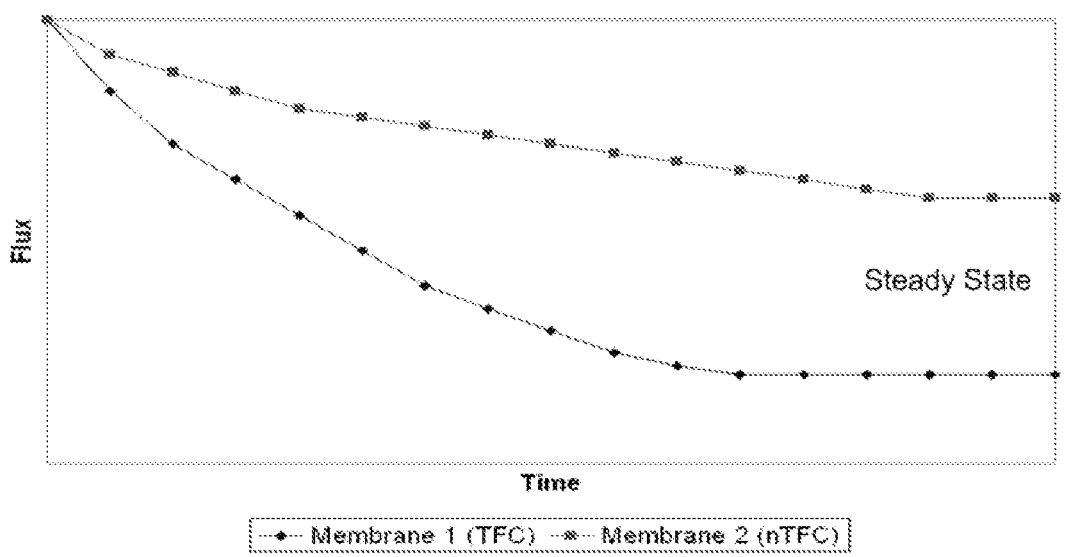
FIG. 5 is a graphical representation of flux flow as a function of time for a TFC membrane and a nanocomposite thin film (nTFC) membrane

Referring now to FIG. 5, as an example, a hypothetical conventional TFC membrane (membrane 1) can be compared to a hypothetical nanostructured TFC membrane (membrane 2). Membrane 2 would exhibit a decreased change in thickness, compared to membrane 1. Additionally, membrane 2 would exhibit a decreased change in permeate flow rate, compared to membrane 1.

Flux decline (FD) refers to the fractional decrease in permeate flow rate between initial state and steady state at a given pressure and can be calculated using equation 3, $$FD = \frac{J_0 - J_{ss}}{J_0} \quad \text{(Equation 3)}$$

wherein $J_0$ is the initial membrane flux (which can, for simplicity, be expressed as 100% or 1.00), wherein $J_{ss}$ is the membrane flux at steady state at an operating pressure. Thus, FD can range from 0 (no decline in flux at a given pressure) to 1 (flux is zero at steady state).

Flux retention (FR) refers to the steady state permeate flow rate at a given pressure as a fraction of initial state at the pressure and can be calculated using equation 4.

$$FR = \frac{J_{ss}}{J_0} \quad \text{(Equation 4)}$$

Assuming that flux decline is wholly attributed to physical compaction, a value for compaction resistance can be calculated by comparing two membranes, for example membrane 1 (TFC) and membrane 2 (thin film composite membrane with particles dispersed therein) using equation 5:

$$CR = \frac{\frac{J_{ss}(nTFC)}{J_0(nTFC)}}{\frac{J_{ss}(TFC)}{J_0(TFC)}} = \frac{FR(nTFC)}{FR(TFC)} \quad \text{(Equation 5)}$$

As shown in Table 1, below, the compaction resistance of the hypothetical membrane 2 can be calculated relative to membrane 1. In this example, both membranes have the same initial permeate flow rate (10 gfd) and the comparison is made at the same given operating pressure. Here, membrane 2 (thin film composite membrane with particles dispersed therein) exhibits 33% greater compaction resistance than membrane 1 (TFC).

TABLE 1

Example calculation of compaction resistance of membranes of FIG. 5

| | | $J_0$ | $J_{ss}$ | FD | FR | CR |
|---|---|---|---|---|---|---|
| 1 | TFC | 10 gfd | 6 gfd | (10 − 6)/10 = 0.4 | 6/10 = 0.6 | 0.8/0.6 = |
| 2 | nTFC | 10 gfd | 8 gfd | (10 − 8)/10 = 0.2 | 8/10 = 0.8 | 1.33 |

It is also understood that analogous calculations can be performed using initial (before exposure to an applied pressure) and final (after pressurization sufficient to achieve a steady state flux) membrane thickness as substitutes for initial and steady state flux.

Thus, in one aspect, a compaction resistant membrane 13 or 15 can exhibit a reduction of thickness between initial and steady state permeate flow rates at an operating pressure of less than that exhibited by a comparable TFC membrane at the same pressure. In a further aspect, a compaction resistant membrane 13 or 15 can exhibit a reduction of thickness of less than about 20%, for example less than about 15% or less than about 10%, between initial and steady state permeate flow rates at about 250 psi. In a further aspect, a compaction resistant membrane 13 or 15 can exhibit a reduction of thickness of less than about 20%, for example less than about 15% or less than about 10%, between initial and steady state permeate flow rates at about 500 psi.

Salient characteristics of examples of the disclosed membranes are summarized in Table 2. In this table, additive refers to the particle added to form the support structure.

TABLE 2 characteristics of examples of the disclosed membranes

| | Particle | | Support membrane | | | Transition temp. of support (° C.) | Ult. Strength of support (MPa) | TFC membrane synthesis conditions MPD solution* (% w/v) |
|---|---|---|---|---|---|---|---|---|
| Membrane | Type | Size (nm) | Polymer (gm) | NMP (mL) | Additive (gm) | | | |
| TFC | n/a | n/a | 18 | 72 | 0 | 188 | 26.8 ± 0.6 | 2.0:2.0:4.0:0.02:10 |
| NP1-TFC | NS-LTA | ~250 | 18 | 72 | 3.6 | >300 | 41.1 ± 2.1 | 2.0:2.0:4.0:0.02:10 |
| NP2-TFC | NS-ODLTA | ~250 | 18 | 72 | 3.6 | 188, >300 | 22.4 ± 1.1 | 2.0:2.0:4.0:0.02:10 |
| NP3-TFC | Silica-STZL | ~130 | 18 | 72 | 3.6 | 188, >300 | 31.0 ± 1.9 | 2.0:2.0:4.0:0.02:10 |
| NP4-TFC | Silica-M1040 | ~120 | 18 | 72 | 3.6 | 188, >300 | 39.9 ± 1.4 | 2.0:2.0:4.0:0.02:10 |
| NP5-TFC | Silica-ST20L | ~68 | 18 | 72 | 3.6 | ~258 | 45.8 ± 2.4 | 2.0:2.0:4.0:0.02:10 |
| NP6-TFC | Silica-ST50 | ~34 | 18 | 72 | 3.6 | 188, >300 | 39.6 ± 2.0 | 2.0:2.0:4.0:0.02:10 |

| Membrane | TFC membrane synthesis conditions TMC solution** (% w/v) | TFC membrane performance | | | |
|---|---|---|---|---|---|
| | | Flux (gfd) | Rejection (%) | J/Jo at 250 psi | J/Jo at 500 psi |
| TFC | 0.1 | 9.2 ± 0.6 | 85.0 ± 1.0 | 0.68 | 0.50 |
| NP1-TFC | 0.1 | 12.7 ± 1.8 | 93.0 ± 0.6 | 0.80 | 0.68 |
| NP2-TFC | 0.1 | 23.0 ± 2.0 | 78.0 ± 2.3 | 0.80 | 0.69 |
| NP3-TFC | 0.1 | 11.5 ± 1.5 | 93.0 ± 0.8 | 0.83 | 0.64 |
| NP4-TFC | 0.1 | 17.0 ± 1.3 | 95.0 ± 1.0 | 0.72 | 0.30 |

TABLE 2-continued characteristics of examples of the disclosed membranes

| | | | | | |
|---|---|---|---|---|---|
| NP5-TFC | 0.1 | 12.1 ± 1.0 | 96.5 ± 0.5 | 0.79 | 0.59 |
| NP6-TFC | 0.1 | 2.0 ± 0.3 | 89.0 ± 0.6 | 0.72 | 0.79 |

\# Ultimate tensile strength of nonwoven fabric = 16.2 MPa.
Feed: 2000 ppm; applied pressure: 225 psi.
*MPD:TEACSA:SLS:IPA.
**Isopar-G.
Flux = pure water flux.
Rejection = NaCl rejection.

Figure 20:
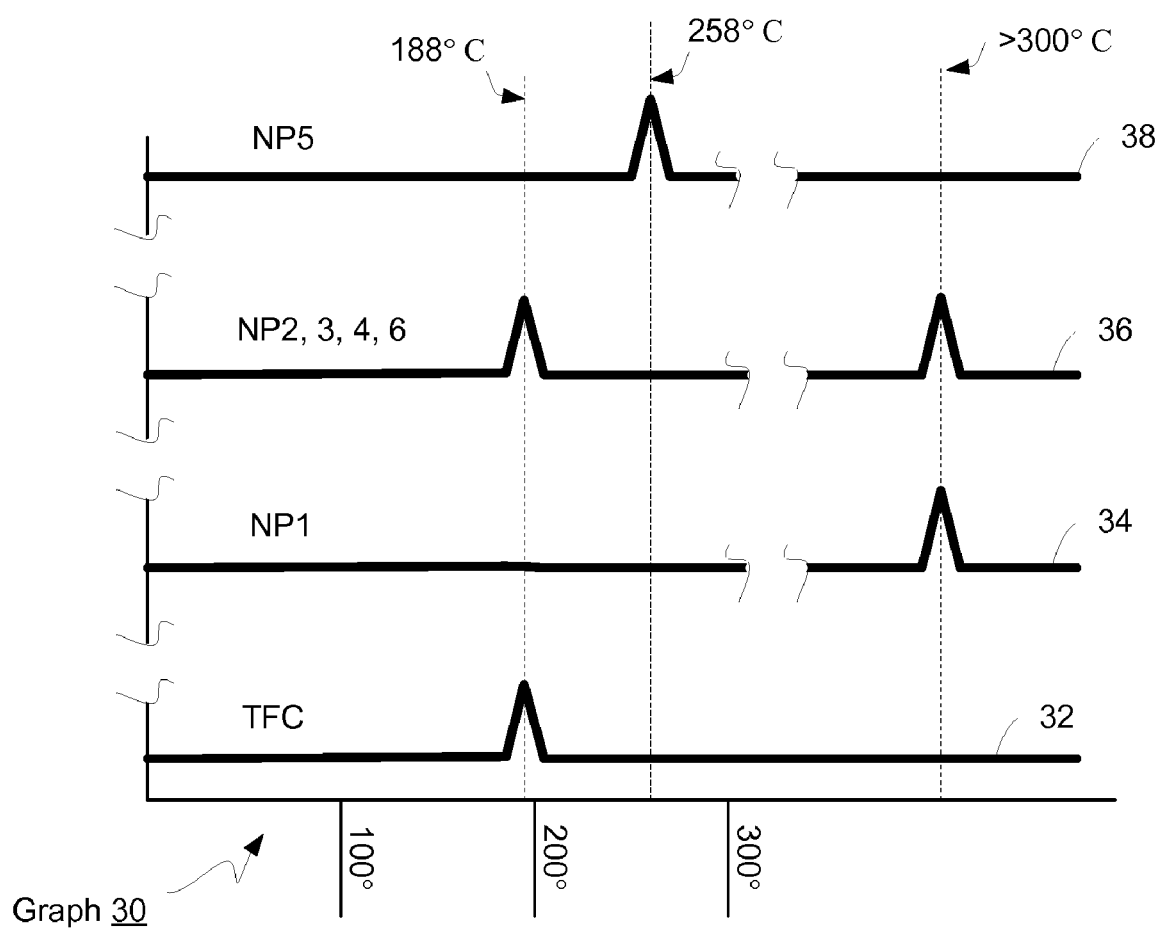
FIG. 20 shows a graph illustrating the glass or other transition temperatures of various porous supports.

Referring now to FIG. 20, salient characteristics of examples of the disclosed porous supports 12 are summarized in Table 2 and the glass or other transition temperatures (° C.), sometimes referred to as melting points, of the various porous supports are shown on graph 30. Line 32 represents the porous support 12 of FIG. 1 in which particles were not dispersed within support structure 12. This TFC support had a single transition temperature at about 188° C. believed to be the glass transition temperature of the polymer 19, shown in FIG. 4, without particles 18 dispersed therein. Line 34 represents support 12 shown in FIG. 4 in which the particles 18 are LTA particles, dispersed in polymer 19 of support structure 12, e.g. type NP1-TFC as shown in Table 2. A glass transition temperature of greater than 300° C. is assumed for this porous support 12 because the transition temperature occurred beyond the 300° C. range of the instruments used. This single or combined transition temperature is believed to be the glass transition temperature achieved when the dispersal of particles 18 of LTA in polymer 19 has achieved a structural or other characteristic, such as cohesion, which may be highly beneficial for use in minimizing reduction of permeate flow from initial to steady state conditions in membranes using this particle/polymer combination in porous support 12.

Line 36 represents porous support 12 shown in FIG. 4 in which the particles 18 are NS-ODTLA, Silica-STZL, Silica M1040 or Silica ST-50 particles dispersed in polymer 19 of support structure 12, e.g. types NP2-, NP3-, NP4- or NP6-TFC as shown in Table 2. These supports exhibited transition temperatures at 188° C. and are believed to have a second transition temperature greater than 300° C. because the particles 18 have transition temperatures greater than 300° C. and perhaps greater than 500° C. The existence of two transition temperatures indicates that the desirable characteristic, such as cohesion, did not occur. It is possible that with less, or perhaps greater, loading of the particles 18 in the polymer 19, that the desirable characteristic could be achieved.

Line 38 represents support 12 shown in FIG. 4 in which the particles 18 are ST20L type particles, dispersed in polymer 19 of support structure 12, e.g. type NP5-TFC as shown in Table 2. It is reasonable to conclude that the transition point at about 258° C., because it is substantially higher than the 188° C. transition temperature of the polymer 19, is the transition temperature for the polymer in this particle/polymer mixture.

It is therefore reasonable to conclude that there may be a range of transition temperatures, for various combinations of particles and polymers which exhibit this apparently desirable characteristic of a single transition point, because at least two such temperatures have been shown, e.g., 258° C. and greater than 300° C. It is also reasonable to conclude that the particle/polymer mixes with the higher single glass or other transition temperature may have a more desirable version of the characteristic than those with a single but lower transition temperature because the mixture with LTA particles, which had the highest single transition temperature, performed better in other tests. It is also reasonable to conclude that a desirable loading of particles in the particle/polymer mixture may be determined by testing for the single glass transition temperature as indicated in Table 2 and in FIG. 20 and/or the ultimate breaking strength as indicated in Table 2.

E. Preparation of Nanocomposite RO Membranes

In one aspect, the disclosed membranes can be prepared by a method distinct from the conventional RO membrane preparation processes. However, many of the techniques used in conventional RO membrane preparation can be applicable to the disclosed methods. Therefore, the disclosed methods can be amenable to immediate introduction into existing commercial membrane manufacturing processes without significant process modification.

1. Polymeric Support Structure Formation

In one aspect, the membrane 11 is prepared by forming a porous support 12 from a mixture of particles 18 and a polymeric material 19 and polymerizing a polymer matrix film 14 on the porous support 12 to form the thin film composite membrane. The porous support 12 can be provided by dispersion casting a layer from a dispersion of selected nanoparticles in a polymer "solution" of polymers 19 disclosed herein, for example, polysulfone. Typically, the dispersion is prepared by selecting particles 18 and polymer 19 at a concentration in a liquid wherein the dispersion shows substantially no precipitation of the polymer 19 and substantially no aggregation of the particles 18. This can be evaluated by measuring the turbidity of the dispersion and/or by measuring the average particles size of the particles in the dispersion. The measurements can then be compared to the turbidity of a solvent without polymer and/or particles.

Preparation of a support layer 12 by dispersion casting (alternatively, immersion-precipitation or non-solvent-induced phase inversion) can be accomplished by pouring an aliquot of the polymer-nanoparticle-solvent dispersion onto a surface and removing the solvent. Increased temperature and/or reduced pressure can facilitate removal. The use of a non-solvent (a solvent with low affinity for the polymer) can be particularly effective in providing the support layer.

2. Film Formation

Thin film composite membranes 14 can be formed on the surface of a porous support membrane 12 via polymerization, for example, interfacial polymerization. See U.S. Pat. No. 6,562,266. As disclosed herein, the polymer matrix film 14 can be provided by interfacial polymerization, to provide, for example a polyamide. Suitable monomers include m-phenylenediamine and trimesoyl chloride.

The porous support structure 12 can be immersed in an aqueous solution containing a first reactant (e.g., 1,3-diaminobenzene or "MPD" monomer). The substrate 12 can then be put in contact with an organic solution containing a second reactant (e.g., trimesoyl chloride or "TMC" initiator). Typically, the organic or apolar liquid is immiscible with the polar or aqueous liquid, so that the reaction occurs at the interface between the two solutions to form a dense polymer layer 14 on the support membrane surface.

The standard conditions for the reaction of MPD and TMC to form a fully aromatic, polyamide thin film composite membrane include an MPD to TMC concentration ratio of ~20 with MPD at about 1 to 3 percent by weight in the polar phase. The reaction can be carried out at room temperature in an open environment, but the temperature of either the polar or the apolar liquid or both can be controlled. Once formed, the dense polymer layer can act as a barrier to inhibit the contact between reactants and to slow down the reaction; hence, the selective dense layer so formed is typically very thin and permeable to water, but relatively impermeable to dissolved, dispersed, or suspended solids. This type of membrane is conventionally described as a reverse osmosis (RO) membrane.

Generally, the polymer matrix of thin film 14 can be prepared by reaction of two or more monomers. In one aspect, the first monomer can be a dinucleophilic or a polynucleophilic monomer and the second monomer can be a dielectrophilic or a polyelectrophilic monomer. That is, each monomer can have two or more reactive (e.g., nucleophilic or electrophilic) groups. Both nucleophiles and electrophiles are well known in the art, and one of skill in the art can select suitable monomers for this use. In one aspect, the first and second monomers can be chosen so as to be capable of undergoing an interfacial polymerization reaction to form a polymer matrix (i.e., a three-dimensional polymer network) when brought into contact. In a further aspect, the first and second monomers can be chosen so as to be capable of undergoing a polymerization reaction when brought into contact to form a polymer product that is capable of subsequent crosslinking by, for example, exposure to heat, light radiation, or a chemical crosslinking agent.

In one aspect, a first monomer can be selected so as to be miscible with a polar liquid and, with the polar liquid, can form a polar mixture. In a further aspect, the first monomer can be selected so as to be miscible with an apolar liquid; however, The first monomer can optionally also be selected so as to be immiscible with an apolar liquid. Typically, the first monomer can be a dinucleophilic or a polynucleophilic monomer. In a further aspect, the first monomer can be a diaminobenzene. For example, the first monomer can be m-phenylenediamine. As a further example, the first monomer can be a triaminobenzene. In a yet further aspect, the polar liquid and the first monomer can be the same compound; that is, the first monomer can provided and not dissolved in a separate polar liquid.

In one aspect, a second monomer can be selected so as to be miscible with an apolar liquid and, with the apolar liquid, can form an apolar mixture. The second monomer can optionally also be selected so as to be immiscible with a polar liquid. Typically, the second monomer can be a dielectrophilic or a polyelectrophilic monomer. In a further aspect, the second monomer can be a trimesoyl halide. For example, the second monomer can be trimesoyl chloride. As a further example, the second monomer can be a phthaloyl halide. In a yet further aspect, the apolar liquid and the second monomer can be the same compound; that is, the second monomer can provided and not dissolved in a separate apolar liquid.

Generally, the difunctional or polyfunctional nucleophilic monomer can have primary or secondary amino groups and can be aromatic (e.g., m-phenylenediamine, p-phenyenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris(2-diaminoethyl)amine). Examples of suitable amine species include primary aromatic amines having two or three amino groups, for example m-phenylene diamine, and secondary aliphatic amines having two amino groups, for example piperazine. The amine can typically be applied to the microporous support as a solution in a polar liquid, for example water. The resulting polar mixture typically includes from about 0.1 to about 20 weight percent, for example from about 0.5 to about 6 weight percent, amine. Once coated on a porous support, excess polar mixture can be optionally removed. The polar mixture need not be aqueous, but the polar liquid should, in one aspect, be immiscible with the apolar liquid.

Generally, difunctional or polyfunctional electrophilic monomer is preferably coated from an apolar liquid, although the monomer can be optionally delivered from a vapor phase (for monomers having sufficient vapor pressure). The electrophilic monomer can be aromatic in nature and can contain two or more, for example three, electrophilic groups per molecule. In the case of acyl halide electrophilic monomers, because of the relatively lower cost and greater availability, acyl chlorides are generally more suitable than the corresponding bromides or iodides. A suitable polyfunctional acyl halide is trimesoyl chloride (TMC). The polyfunctional acyl halide can be dissolved in an apolar organic liquid in a range of, for example, from about 0.01 to about 10.0 weight percent or from about 0.05 to about 3 weight percent, and delivered as part of a continuous coating operation. Suitable apolar liquids are those which are capable of dissolving the electrophilic monomers, for example polyfunctional acyl halides, and which are immiscible with a polar liquid, for example water. In particular, suitable polar and apolar liquids can include those which do not pose a threat to the ozone layer and yet are sufficiently safe in terms of their flashpoints and flammability to undergo routine processing without having to undertake extreme precautions. Higher boiling hydrocarbons, i.e., those with boiling points greater than about 90° C., such as $C_8$-$C_{24}$ hydrocarbons and mixtures thereof, have more suitable flashpoints than their $C_5$-$C_7$ counterparts, but they are less volatile.

Once brought into contact with one another, the electrophilic monomer and nucleophilic monomer react at the surface interface between the polar mixture and the apolar mixture to form a polymer, for example polyamide, discriminating layer 14. The reaction time is typically less than one second, but contact time is often longer, for example from one to sixty seconds, after which excess liquid can optionally be removed, e.g., by way of an air knife, water bath(s), dryer, and the like. The removal of the excess polar mixture and/or apolar mixture can be conveniently achieved by drying at elevated temperatures, e.g., from about 40° C. to about 120° C., although air drying at ambient temperatures can be used.

Through routine experimentation, those skilled in the art will appreciate the optimum concentration of the monomers, given the specific nature and concentration of the other monomer, reaction conditions, and desired membrane performance.

3. Optional Post-Treatment

Various post-treatments can be employed to enhance water permeability, solute rejection, or fouling resistance of a formed TFC membrane 10 or 11. For example, a membrane can be immersed in an acidic and/or basic solution to remove residual, unreacted acid chlorides and diamines which can improve the flux of the formed composite membrane. Additionally, heat treatment, or curing, can also be applied to promote contact between the polyamide film 14 and polysulfone support 12 (e.g., at low temperature) or to promote cross-linking within the formed polyamide film 14. Generally, curing increases solute rejection, but often at the cost of lower water permeability. Finally, a membrane can be exposed to an oxidant such as chlorine by filtering a 10-20 ppm solution of, for example, sodium hypochlorite through the membrane for 30-60 minutes. Post-chlorination of a fully aromatic polyamide thin film composites forms chloramines as free chlorine reacts with pendant amine functional groups within the polyamide film. This can increase the negative charge density, by neutralizing positively-charged pendant amine groups, and the result is a more hydrophilic, negatively charged RO membrane 10 or 11 with higher flux, salt rejection, and fouling resistance.

Membrane surface properties, such as hydrophilicity, charge, and roughness, typically correlate with RO membrane surface fouling. Generally, membranes with highly hydrophilic, negatively charged, and smooth surfaces yield good permeability, rejection, and fouling behavior. However, important surface attributes of RO membranes—to promote fouling resistance—include hydrophilicity and smoothness. Membrane surface charge can also be a factor when solution ionic strength is significantly less than 100 mM because at or above this ionic strength electrical double layer interactions are negligible. Since many RO applications involve highly saline waters, one cannot always rely on electrostatic interactions to inhibit foulant deposition. Moreover, it has been demonstrated that polyamide composite membrane fouling by natural organic matter (NOM) is typically mediated by calcium complexation reactions occurring between carboxylic acid functional groups of the NOM macromolecules and pendant carboxylic acid functional groups on the membrane surface.

4. Optional Hydrophilic Layer Formation

Creation of an inert, hydrophilic, smooth composite membrane surface can be accomplished conventionally applying an additional coating layer 16 comprised of a water-soluble (super-hydrophilic) polymer such as polyvinyl alcohol (PVA), polyvinyl pyrrole (PVP), or polyethylene glycol (PEG) on the surface of a polyamide composite RO membrane. In recent years, several methods of composite membrane surface modification have been introduced in membrane preparation beyond simple dip-coating and interfacial polymerization methods of the past. These advanced methods include plasma, photochemical, and redox initiated graft polymerization, drying-leaching (two-step), electrostatically self-assembled multi-layers. Advantages of these surface modification approaches include well-controlled coating layer thickness, permeability, charge, functionality, smoothness, and hydrophilicity. However, a drawback of all of these conventional surface modification methods is the inability to economically incorporate them into existing commercial manufacturing systems.

Currently, one preferred approach to surface modification of thin film composite membranes remains the simple dip coating-drying approach. In addition, polyvinyl alcohol can be an attractive option for modification of composite membranes because of its high water solubility and good film-forming properties. It is known that polyvinyl alcohol is little affected by grease, hydrocarbons, and animal or vegetable oils; it has outstanding physical and chemical stability against organic solvents. Thus, polyvinyl alcohol can be used as a protective skin layer in the formation of thin-film composite membranes for many reverse osmosis applications, as well as an ultra-thin selective layer in many pervaporation applications.

A PVA coating layer 16 can be formed on the surface of a polyamide composite membrane as follows. An aqueous PVA solution with ~0.1-10 wt % PVA with molecular weight ranging from 2,000 to over 70,000 can be prepared by dissolving the polymer in distilled/deionized water. PVA powder is easily dissolved in water by stirring at ~90° C. for ~5 hours. The already formed polyamide composite membrane is contacted with the PVA solution and the deposited film is dried overnight. Subsequently, the membrane can be brought into contact (e.g., from the PVA side) with a solution containing a cross-linking agent (e.g., dialdehydes and dibasic acids) and catalyst (e.g., ~2.4 wt % acetic acid) for about 1 second. The membrane can then be heated in an oven at a predetermined temperature for a predetermined period. Various cross-linking agents (glutaraldehyde, PVA-glutaraldehyde mixture, paraformaldehyde, formaldehyde, glyoxal) and additives in the PVA solution (formaldehyde, ethyl alcohol, tetrahydrofuran, manganese chloride, and cyclohexane) can be used to prepare PVA films cast over existing membranes in combination with heat treatment of prepared PVA films to modify film properties.

The polymer, in one aspect, can include at least one of polyvinyl alcohol, polyvinyl pyrrole, polyvinyl pyrrolidone, hydroxypropyl cellulose, acrylic acids, poly(acrylic acids), polyethylene glycol, saponified polyethylene-vinyl acetate copolymer, triethylene glycol, or diethylene glycol or a mixture thereof. In one aspect, the hydrophilic polymer can be a crosslinked polyvinyl alcohol.

At least one crosslinking agent can optionally be provided in the method. That is, in one aspect, the hydrophilic polymer can be a crosslinked hydrophilic polymer. In a further aspect, the hydrophilic layer can be a non-crosslinked hydrophilic polymer.

F. Methods of Using the Membranes

In certain aspects, the membranes disclosed herein can be used in conventional filtration methods for example to purify a liquid by removing solutes dissolved, suspended, or dispersed within the liquid as it is passed through the membrane. In a further example, the membranes can be used to concentrate solutes by retaining the solutes dissolved, suspended, or dispersed within a liquid as the liquid is passed through the membrane.

1. Purifying Liquids

In one aspect, the membranes disclosed herein (e.g., 13 or 15) can be used for reverse osmosis separations including seawater desalination, brackish water desalination, surface and ground water purification, cooling tower water hardness removal, drinking water softening, and ultra-pure water production.

The feasibility of a membrane separation process is typically determined by stability in water flux and solute retention with time. Fouling, and in particular biological fouling, can alter the selectivity of a membrane and causes membrane degradation either directly by microbial action or indirectly through increased cleaning requirements. These characteristics can have a direct effect on the size of the membrane filtration plant, the overall investment costs, and operating and maintenance expenses. By applying the membranes and methods disclosed herein to commercial membrane and desalination processes, the overall costs can be significantly reduced due to the improved compaction resistance of the membranes of the invention.

The membranes 13 can have a first face and a second face. The first face of the membrane can be contacted with a first solution of a first volume having a first salt concentration at a first pressure; and the second face of the membrane can be contacted with a second solution of a second volume having a second salt concentration at a second pressure. The first solution can be in fluid communication with the second solution through the membrane. The first salt concentration can then be higher than the second salt concentration, thereby creating an osmotic pressure across the membrane. The first pressure can be sufficiently higher than the second pressure to overcome the osmotic pressure, thereby increasing the second volume and decreasing the first volume.

In further aspects, the membranes disclosed herein can be used for reverse osmosis separations including liquids other than water. For example, the membranes can be used to remove solutes from alcohols, including methanol, ethanol, n-propanol, isopropanol, or butanol. Typically, suitable liquids are selected from among liquids that do not substantially react with or solvate the membranes.

2. Concentrating Solutes

In one aspect, the membranes and films disclosed herein can be used in isolation techniques for recovering a solute—for example a valuable product—from a liquid, for example water or one or more alcohols. The solutes thereby collected can be the product of a chemical or biological reaction, screening assay, or isolation technique, for example, a pharmaceutically active agent, or a biologically active agent or a mixture thereof.

In one aspect, the membranes can be used for concentrating a solute by providing and including selected particles 18. The membrane 13 has a first face and a second face; the first face of the membrane can be contacted with a first mixture of a first volume having a first solute concentration at a first pressure; the second face of the membrane can be contacted with a second mixture of a second volume having a second solute concentration at a second pressure; and the impurity can be collected. The first mixture can be in fluid communication with the second solution through the membrane, wherein the first impurity concentration is higher than the second impurity concentration, thereby creating an osmotic pressure across the membrane, and wherein the first pressure is sufficiently higher than the second pressure to overcome the osmotic pressure, thereby increasing the second volume and decreasing the first volume.

G. Experimental

The following examples are put forth so as to provide those of ordinary skill in the art with a complete disclosure and description of how the compounds, compositions, articles, devices and/or methods disclosed herein can be made and evaluated, and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. and is at ambient temperature, and pressure is at or near atmospheric.

1. Preparation of Membranes

Polysulfone (PSf) transparent beads with number average molecular weight of 70,000 Da (Acros-Organics, USA), N-methylpyrrolidone (NMP) (reagent grade, Acros Organics, USA), and laboratory prepared de-ionized water were used to form polysulfone supports. In this example, a total of 14 different nanoparticles were used from different sources, the detail of which is given in the graphs shown in FIGS. 7a and 7b. Dextran with different molecular weights (ranging from 50,000-360,000) were obtained from M/s. Fluka, USA.

Support membranes are prepared by dissolving 18 g PSf beads in 72 mL of NMP in airtight glass bottles. In the case of the nanocomposites, 3.6 g of various nanoparticles were dispersed in NMP before addition to the polysulfone polymer. The solution was then agitated for several hours until complete dissolution was achieved, forming a dope solution. The dope solution was then spread over a non-woven fabric (SepRO, Oceanside, Calif.) that was attached to a glass plate via a knife-edge. The glass plate is immediately immersed in de-mineralized water acclimated to room temperature to induce phase inversion. After 30 minutes the non-woven fabric supported polysulfone and nanocomposite films are removed from the water bath and separated from the glass plate. The membrane is washed thoroughly with de-mineralized water and stored in a laboratory refrigerator maintained at 5° C.

2. Formation of Hydrophilic Coatings

A PVA coating layer 16 can be formed on a substrate (film 14 on support 12) as follows. An aqueous PVA solution with ~0.1-10 wt % PVA with molecular weight ranging from 2,000 to over 70,000 can be prepared by dissolving the polymer in distilled/deionized water. PVA powder is easily dissolved in water by stirring at ~90° C. for ~5 hours. The already formed polyamide composite membrane 10 is contacted with the PVA solution and the deposited film 16 is dried overnight. Subsequently, the membrane 11 can be brought into contact (from the PVA side 16) with a solution containing a cross-linking agent (e.g., dialdehydes and dibasic acids) and catalyst (e.g., ~2.4 wt % acetic acid) for about 1 second. The membrane 11 can then be heated in an oven at a predetermined temperature for a predetermined period. Various cross-linking agents (glutaraldehyde, PVA-glutaraldehyde mixture, paraformaldehyde, formaldehyde, glyoxal) and additives in the PVA solution (formaldehyde, ethyl alcohol, tetrahydrofuran, manganese chloride, and cyclohexane) can be used to prepare PVA films cast over existing membranes in combination with heat treatment of prepared PVA films to modify film properties.

3. Evaluation of Membranes

Figure 8:
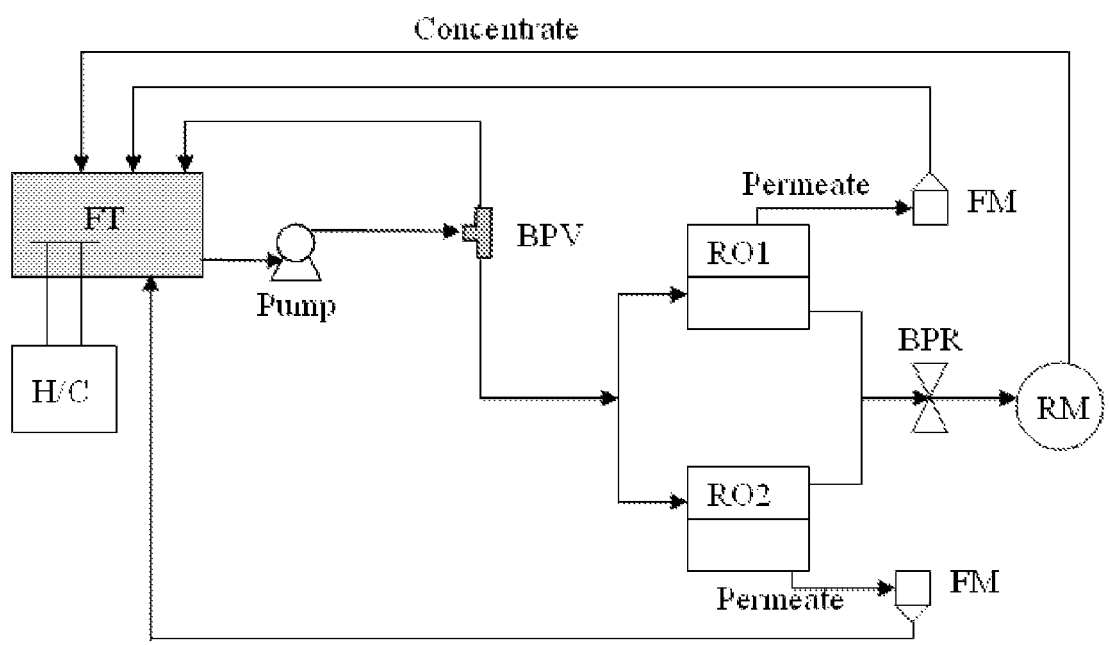
FIG. 8 is a schematic of a cross flow filtration system used in the testing of support membranes with nanoparticles in the support layer.

Referring now generally to FIG. 6-FIG. 19, tests were conducted of porous support membranes in which selected nanoparticles were disbursed during polymerization. A total of nine membranes were tested in a cross flow membrane filtration system using a 10 mM NaCl electrolyte (~585 ppm) as the feed solution. The system was designed to simultaneously test two membranes in parallel as shown in particular in FIG. 8. To meet this design requirement, two identical cross flow membrane filtration units were used. Both of the units have dimensions of 76.2 and 25.4 mm for the channel length and width, respectively, while the channel height is 3.0 mm. These channel dimensions give an effective membrane area of 0.0019 $m^2$ for each unit. The applied pressure ($\Delta P$) and cross flow velocity were kept constant and monitored by a pressure gauge (Ashcroft Duralife 0-1000 psig) and rotameter (King Instrument Company, USA), respectively. Flux was monitored both in real-time by a digital flow meter (Agilent Optiflow 1000) and by measuring permeate volume during a two minute time interval. A recirculating heater chiller (Neslab RTE-211) was used to help offset heating due to the pump and to keep the temperature constant.

Referring now again in particular to FIG. 8, various configurations of membranes 13 tested were both commercially available polyamide thin film composites (PA-TFC) and hand-cut membranes fabricated in our lab. The two commercial membranes were NF90 and NF270. NF90 is intended for use as a loose brackish water reverse osmosis membrane, while NF270 is intended for use as a nanofiltration membrane. The hand-cut membranes were polyamide thin film composites (PA-TFC) formed over nanocomposite and pure polysulfone supports.

Seven different membranes were fabricated for testing. One membrane was made from pure polysulfone, while the other six contained various nanoparticles to be discussed later in the section, described herein as nanocomposite support membranes. The preparation of the support membrane was started by the addition of N-methylpyrrolidone (NMP) solvent (Acros Organics, USA) to a polysulfone polymer ($M_w$ 26,000 from Aldrich, USA) in transparent bead form in airtight glass bottles. In the case of the nanocomposite support membranes, various nanoparticles were dispersed in the NMP before its addition to the polysulfone polymer. The solution was then agitated for several hours until complete dissolution was achieved, forming the dope solution. The dope solution was then spread over a non-woven fabric (SepRO, Oceanside, Calif.) that was attached to a glass plate via a knife-edge. The glass plate was immediately immersed into de-mineralized water, which had been maintained at the desired temperature. Immediately, phase inversion begins and after several minutes, the non-woven support fabric supported polysulfone membrane is separated from the glass plate. The membrane is then washed thoroughly with deionized water and stored in cold conditions until usage.

Thin-film composite membranes, cast on pure polysulfone and nanocomposite support membranes, were prepared as described above and were made via interfacial polymerization. Polymerization occurs at the interface of two immiscible solvents that contain the reactant. For the membranes tested, the polymerization was between m-phenylenediamine (MPD) and trimesoyl chloride (TMC) (Sigma-Aldrich, City, State, USA), on the non-woven fabric supported polysulfone or nanocomposite support membranes. The support membrane was immersed is an aqueous solution of MPD for 15 seconds. The excess MPD solution was then removed from the skin surface of the support membrane via an air knife. The support membrane was then immersed into an organic solution, isoparaffin based hydrocarbon oil (ExxonMobil Isopar G, Gallade Chemical, Inc., Santa Ana, Calif.), of TMC (Aldrich, USA) for 15 seconds, resulting in the formation of an ultra-thin film of polyamide over the surface of the support membrane. The resulting composite was heat cured for 10 minutes, washed thoroughly with deionized water, and stored in deionized water before performance testing.

Four of the nanocomposite support membranes (M1040, ST50, ST20L, ST-ZL) made used non-porous, amorphous silica nanoparticles provided by the Nissan Chemical Co, Japan. Size and mobility characteristics of these particles were measured using Zeta Pals' Particle Size Software and Zeta Potential Analyzer, respectively (Brookhaven Instrument Corporation). The size of the particle was determined using the dynamic light scattering technique. Before measurements, the pH was adjusted to 6 using HCl and NaOH and the particles were dispersed in a 10 mM NaCl solution. Three measurements were taken for both size and mobility and then averaged.

Referring now to FIG. 7b, the other nanocomposite support membranes were prepared using zeolite nanoparticles provided by NanoScape, Germany. A zeolite is crystalline aluminosilicate with a tetrahedral framework enclosing cavities that are occupied by large ions and water molecules, which are both free to move. Hence, a zeolite has a connected framework, extra framework cations, an adsorbed phase, and an open structure with pores and voids for molecular movement. The particular zeolites used in these membranes, LTA and OMLTA, have channel sizes on the order of about 4 Angstroms. The size and mobility characteristics of these two particles were measured using the same procedures as described above. The major difference between these two zeolites is that OMLTA has been modified with organic matter to potentially improve compatibility with the support membrane polymer.

a. Compaction Experiments

The membranes under investigation were cut into areas of $0.0019\ m^2$ and hydrostatically compacted with a 10 mM NaCl feed solution at pressures of 0, 250, and 500 psi. The cross flow membrane filtration apparatus was run continuously at 25° C. and 0.2 gpm until a steady-state flux was obtained for both membranes in the flow channels, after which the membranes were removed and stored in a desiccator. Flux measurements were recorded every half hour and used to calculate the membrane resistances as shown in the following equation 6.

$$R_m = \frac{\Delta P - \Delta \pi}{\mu \times J} \quad \text{(Equation 6)}$$

Here, $\Delta P$ is the applied pressure, $\Delta \pi$ is the trans-membrane osmotic pressure, $\mu$ is the solution viscosity, and J is the permeate flux. The osmotic pressure term in equation 6 was calculated using equation 7, below.

$$\Delta \pi = 2RT[(CP*C_f) - C_p] \quad \text{(Equation 7)}$$

In equation 7, R is the universal gas constant, T is the temperature, CP is the concentration polarization factor, $C_f$ is the feed concentration, and $C_p$, the permeate concentration. Since concentration polarization is an important factor in nanofiltration and reverse osmosis operation, it was considered. The concentration polarization factor was calculated using equation 8, below.

$$CP = 1 - R_s + R_s \cdot \exp\left(\frac{J}{k}\right) \quad \text{(Equation 8)}$$

In equation 8, $R_s$ is the membrane rejection and k is the mass transfer coefficient. The value of k was calculated using equation 9 and the calculation of membrane rejection is discussed in the following paragraph.

$$k = 1.85(ReSc)^{1/3} \frac{D}{d_h} \quad \text{(Equation 9)}$$

In equation 9, Re is the Reynolds numbers, Sc is the Schmidt number, D is the diffusivity of sodium chloride, and $d_h$ is the double the channel height.

Conductivity, pH, color, and turbidity measurements of the feed and permeate streams were taken at the beginning and end of each experiment. Feed samples were taken directly from the feed tank and permeate samples were collected through tubes which otherwise fed back into the feed tank. Conductivity and pH measurements were taken using a Fisher scientific AR50, while color and turbidity measurements were done with a Hach 2100 AN Turbidimeter. The conductivity values from this were then used to calculate the membrane rejection via equation 10 below.

$$R_s = 1 - \frac{C_f}{C_p} \quad \text{(Equation 10)}$$

Here, $R_s$ is the conductivity rejection, $C_f$ is the feed stream conductivity, and $C_p$, is the permeate stream conductivity.

b. Scanning Electron Microscopy

Scanning electron microscopy (SEM) was used to investigate support membrane structure and thin film surface morphology. Preparation of the membrane samples for SEM usage is very important. SEM usage requires that samples be electrically conductive. Since these membranes are not conductive, conductivity is achieved with a sputter coater, which uses argon gas and an electric field. The sample is placed in a chamber at a vacuum and then argon gas is introduced. An electric field is then used to remove an electron from argon, making it positively charged. It is then attracted to a negative gold foil, knocking gold atoms from the surface of the foil. The gold atoms then settle onto the surface of the sample, producing a gold coating and giving it conductance. Samples also must be free from strain. If this requirement is not met, the cleavage does not represent the primary structure of the membrane sample. This can be done by freezing the sample and breaking it in liquid nitrogen.

c. Commercial Membrane Results

Figure 9:
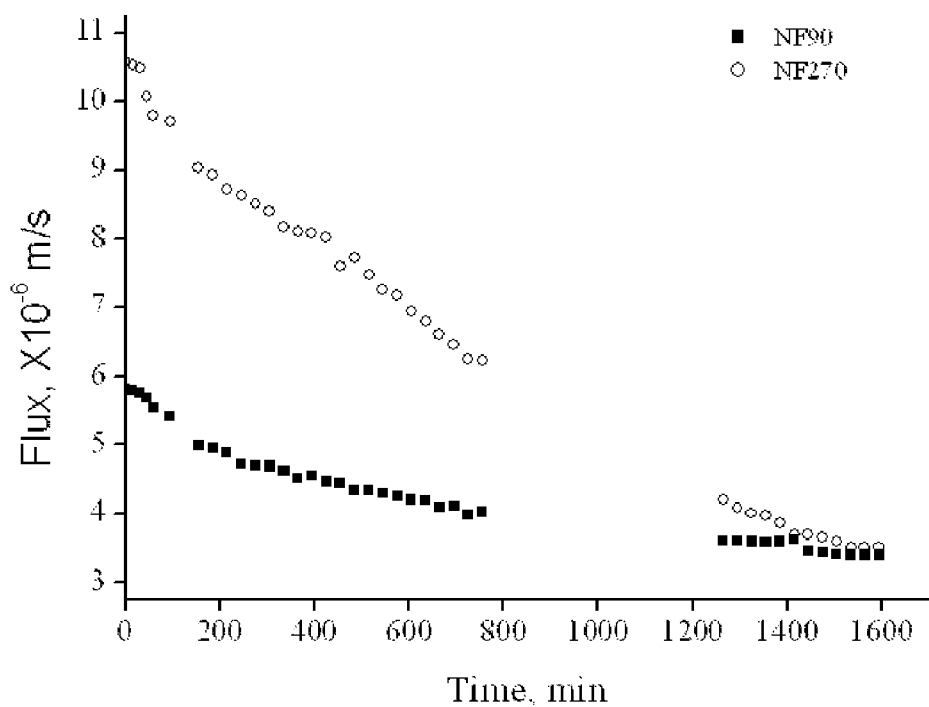
FIG. 9 is a graph of flux vs. time at 250 psi and 10 mM NaCl for the NF90 and NF270 membranes.
Figure 10:
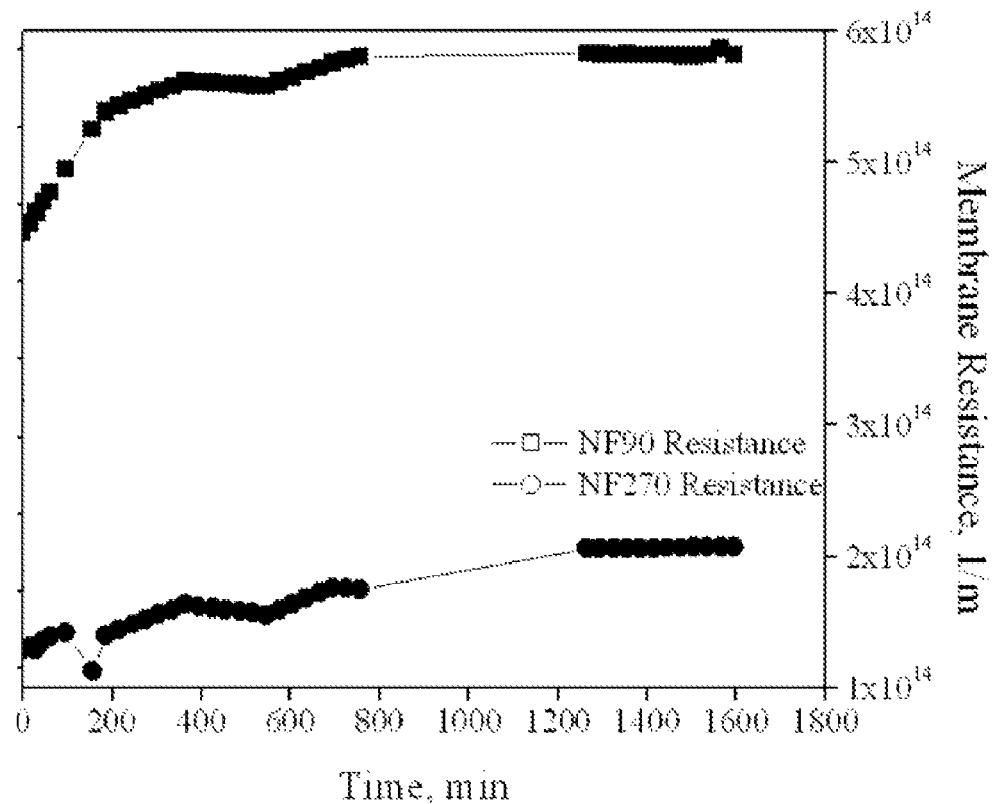
FIG. 10 is a graph of resistance vs. time for 250 psi and 10 mM NaCl for the NF90 and NF270 membranes.

Referring now also to FIG. 9 and FIG. 10, the NF90 and NF270 membranes were characterized. Contact angle, root mean square (RMS), surface area difference (SAD), and zeta potential data were taken using a 10 nM NaCl solution. These values are given below in Table 3 below. The pure water contact angle for NF90 is about 1.5 times larger than that of NF270, meaning it is much more hydrophobic. The more hydrophobic a membrane, the smaller the flow will be. Therefore, it is expected that NF90 will have a much smaller initial flux than NF270. The RMS and SAD values for NF90 are both much greater than for NF270. This indicates that NF270 has a much smoother membrane surface than NF90 and, hence, less propensity for surface fouling. NF90 has a smaller absolute zeta potential than NF270. This indicates that NF270 membranes have more charge, resulting in a stronger electrostatic repulsion force and greater Donan exclusion influence.

TABLE 3

Summary of NF90 and NF270 characteristics

| | $\theta_{water}$ (°) | IS (mm) | RMS (nm) | SAD (%) | $\zeta_m$ (mV) |
|---|---|---|---|---|---|
| NF90 | 67.5 ± 0.3 | 0.01 | 40 | 19 | −12 |
| NF270 | 39.7 ± 0.4 | 0.01 | 4 | 0.4 | −20 |

Still referring now to FIG. 9 and FIG. 10, the NF90 and NF270 membranes were tested at 250 psi using a 10 mM NaCl feed solution. The initial flux of NF270 was almost double that of NF90. This can be attributed to the porosity of each membrane. Since NF270 is intended for use as a nanofiltration membrane, it has a greater porosity than a NF90 membrane, which is intended for use as a brackish water reverse osmosis membrane. The flux reduction is clearly much greater for NF270 membranes than NF90 membranes, as seen in FIG. 9, and can be explained in two ways. First, the materials used to make each membrane differ. As described earlier, NF270 membrane films are piperazine based polyamides, while NF90 membrane films are made of 1,3-diaminobenzene based polyamides. Therefore, NF90 membrane films are made of fully aromatic thin films, while NF270 membrane films are made of partially aromatic thin films and azide rings. In general, aromatic rings are more rigid than aliphatic and azide compounds; hence, the NF90 film can be inherently more rigid due to its fully aromatic thin film structure. Therefore, NF90 will experience less compaction and less flux decline. Secondly, flux decline is observed due to compaction occurring within the support membrane. As the membrane is subjected to high pressures, the support membrane begins to change structure and the mean pore diameter decreases, restricting flow through the membrane. The flux reaches a steady-state value when the support membrane structure has been fully compacted at that pressure.

Referring now in particular to FIG. 10, resistance for each sample time is plotted. Resistance values were calculated using a standard Darcy resistance in series model given described above. NF90 membranes have an initial membrane resistance about 1.5 times larger than NF270 membranes, however, the membrane resistance increases much more drastically with NF270 membranes. This trend can be explained both mathematically and physically. Seen in equation 6, membrane resistance is inversely proportional to flux. As discussed above, membrane flux for NF270 is greater initially, thus, it has a lower initial resistance. Following these same lines, NF270 has a much more drastic change in flux, so it will have a greater change in resistance. Physically, there are two possible reasons for the displayed behavior, but both deal with internal fouling. First, as explained above, the materials of the two membranes are different. The NF90 membrane, due to its fully aromatic materials, is more rigid and, hence, compacts less. Therefore, the flow path is not as restricted over time and there is a smaller change in flux, translating to a smaller change in membrane resistance. Secondly, the porosity of NF270 membranes is greater. This provides more spots for compaction to occur over time. More compaction results in less flux through the membrane and a larger membrane resistance.

Referring now to FIGS. 10-19, the structural changes of the membrane and the pores are visibly seen in the following SEM images.

Referring now to FIGS. 11-19, cross-section SEM images were taken of both virgin and compacted NF90 and NF270 membranes. As can be seen for both membranes, the polysulfone support layer of the virgin membranes is much thicker than the corresponding compacted membranes. The support layer is physically becoming smaller, and, therefore, denser and less permeable to water. NF270 appears to have experienced a greater change in thickness (from 55.7 to 42.6 μm) than NF90 (from 59.7 to 47.9 μm), but the quantitative change in thickness is dependent upon where the membranes were sampled. This brings to attention the limitations of the SEM process used. There are two big sources of uncertainty in this analysis. First, the backing material on which the membranes were cast does not freeze fracture cleanly. This makes it difficult to produce clean SEM images. Secondly, the exact location of the SEM picture is fairly arbitrary and was chosen to give the clearest image. Since each position on the membrane has a slightly different thickness, the location of the measurement will affect the result. Therefore, SEM images should only be used for qualitative analysis.

Table 4 below summarizes the above discussions. Change in resistance and thickness is given by a percentage. These values were calculated using the standard equation of final minus initial divided by final. The change in both calculated membrane resistance is greater for NF270 than it is for NF90. The change in resistance can be explained by internal fouling of the support membrane. As the membrane undergoes compaction, the structure of the support membrane changes and the pores undergo constriction. This inhibits the flux of water through the membrane and, in turn, results in a larger membrane resistance.

TABLE 4

Change in membrane resistance and thickness before and after 24-hour compaction at 250 psi

| Membrane | $R_m$ Initial (1/m) | $R_m$ Final (1/m) | $\Delta R_m$ (%) | $R_s$ Initial (%) | $R_s$ Final (%) | $\Delta R_s$ (%) | $\delta_m$ Initial (µm) | $\delta_m$ Final (µm) | $\Delta \delta_m$ (%) |
|---|---|---|---|---|---|---|---|---|---|
| NF90 | 3.24E+14 | 5.52E+14 | 41 | 0.66 | 0.89 | 26 | 59.7 | 47.9 | −25 |
| NF270 | 1.83E+14 | 5.47E+14 | 67 | 0.13 | 0.26 | 50 | 55.7 | 42.6 | −31 | d. Nanocomposite Membrane Results

Size and mobility characteristics of the nanoparticles used to make the nanocomposite membranes in the lab are given below in Table 5. The silica particles range in size from approximately 34 nm to 130 nm. The zeolite particles are much larger and are approximately 250-300 nm. Since the membranes were cast based on a mass scale and the zeolite particles are much larger, it is expected that there will be less zeolite particles throughout the porous layer of the support membrane. The zeta potential of the silica particles ranges from −8.9 mV to −27 mV, while both zeolite particles have a zeta potential of around −13 mV. Since ST50 particles have the smallest zeta potential measurements, it would be expected that a membrane doped with ST50 nanoparticles would be the least negatively charged. The other silica particles all have zeta potentials around −26 or −27 mV, but ST-ZL is largest in size so it will have the least charge density, followed by M1040 and then ST20L. The larger the charge density, the more charge per area of particle, and consequently, the more charge that is added to the membrane. Thus, the addition of ST20L nanoparticles should result in a more negatively charged membrane than the addition of M1040 or ST-ZL. Since the OMLTA and LTA zeolites have approximately the same zeta potential, the organic modifications to the LTA did not significantly alter the charge of the particle. The addition of these two particles produces membranes with similar charge.

TABLE 5

Nanoparticle Characteristics at a pH of 6 and 10 mM NaCl

| Particle | DLS Diameter (nm) | Zeta Potential (mV) |
|---|---|---|
| ST50 | 34 | −8.9 |
| ST20L | 69 | −26 |
| ST-ZL | 130 | −26 |
| M1040 | 120 | −27 |
| LTA | 275 | −15 |
| OMLTA | 275 | −13 |

All of the thin film composite (TFC) membranes with nanocomposite support membranes, except the ST50-TFC membrane, have a slightly smaller water contact angle than the pure TFC membrane, that is, than the TFC membrane with a pure polysulfone support membrane. This means they are slightly more hydrophilic and should exhibit a higher initial flux. The ST50-TFC membrane has a little larger contact angle than a TFC membrane on a pure or undoped polysulfone support membrane and, therefore, is more hydrophobic and should have an initial flux that is lower. The zeta potential is smaller for the LTA-TFC than the TFC and only slightly larger with the addition of ST20L particles, but is much larger with the addition of all other particles. Since the nanoparticles themselves are negatively charged, it would follow that with their addition, the membranes become more negatively charged. Since the zeolite particle (LTA) is much bigger than the others, it experiences larger interfacial interactions with the polysulfone. These interfacial interactions can alter the behavior of both the LTA and polysulfone, resulting in a membrane with a smaller electrochemical potential. However, this does not occur with the OMLTA particles that are also large in size. The organic modifications used to create the OMLTA particle appear to be surface modifications. The addition of organic material onto the surface would alter the surface chemistry and its reaction when in contact with polysulfone, explaining the radically different zeta potentials of the OMLTA-TFC and the LTA-TFC.

TABLE 6

Nanocomposite thin-film membrane characteristics

| Membrane | Contact Angle Pure Water (°) | Zeta Potential $\zeta_{membrane}$ (mV) |
|---|---|---|
| TFC | 71 | −8.3 |
| LTA-TFC | 67 | −5.6 |
| OMLTA-TFC | 69 | −14 |
| M1040 | 69 | −12 |
| ST-ZL | 70 | −13 |
| ST20L-TFC | 70.4 | −8.9 |
| ST50-TFC | 72 | −11 |

Referring now to FIG. 6a and FIG. 6b, all seven membranes manufactured in the lab were tested under 250 and 500 psi with a feed solution of 10 mM NaCl. At 250 psi, only the OMLTA-TFC and M1040 based nanocomposite RO membranes had larger flows and were more permeable than the pure polysulfone support based RO membrane as shown in FIG. 6a. At 500 psi, however, all 7 nanocomposite membranes exhibit a larger flow and higher permeability as shown in FIG. 6b. As stated above, the membranes made in the lab are typically considered reverse osmosis membranes and typically meant to operate at high pressures. Addition of nanoparticles to the membranes alters support membrane void structure such that the flux performance of the resulting RO membrane (cast over the nanocomposite support) tends to be less than a conventional TFC RO membrane when operating at relatively low pressures. However, at higher pressures, the voids within the support membrane collapse and restrict water flow. Addition of nanoparticles combats this by reducing the number and size of the macrovoids within the support membrane and by filling space with hard, incompressible material, thereby, providing greater overall resistance to compaction. This results in reduced flux decline.

Referring now to FIGS. 7a and 7b, membrane resistance increases with time at both 250 and 500 psi. At 250 psi, resistance varies from highest to lowest in the following manner: ST20L-TFC, ST50-TFC, ST-ZL, LTA-TFC, TFC, M1040, and OMLTA-TFC. The resistance at 500 psi showed a slightly different trend with resistance varying from highest to lowest as follows: TFC, ST-EL, M1040, ST20L-TFC, LTA-TFC, OMLTA-TFC, and ST50-TFC. There was little or no correlation found to exist between measured resistance, or change in resistance, versus the hydrophilicity/hydrophobicity of the membrane or membrane surface charge. Also, there was no correlation found between membrane resistance and size of the nanoparticle added. However, membrane resistance was found to be inversely proportional to permeability. As with the commercial membranes, this can be explained both mathematically and physically. Equation 6 shows membrane resistance is inversely related to flux, which is directly related to permeability. Physically, membranes that are more permeable contain more numerous or larger macrovoids. This means a greater possibility of internal fouling and, hence, a larger membrane resistance.

The poor performance at 250 psi, in terms of a higher membrane resistance, of many of the nanocomposites compared to the pure polysulfone TFC can be due to the way the membranes were cast. SEM images show that many of the nanoparticles form clusters within the membrane surface. It has been reported that clustered nanoparticles can exhibit properties even worse than conventional polymer systems. Therefore, one way to lower the membrane resistance of the nanocomposite membranes is to disperse the particles throughout the surface and avoid any clustering.

It should be noted that at 500 psi, all nanocomposites performed better, in terms of having a lower membrane resistance, than the TFC membrane. At higher pressures, voids within the membrane can begin to collapse and restrict water flow. Nanoparticle addition combats this by reducing the size and number of macrovoids within the membrane structure and, thereby, providing it with more strength. Ultimately, this results in less collapsing within the membrane structure, a less restricted pathway for water flow, and a smaller membrane resistance.

At both 250 and 500 psi, rejection increases from the beginning to end of the run time as shown in FIGS. 7a and 11b. The one exception to this trend is the LTA-TFC at 250 psi, in which the membrane was damaged. The rejection performance of the membranes differs, however, between 250 and 500 psi. At 250 psi, the order from highest to lowest rejection is: LTA-TFC, ST-ZL, TFC, OMLTA-TFC, STSO-TFC, ST20L-TFC, and M1040. At 500 psi, the initial rejection, in order from highest to lowest is: ST50-TFC, TFC, OMLTA-TFC, LTA-TFC, ST20L-TFC, ST-ZL, and M1040. The rejection of M1040 at 500 psi increases much more drastically from the initial to final measurement than any other membrane. SEM images of the M1040 particles show that these particles tend to form more aggregates than any other nanoparticle within the polymer matrix. At a high pressure, the membrane pores collapse, but since the M1040 particles are less disperse, there are more pores to collapse and larger areas of rigid regions than with other particles. The salt cannot pass through the restricted pores of the membrane or through the M1040 particles so rejection is increased. There was little or no correlation found to exist between rejection, or change in rejection, versus membrane surface charge or contact angle. Also, there was no correlation found between rejection and size of the nanoparticle added. There is, however, a very strong linear correlation between the change in membrane resistance, change in flux, and change in membrane rejection as shown in Table 7. As the flux decreases and membrane resistance increases, the membrane rejection increases. This trend can be explained mechanistically. As previously discussed, under pressure, the support layer compacts, restricting the pores. It is this restriction that causes a decrease in flux and increase in resistance. Similarly, as the pore size becomes smaller, the membrane rejection improves.

TABLE 7

Correlation factors of membrane rejection versus resistance and flux at both (a) 250 and (b) 500 psi

| Membrane | Rm, 1/m Start | End | $\Delta R_m$ (%) | J, m/s Start | End | $\Delta J$ (%) | $R_s$, % Start | End | $\Delta R_s$ (%) |
|---|---|---|---|---|---|---|---|---|---|
| (a) | | | | | | | | | |
| ST20L-TFC | 3.32E+15 | 4.22E+15 | 27 | 5.73E−07 | 4.49E−07 | −28 | 72 | 79 | 10 |
| TFC | 1.73E+15 | 2.52E+15 | 46 | 1.10E−06 | 7.50E−07 | −47 | 77 | 86 | 10 |
| OMLTA-TFC | 1.26E+15 | 1.57E+15 | 24 | 1.50E−06 | 1.20E−06 | −25 | 76 | 87 | 12 |
| ST50-TFC | 2.63E+15 | 3.65E+15 | 39 | 7.21E−07 | 5.19E−07 | −39 | 74 | 81 | 8 |
| LTA-TFC | 2.09E+15 | 2.62E+15 | 25 | 9.01E−07 | 7.21E−07 | −25 | 90 | 87 | −3 |
| ST-ZL | 2.36E+15 | 2.84E+15 | 20 | 8.01E−07 | 6.65E−07 | −21 | 83 | 87 | 5 |
| M1040 | 1.63E+15 | 2.26E+15 | 39 | 1.17E−06 | 8.41E−07 | −39 | 63 | 75 | 16 |
| (b) | | | | | | | | | |
| ST20L-TFC | 8.98E+14 | 1.51E+15 | 41 | 4.27E−06 | 2.52E−06 | −69 | 65 | 91 | 28 |
| TFC | 4.57E+15 | 9.10E+15 | 50 | 8.42E−07 | 4.21E−07 | −100 | 62 | 87 | 29 |
| OMLTA-TFC | 7.02E+14 | 1.01E+15 | 31 | 5.44E−06 | 3.76E−06 | −45 | 76 | 92 | 18 |
| ST50-TFC | 8.36E+14 | 1.06E+15 | 21 | 4.56E−06 | 3.60E−06 | −21 | 84 | 97 | 13 |
| LTA-TFC | 1.06E+15 | 1.56E+15 | 32 | 3.60E−06 | 2.45E−06 | −47 | 75 | 90 | 16 |
| ST-ZL | 2.29E+15 | 3.54E+15 | 35 | 1.68E−06 | 1.08E−06 | −56 | 59 | 87 | 32 |
| M1040 | 9.45E+14 | 3.12E+15 | 70 | 4.09E−06 | 1.23E−06 | −233 | 40 | 93 | 58 |

The above tables show that the addition of nanoparticles aide in flux reduction at higher pressures, but the question still remains as to if this improvement is a result of increased stability. Cross-section SEM images of virgin and compacted membranes are shown in the following figures. Although the exact measured thickness is dependent upon the location the SEM image was taken, these images clearly demonstrate that membranes containing nanoparticles remain at relatively the same thickness after compaction, while the pure polysulfone membrane experiences a much more drastic change in thickness. Hence, the addition of amorphous silica and zeolite nanoparticles results in increased mechanical stability and, therefore, less physical compaction of the membrane.

Referring now generally to FIG. 13 a-c through FIG. 19 a-c, and in particular to FIG. 13 a-c, SEM images of the pure polysulfone TFC membrane are shown. The uncompacted SEM image, as expected, shows a membrane with many straight-through, asymmetric pores. Although the freeze-fracture for the membrane tested at 250 psi was not completely clean, this membrane is still visibly thinner than the uncompacted TFC membrane. The pore structure at 250 psi is not noticeably different from the uncompacted membrane, but the membrane compacted at 500 psi has a porous structure which is visibly more narrow than the virgin membrane.

Referring now in particular to FIG. 14, the uncompacted ST20L-TFC has a structure similar to that of the uncompacted TFC. After both an applied pressure of 250 and 500 psi, there is no real noticeable difference between the structure of the pure and the compacted membranes.

Referring now to FIG. 15, the LTA particles are fairly large and can be seen dispersed throughout the support structure as shown. Although the support membrane appears larger after 500 psi of pressure, this is a function of the location of the SEM image and not a special phenomena. All three images in FIG. 15 appear to have similar structures, supporting the hypothesis that the addition of nanoparticles will limit the change in membrane structure caused by compaction. Once again, the problem of the support material and its inability to freeze-fracture cleanly is evident in these images.

Referring now to FIG. 16a-c, the figures show that after operation at 250 psi, the M1040 membrane has a porous structure that is curved and no longer straight. This is not the case at 500 psi, however. The M1040 particles formed aggregates inside the membrane that was tested at 250 psi. As discussed above, this can weaken the membrane structure and, hence, cause more structural damages than the pure TFC membrane. Aggregation was not a problem in the membrane tested at 500 psi and it performed just as well as the other nanoparticles.

Referring now to FIG. 17 the SEM images of the ST50L-TFC membrane are shown. All three support structures look very similar, supporting that hypothesis that adding nanoparticles helps limit the effect of compaction. The nanoparticles can be seen in the images and are well dispersed throughout the support layer.

Referring now to FIG. 18, the ST-ZL membranes appear to maintain similar structures before and after compaction. The pores in both the virgin and compacted membranes are straight-through pores. The larger measured thickness in part b is function of where the image was taken on the membrane.

Referring now to FIG. 19, SEM images of OMLTA-TFCs are shown. Similarly to the LTA images, the OMLTA particles can be seen within the support structure due to their vast size. The 250 psi and uncompacted membranes have the same structure. The membrane compacted under 500 psi has the same membrane structure, but appears slightly different because the structure was damaged during preparation for SEM imaging.

All the membranes containing nanoparticles appear to have similar structures before and after compaction, while the TFC images show a noticeably smaller porous structure. This supports the hypothesis that addition of nanoparticles helps to reduce compaction.

e. Conclusions

Reverse osmosis is a process with the potential to address current and future water shortages. It would allow for the treatment and usage of untapped water sources. However, certain limitations, such as concentration polarization, surface fouling, and internal fouling, prevent the wide-scale economical usage of this technology. This study uses innovative nanoparticles added to the support membrane to create thin-film nanocomposite membranes to attempt at reducing the effect of internal fouling. The following conclusions were made based on membrane testing in a cross-flow, two cells in parallel system:

1) Addition of dispersed nanoparticles to the support membrane results in less flux decrease after pressurization when compared to a pure polysulfone membrane.
2) Cross-section SEM images strongly support the hypothesis that addition of nanoparticles to the support membrane leads to increased resistance to physical compaction and combats long-term, irreversible fouling.
3) Cross-section SEM of pure polysulfone support membranes before and after compaction shows changes in the void structure, while the thin-film nanocomposites maintain their original structure. Since the nanoparticles fill the macrovoids of pure polysulfone membranes, the hypothesis that compaction occurs due to the collapse of macrovoids within the membrane structure is supported.

The conclusions of this study have many implications. The first major effect this study can have on the membrane community is in the membrane material design and manufacturing. To minimize the effects of compaction, materials that are rigid should be used to design future membranes. During the manufacturing and production of these membranes, a process should be used which creates the least amount of micro/macro voids. Altering the chemistry and composition in which the membranes are cast has a major effect on the amount of voids produced and, hence, on the extent of compaction.

Secondly, this study indicates that the present membrane process design can not be ideal. Currently, as flux declines, pressure is increased, causing greater internal fouling and an even greater requirement for more pressure. This further damages the membrane and decreases its life. Since membrane compaction levels off at a given pressure, a better solution can be to operate at constant pressure and allow the flux to decline but add additional membrane area online as the internal fouling progresses until it reaches its steady-state value. Also, as the cost of energy increases, it can be a more economical to add more membrane area over constantly increasing the pressure.

A major drawback of seawater desalination is its cost. The use of nanocomposite TFC membranes, that is, TFC membranes with nanocomposite support layers can help to significantly reduce this cost. The largest factor contributing to cost in membrane processes is energy usage. Since nanocomposite in support layers in TFC membranes appear to reduce compaction, less energy is required, hence reducing cost. Nanocomposite support layers in TFC membranes can revolutionize water treatment processes by making it economical for seawater desalination.

4. Evaluation of Compaction Mechanisms

A laboratory scale, cross-flow membrane filtration system was constructed to evaluate compaction mechanisms in commercial and nano-structured RO thin film composite membranes. Membranes were compacted for 24 hours at varying pressures while the temperature was kept constant at 25° C. The flux was measured as a function of pressure by a digital chromatography flow meter. Pressures ranging from 0 to 600 psi were tested. Deionized (DI) water was used with varying concentrations of $MgSO_4$ to supply the necessary osmotic pressure. Using a standard Darcy resistance model, the apparent membrane resistance was determined for each membrane across the appropriate range of applied pressures. The relationship between pressure and membrane resistance was unique to each membrane. Cross-section SEM images were taken of both compacted and uncompacted membranes to determine the physical change in the sub-structure of the membrane. Using both the SEM images and the experimentally determined membrane resistances in combination with the Kozeny-Carmen model, the mechanisms through which RO membranes are physically compacted and irreversibly fouled can be determined.

For example, in RO seawater desalination applications the applied pressures are over 50 bars and this causes the support layer membrane to be physically compacted to about 50 percent of its initial thickness over the first few days of operation. As a result, the water permeability of the membrane declines to about 50 percent of the initial value. Considering the membrane can be responsible for as much as 50 percent of the overall energy consumption in a RO desalination process, the overall energy consumption can increase by as much as 25 percent due to membrane compaction.

Thin film composite RO membranes formed over nanocomposite polysulfone supports exhibit very little or no loss of permeability at pressures over 30 bars, while similarly prepared TFC membranes formed over pure polysulfone supports (i.e., no particles) exhibit dramatic loss of permeability when tested under the same conditions.

5. Zeolite-Based Nanostructured Thin Film Composite (nTFC) Membranes

Nano-structured thin film composite (nTFC) membranes are hand-cast on preformed nanocomposite polysulfone microporous membranes through interfacial polymerization. First, a support membrane casting solution is prepared by dissolving 18 g polysulfone (PSf) in 72 mL N-methylpyrrolidone (NMP). In the case of the nanocomposites, various nanoparticles of 3.6 g were dispersed in the NMP before its addition to the polysulfone polymer. The asymmetric membranes from pure polymer and nanocomposite casting solutions were prepared by a phase inversion technique. A total of 14 different nanoparticles were used so far, the details of which are given in the table, supra.

In next step, the support membrane is immersed in an aqueous solution of m-phenylenediamine (MPD) which contains other additives like triethyl amine (TEA), (+)-10-champhor sulfonic acid (CSA), sodium lauryl sulfate (SLS), and isopropanol for 15 seconds. Excess MPD solution is removed from the support membrane surface using lab gas forced through a custom fabricated air knife. Aqueous MPD saturated support membrane is then immersed into trimesoyl chloride (TMC) solution in isopar-G at 30° C. for 15 seconds to get composite membrane. The resulting composite membranes are heat cured at 82° C. for 10 minutes, washed thoroughly with de-ionized water, and stored in de-ionized water filled lightproof containers at 5° C.

The separation performance of synthesized membranes was evaluated in terms of pure water flux and salt rejection using dead-end filtration cell (HP4750 Stirred Cell, Sterlitech Corp., Kent, Wash.). The membrane was washed thoroughly for 45 min under 225 psi pressure. Then the volume of pure water collected over 30 min. divided by the membrane area gave the permeate flux. Then NaCl solution was used as feed and permeate sample was collected after 30 min. Subsequently, the membrane was washed with DI water thoroughly for 45 min under pressure.

The surface (zeta) potential of hand-cast membranes was determined by measuring the streaming potential with 10 mM NaCl solution at unadjusted pH (~5.8). Sessile drop contact angles of deionized water were measured on air dried samples of synthesized membranes in an environmental chamber mounted to the contact angle goniometer (DSA10, KRuSS). The equilibrium value was the steady-state average of left and right angles. Surface roughness of the synthesized membranes was measured by AFM (Nanoscope IIIa, Digital Instruments).

TABLE 8

TFC and nTFC separation performance

| | MPD solution* (% w/v) | TMC solution** (% w/v) | Pure water flux (gfd) | NaCl solution flux (gfd) | NaCl rejection (%) |
|---|---|---|---|---|---|
| TFC | 2.0:2.0:4.0:0.02:10 | 0.1 | 9.2 ± 0.6 | 5.8 ± 0.3 | 85 ± 1.0 |
| LTA-TFC | 2.0:2.0:4.0:0.02:10 | 0.1 | 12.7 ± 1.8 | 8.7 ± 1.1 | 93 ± 0.6 |
| ODLTA-TFC | 2.0:2.0:4.0:0.02:10 | 0.1 | 23 ± 2.0 | 20 ± 1.4 | 78 ± 2.3 |

*MPD:TEACSA:SLS:IPA
**TMC dissolved in Isopar-G

TABLE 9

TFC and nTFC surface properties

| | Water contact Angle (°) | $\zeta_{membrane}$ (mV) |
|---|---|---|
| TFC | 71.2 ± 0.8 | −8.3 ± 1.0 |
| LTA-TFC | 67.3 ± 1.3 | −5.6 ± 0.9 |
| ODLTA-TFC | 69.0 ± 1.4 | −14.1 ± 1.3 |

Referring to the table above, the permeability of organic modified LTA (ODLTA) nanoparticle based nTFC membranes is substantially higher than either pure polymer TFC or LTA based thin film composite membrane with particles dispersed therein. In addition, the membrane surface is slightly more hydrophilic and more negatively charged.

6. Purification of Water Using Nanocomposite Membranes

Basic procedures for purification of water using polymeric membranes are well-known to those of skill in the art. A simple procedure for the purification of water using a membrane and for determining pure water flux, salt rejection, concentration polarization, and fouling phenomena has been described in E. M. V. Hoek et al., "Influence of cross-flow membrane filter geometry and shear rate on colloidal fouling in reverse osmosis and nanofiltration separations," *Environmental Engineering Science* 19 (2002) 357-372 and is summarized below. Simple characterization of a membrane's ability to purify a particular water sample is described in step (d), below.

a. Laboratory—Scale Cross-Flow Membrane Filter

Suitable membrane filtration units include a modified or unmodified version of a commercially available stainless steel cross-flow membrane filtration (CMF) unit (Sepa CF, Osmonics, Inc.; Minnetonka, Minn.) rated for operating pressures up to 6895 kPa (1000 psi). Applied pressure (ΔP) should be maintained constant and monitored by a pressure gage (Cole-Parmer) and flux should be monitored in real time by a digital flow meter (Optiflow 1000, Humonics; Rancho Cordova, Calif.) or by directly measuring the volume of water permeated per unit time.

b. Measuring Membrane Hydraulic Resistance

A different membrane coupon is typically used for each filtration experiment to determine a membrane's intrinsic hydraulic resistance. First, deionized (DI) water is circulated at about 250 psi (1724 kPa) for up to 24 hours to dissociate any flux decline due to membrane compaction (and other unknown causes inherent of lab-scale recirculation systems). Flux can be monitored continuously for the duration of the experiment. After DI equilibration, the pressure can be changed in increments of 50 psi (345 kPa), from a high of 250 psi to a low of 50 psi and flux recorded at a feed flow rate of 0.95 liters per minute (Lpm). At each pressure, flux is typically monitored for at least 30 minutes to ensure stable performance. The cross-flow can then be increased to 1.90 Lpm and flux recorded at 50 psi increments from 50 psi to 250 psi. Finally, feed flow rate can be set to 3.79 Lpm and the flux recorded at 50 psi increments from 250 psi down to 50 psi. At each cross-flow and pressure, the average of all of the stable flux measurements can then be plotted against applied pressure. The slope of a line fitted to pure water flux versus pressure data by a least squares linear regression provides the membrane hydraulic resistance, $R_m$. There is typically no measured influence of feed flow rate on pure water flux, but the procedure provides extra data points for the regression analysis. The pH, turbidity, and conductivity of feed are typically monitored throughout the pure water flux experiments to ensure constant feed conditions.

c. Measuring CP Modulus and Initial Osmotic Pressure Drop

After the membrane pure water hydraulic resistance is determined, concentration polarization effects can be quantified using the velocity variation techniques. The concentration polarization modulus is the ratio of rejected solute concentration at the membrane surface divided by the bulk solute concentration. An appropriate volume of 1 M stock NaCl solution is typically added to the feed tank to provide the desired experimental ionic strength. The sequence of varying applied pressure and feed flow rate is typically repeated, as described above. The effective osmotic pressure drop across the membrane ($\Delta\pi$) for each combination of feed velocity and applied pressure is typically determined from $J=A(\Delta p-\Delta\pi)$ where J is the water flux, $\Delta p$ is the applied pressure, and $A=1/R_m$. Since the feed and permeate salt concentrations can be directly measured, the membrane concentration is obtained from $\Delta\pi=f_{os}(c_m-c_p)$, where $C_m$ and $c_p$ are the salt concentrations at the membrane surface and in the permeate, and $f_{os}$ is a coefficient that converts molar salt concentration to osmotic pressure (~2RT for NaCl at dilute concentrations; R=8.324 J/mol·K, T=absolute temperature, K). Once $c_p$ is known, the concentration polarization modulus ($c_m/c_p$) is directly calculated.

d. Measuring Decline in Flux Due to Fouling

After the salt water experiments are finished, pressure and cross-flow are typically adjusted to produce the desired initial flux and wall shear for the fouling experiment. After stable performance (water flux and salt rejection) are achieved for a minimum of about 60 minutes, a dose of model foulant materials (e.g., organics, bacteria, colloids) are added to the feed tank to provide the appropriate foulant feed concentration. If real waters (e.g., "natural" water from environmental or industrial samples) are to be tested, then the feed tank and system are typically completely emptied, rinsed, and drained prior to filling the feed tank with a volume of the test water. A "real water" is a sample of water from a water utility or water source that is being considered for purification via a membrane filtration process. The concentration of foulant materials should be monitored in the feed, retentate, and permeate throughout the duration of the experiment by an appropriate analytical technique such as, for example, turbidity, color, TOC, or particle counts depending on the nature foulant material. In addition, conductivity and pH measurements are typically made at the start, end, and at several points during the fouling experiment to monitor salt rejection and to ensure the feed solution ionic strength and pH are not changing throughout the test. The transient flux at constant pressure is typically recorded in real-time while maintaining constant flux.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a reverse osmosis membrane, comprising:
   (A) providing, on the surface of a porous membrane, a composition comprising:
      (a) a polyamine and
      (b) a polyfunctional acyl halide,
   the porous support membrane comprising a polymer matrix and microparticles, nanoparticles, or a combination thereof, dispersed throughout the body of the polymer matrix; and
   (B) interfacially polymerizing the polyamine and polyfunctional acyl halide on the surface of the porous support membrane to form a reverse osmosis membrane comprising:
      (i) the porous support membrane and
      (ii) a discrimination layer comprising a polyamide.

2. The method of claim 1, wherein the reverse osmosis membrane exhibits a flux decline over time of from about 10% to about 50% less than a flux decline over the same time of a comparable reverse osmosis membrane without the particles in the porous support.

3. The method of claim 1, wherein the particles comprise zeolites.

4. The method of claim 1, wherein the particles comprise carbon nanotubes.

5. The method of claim 1, wherein the reverse osmosis membrane exhibits a thickness reduction of less than about 20% between initial and steady state permeate flow rates at 500 psi.

6. The method of claim 1, wherein the reverse osmosis membrane exhibits a thickness reduction of less than about 15% between initial and steady state permeate flow rates at 500 psi.

* * * * *